(12) United States Patent
Kim et al.

(10) Patent No.: US 10,250,857 B2
(45) Date of Patent: Apr. 2, 2019

(54) ELECTRONIC DEVICE AND METHOD

(71) Applicant: SAMSUNG ELECTRONICS CO., LTD., Suwon-si (KR)

(72) Inventors: Jung-hyung Kim, Suwon-si (KR); Myung-su Kang, Seoul (KR); Ji-hyun Kim, Suwon-si (KR); Hyo-jung Kim, Gumi-si (KR); Hee-Kyung Kim, Seongnam-si (KR); Bo-ram Namgoong, Seoul (KR); Jung-chul Park, Yongin-si (KR); Se-jun Song, Seongnam-si (KR); Sung-kwang Yang, Yongin-si (KR); Yoon-gi Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/099,840

(22) Filed: Apr. 15, 2016

(65) Prior Publication Data

US 2016/0316184 A1    Oct. 27, 2016

(30) Foreign Application Priority Data

Apr. 22, 2015    (KR) .......................... 10-2015-0056896

(51) Int. Cl.
*H04N 9/31* (2006.01)
*G03B 21/14* (2006.01)
*H04B 10/40* (2013.01)

(52) U.S. Cl.
CPC .......... *H04N 9/3161* (2013.01); *G03B 21/145* (2013.01); *H04B 10/40* (2013.01);
(Continued)

(58) Field of Classification Search
CPC ..... G03B 21/145; H04B 10/40; H04N 9/3147
(Continued)

(56) References Cited

U.S. PATENT DOCUMENTS 5,382,990 A    1/1995    Hata et al.
7,114,813 B2   10/2006   Wada et al.
(Continued)

FOREIGN PATENT DOCUMENTS

CN    101859053 A    10/2010
CN    102375717 A     3/2012
(Continued)

OTHER PUBLICATIONS

Communication dated Oct. 6, 2016 issued by the European Patent Office in counterpart European Patent Application No. 16164524.7.
(Continued)

*Primary Examiner* — Jefferey F Harold
*Assistant Examiner* — Jean W Desir
(74) *Attorney, Agent, or Firm* — Sughrue Mion, PLLC

(57) ABSTRACT

An electronic device including an optical module, a method of operating the electronic device including the optical module, and a non-transitory computer-readable recording medium having recorded thereon a program for performing the method. The electronic device includes an optical module configured to project content on a projection surface and a processor configured to determine whether the electronic device is positioned within a predetermined range of a projection surface and control the optical module to project the content onto the projection surface based on the determination.

18 Claims, 84 Drawing Sheets

(52) U.S. Cl.
CPC ......... *H04N 9/3147* (2013.01); *H04N 9/3173* (2013.01); *H04N 9/3185* (2013.01); *H04N 9/3194* (2013.01)

(58) Field of Classification Search
USPC ......... 348/744, 94, 116, 139, 140, 135, 136, 348/208.14, 143
See application file for complete search history.

(56) References Cited

U.S. PATENT DOCUMENTS

| | | | |
|---|---|---|---|
| 7,724,206 | B2 | 5/2010 | Saito |
| 8,152,312 | B2 | 4/2012 | Kondo et al. |
| 8,267,524 | B2* | 9/2012 | Morikuni ............... G03B 21/26 |
| | | | 348/744 |
| 8,277,057 | B2 | 10/2012 | Takeuchi et al. |
| 8,340,432 | B2 | 12/2012 | Mathe et al. |
| 8,490,002 | B2 | 7/2013 | Fai |
| 8,508,671 | B2 | 8/2013 | Slack et al. |
| 8,693,807 | B1 | 4/2014 | Gossweiler, III et al. |
| 8,992,050 | B1 | 3/2015 | Yuan et al. |
| 2008/0212039 | A1* | 9/2008 | Taylor ................... G03B 21/14 |
| | | | 353/79 |
| 2009/0073393 | A1 | 3/2009 | Lee et al. |
| 2009/0147272 | A1 | 6/2009 | Gibson et al. |
| 2009/0207322 | A1 | 8/2009 | Mizuuchi et al. |
| 2009/0251622 | A1 | 10/2009 | Mitsuhashi et al. |
| 2010/0079653 | A1 | 4/2010 | Pance |
| 2010/0182234 | A1 | 7/2010 | Takahashi et al. |
| 2010/0259767 | A1 | 10/2010 | Takeuchi et al. |
| 2011/0164192 | A1 | 7/2011 | Ozawa |
| 2011/0191690 | A1 | 8/2011 | Zhang et al. |
| 2014/0039674 | A1 | 2/2014 | Motoyama et al. |
| 2014/0368754 | A1 | 12/2014 | Izukawa et al. |
| 2016/0062407 | A1 | 3/2016 | Miyashita et al. |
| 2016/0295185 | A1* | 10/2016 | Mima ...................... G09G 5/36 |

FOREIGN PATENT DOCUMENTS

| | | |
|---|---|---|
| EP | 2420914 A2 | 2/2012 |
| JP | 2009-86048 A | 4/2009 |
| JP | 5334218 B2 | 11/2013 |
| JP | 2014-60549 A | 4/2014 |

OTHER PUBLICATIONS

Communication dated Jun. 27, 2016 issued by the International Searching Authority in counterpart International Application No. PCT/KR2016/003069 (PCT/ISA/210/220/237).
Communication dated Feb. 10, 2017, issued by the European Patent Office in counterpart European Application No. 16164524.7.
Communication dated Oct. 31, 2018, issued by the State Intellectual Property Office of P.R. China in counterpart Chinese Application No. 201680030964.8.

* cited by examiner

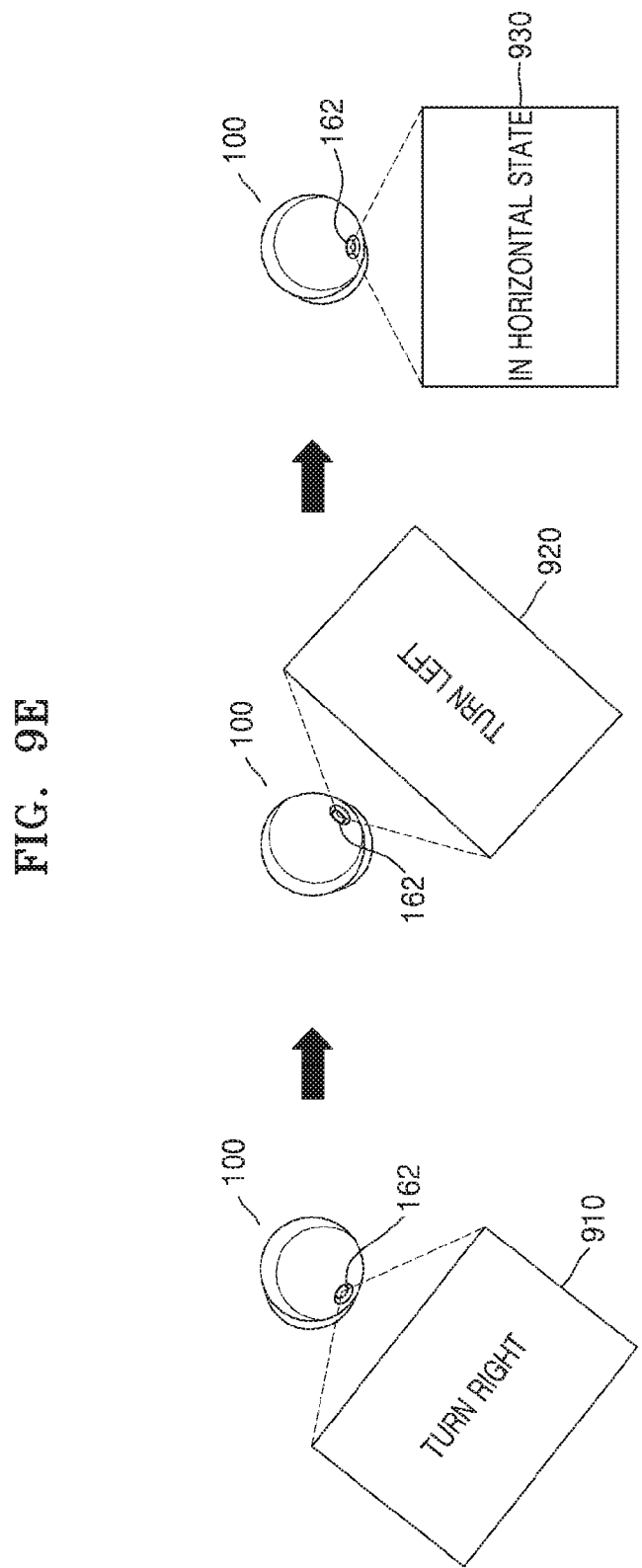

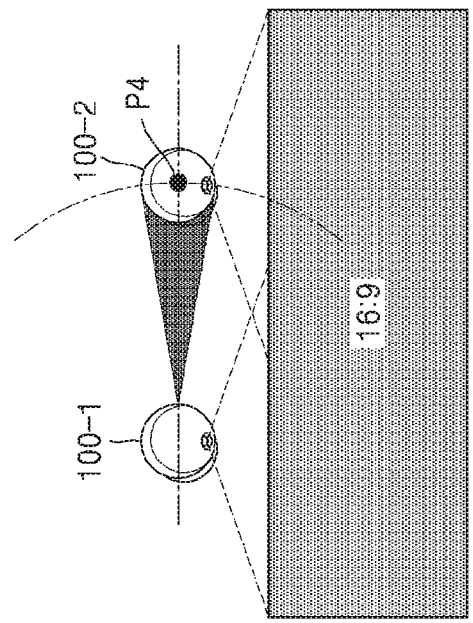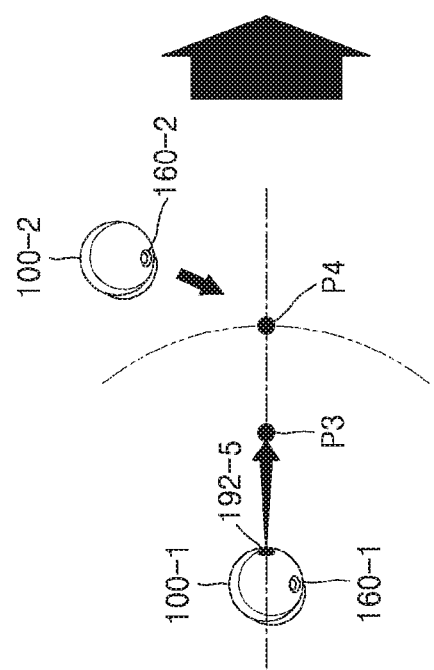
FIG. 12D

FIG. 12E
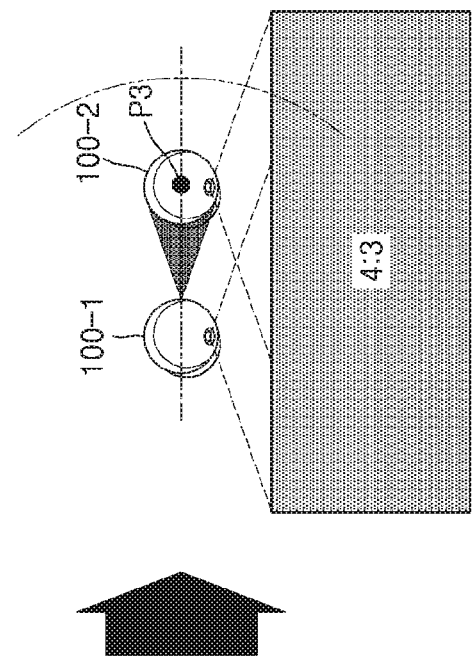
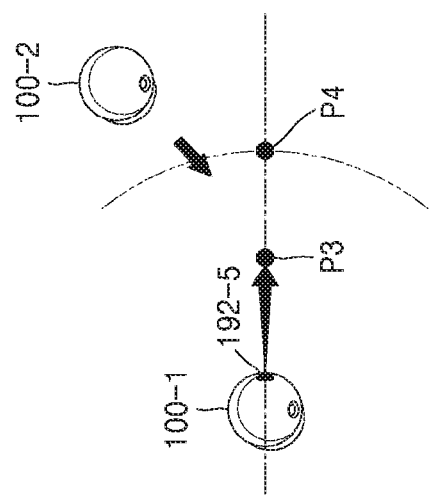

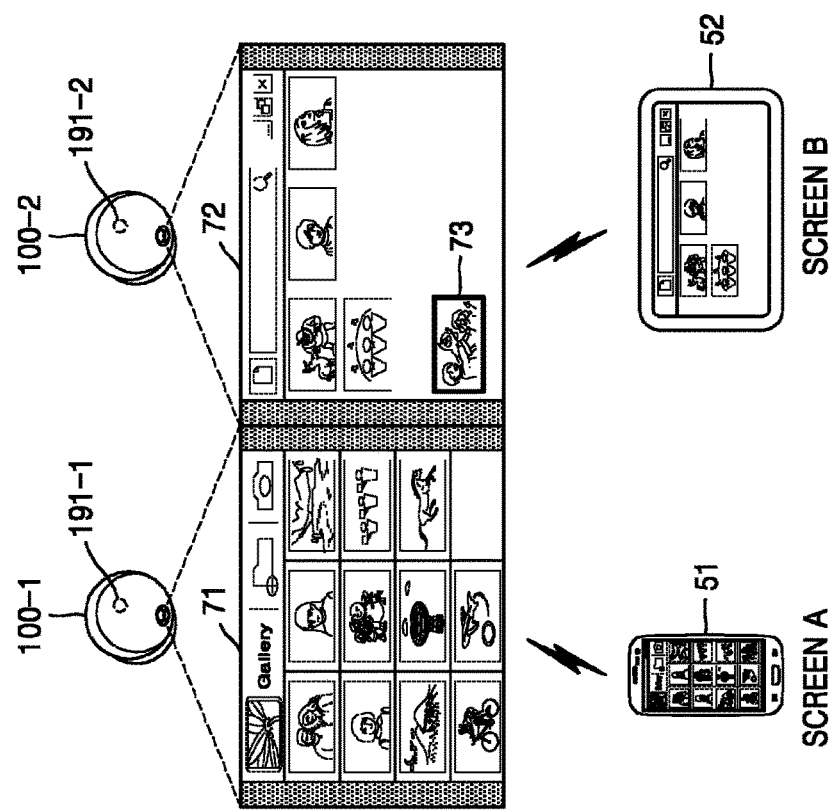
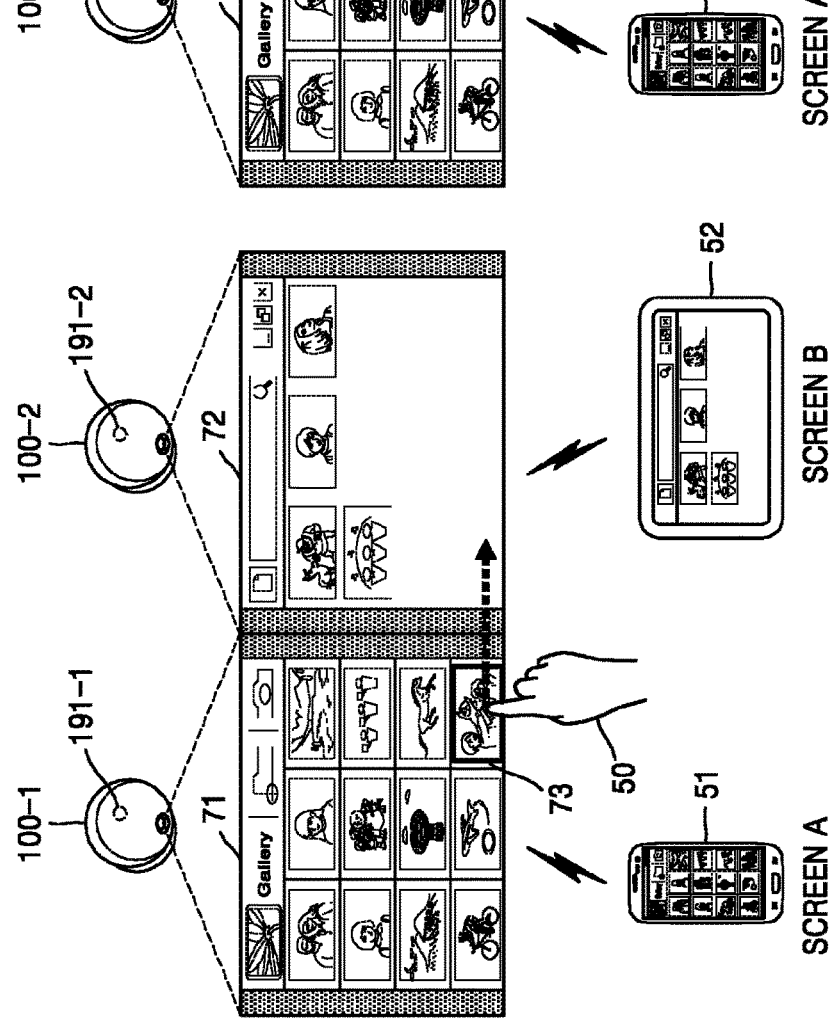

ELECTRONIC DEVICE AND METHOD

CROSS-REFERENCE TO RELATED APPLICATION

This application claims priority from Korean Patent Application No. 10-2015-0056896, filed on Apr. 22, 2015, in the Korean Intellectual Property Office, the disclosure of which is incorporated herein by reference in its entirety.

BACKGROUND

1. Field

Methods and apparatuses consistent with exemplary embodiments relate to an electronic device and a method, and more particularly, to an electronic device including an optical module and a method of operating the electronic device.

2. Description of the Related Art

A projector or a projection system is a display device that projects input image signals on a screen using light emitted from a light source. The light source may include, for example, an LED or a lamp. The light source may display a picture image. Such a display device may be used to implement a conference room presentation, a motion-picture projector, a home theater, etc.

SUMMARY

According to an aspect of an exemplary embodiment, there is provided an electronic device including: an optical module configured to project content on a projection surface; and a processor configured to determine whether the electronic device is positioned within a predetermined range of the projection surface and control the optical module to project the content onto the projection surface based on the determination.

The processor may be further configured to output a guide for indicating a position of a projection image to be output from the optical module.

The processor may be further configured to, in response to the electronic device not being positioned on the projection surface, output an indicator for providing a guide to position the electronic device on the projection surface.

The indicator may include at least one among: a sound that instructs to position the electronic device in a designated position; a projection image including a message that instructs to position the electronic device in the designated position; a color or a blinking number of a LED lamp; a laser light guide; and a vibration of a vibration device included in the electronic device.

The processor may be further configured to detect another electronic device near the electronic device and, in response to determining that the electronic device is not positioned on a level with the other electronic device, output an indicator for instructing to position the electronic device on a level with the other electronic device.

The indicator may include at least one of sound, light, vibration, and an image.

The electronic device may include a hinge structure configured to rotate the projection module, wherein the processor may be further configured to control the hinge structure to position the electronic device on the projection surface based on rotation information of the electronic device.

The processor may be further configured to adjust at least one of geometric information and color information of an image based on sensed direction information of the electronic device.

The processor may be further configured to, in response to an angle between the projection surface and the ground surface being greater than or equal to a predetermined value, adjust the projection image.

The processor may be further configured to, in response to an angle between the projection surface and a ground surface being less than a predetermined value, adjust a projection image.

The processor may be further configured to adjust the projection image according to whether the projection surface of the electronic device is orthogonal to a ground surface or parallel to the ground surface.

The processor may be further configured to, in response to a space onto which an image is to be projected from the electronic device being a smaller size than the projection surface, adjust the size of the projection image.

The processor may be further configured to determine an expandability of the projection image according to whether there is at least one other electronic device near the electronic device.

The processor may be further configured to determine whether there is at least one other electronic device near the electronic device according to at least one of a signal intensity of wireless communication between the electronic device and another electronic device and a relative distance between the electronic device and another electronic device measured with a sensor.

The processor may be further configured to, in response to determining the expandability of the projection image, divide the projection image into at least one other image and transmit the at least one other image to the at least one other electronic device.

The processor may be further configured to sense a user input and output a projection image in which an object is moved based on the user input.

The processor may be further configured to sense a user input and transmit information to move an object in the projection image to a projection image corresponding to another electronic device based on the user input.

According to an aspect of another exemplary embodiment, there is provided a method of operating an electronic device including an optical module, the method including: determining whether the electronic device is positioned within a predetermined range of a projection surface; and projecting content onto the projection surface using the optical module based on the determination.

The method may include outputting a guide for indicating a position of a projection image to be output from the optical module.

According to an aspect of another exemplary embodiment, there is provided a non-transitory computer-readable recording medium having recorded thereon a program for performing a method of operating an electronic device including an optical module, the method including: determining whether the electronic device is positioned within a predetermined range of a projection surface; and projecting content onto the projection surface using the optical module based on the determination.

According to an aspect of another exemplary embodiment, there is provided a method of projecting an image on a projection surface, the method including: determining whether an electronic device is positioned on the projection surface; in response to the electronic device not being positioned on the projection surface, instructing a user to position the electronic device on the projection surface, and in response to the electronic device being positioned on the projection surface, projecting the image on the surface by using an optical module.

The determining whether the electronic device is positioned on the projection surface may include determining whether the electronic device is positioned on a surface that is parallel to a ground surface or orthogonal to a ground surface.

The instructing a user to position the electronic device may include projecting light onto the projection surface indicating at least one among an outline of the image and corners of the image.

The method may further include detecting another electronic device near the electronic device and, in response to determining that the electronic device is not positioned on a level with the other electronic device, outputting an indicator for instructing to position the electronic device on a level with the other electronic device.

The method may further include sensing a user input and outputting an image in which an object is moved based on the user input.

BRIEF DESCRIPTION OF THE DRAWINGS

These and/or other aspects will become apparent and more readily appreciated from the following description of the exemplary embodiments, taken in conjunction with the accompanying drawings in which:

FIG. 9E is a diagram showing an exemplary guidance image as an example of an indicator for instructing to position an electronic device according to an exemplary embodiment;

FIGS. 12D and 12E are diagrams showing a laser LED and an aspect ratio as an example of an indicator for instructing to position an electronic device according to an exemplary embodiment;

FIGS. 38A and 38B show a detailed application example of a user interaction in a file folder;

DETAILED DESCRIPTION

Figure 1A:
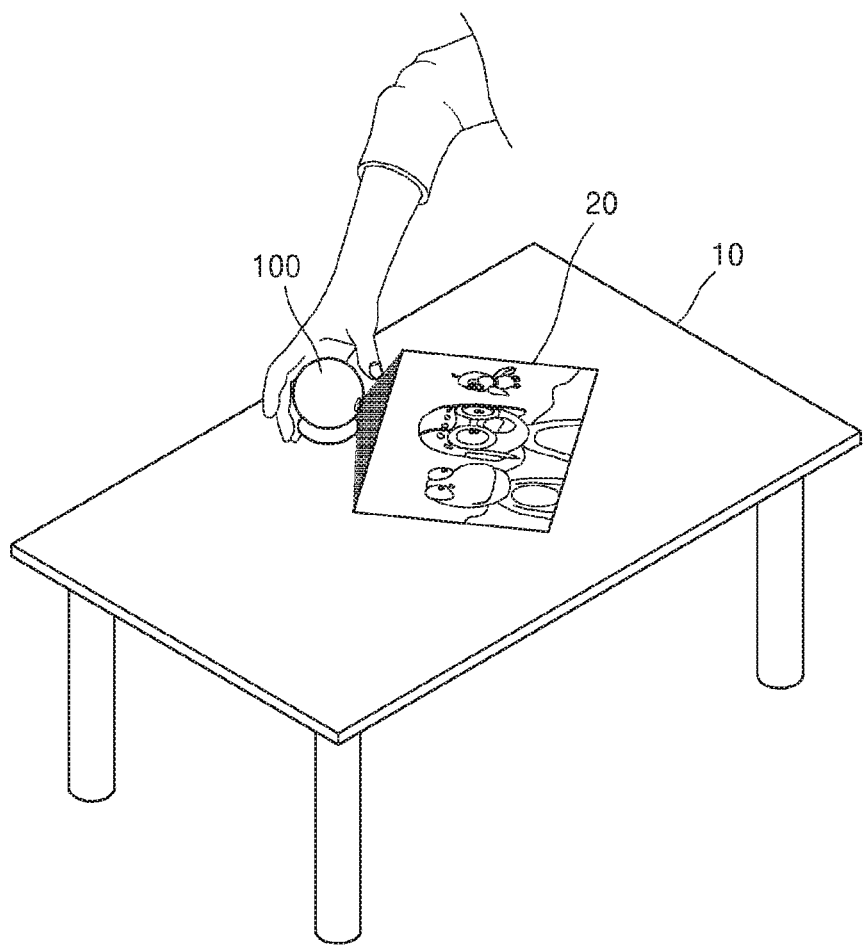
FIGS. 1A and 1B are reference diagrams illustrating a concept of an electronic device according to an exemplary embodiment.

Exemplary embodiments will be described below in detail with reference to the accompanying drawings. Further, a method of configuring and using an electronic device according to an exemplary embodiment will be described in detail with reference to the accompanying drawings. Like reference numerals refer to like elements throughout. As used herein, the term "and/or" includes any and all combinations of one or more of the associated listed items. Expressions such as "at least one of," when preceding a list of elements, modify the entire list of elements and do not modify the individual elements of the list.

Although the terms "first," "second," etc., may be used herein to describe various elements, these elements should not be limited by these terms. The above terms are used to distinguish one component from another. For example, a first element may be called a second element, and a second element may be called a first element The terminology used herein is for describing one or more exemplary embodiments, and is not intended to limit the scope of the present disclosure. An expression used in the singular encompasses the expression in the plural, unless it has a clearly different meaning in the context. It will be further understood that the terms "comprises," "comprising," "includes," and/or "including" when used herein, specify the presence of stated features, integers, steps, operations, elements, components, and/or combinations thereof, but do not preclude the presence or addition of one or more other features, integers, steps, operations, elements, components, and/or combinations thereof.

Figure 1B:
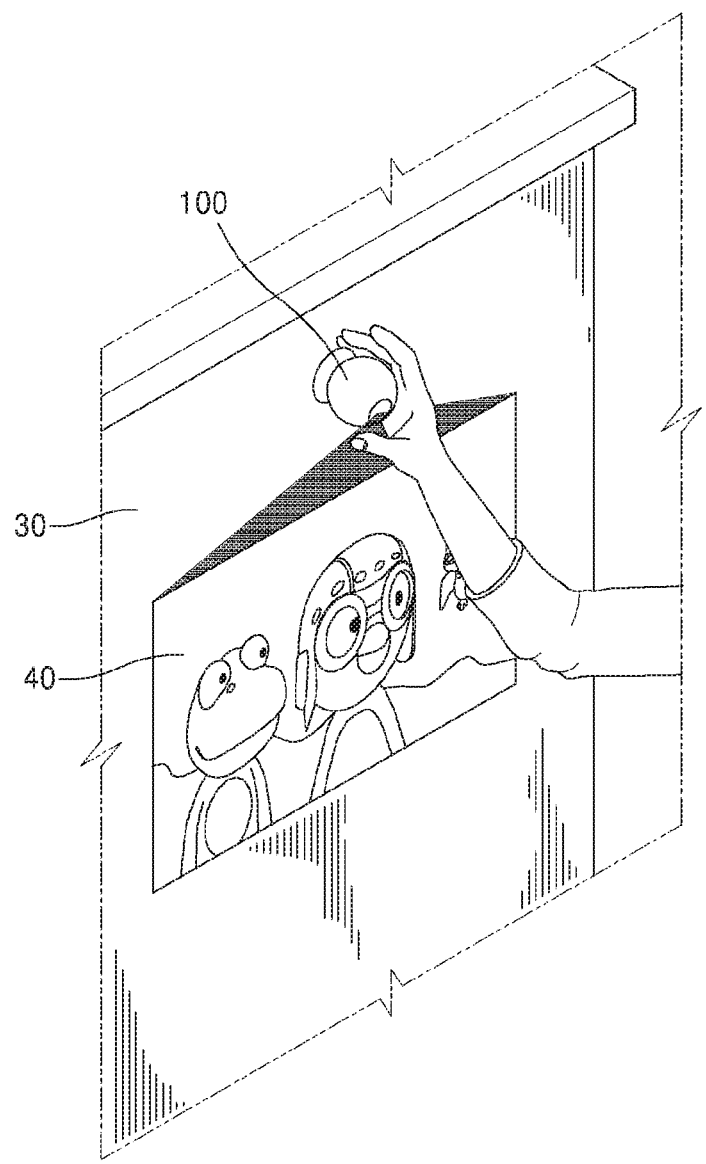

FIGS. 1A and 1B are reference diagrams illustrating a concept of an electronic device according to an exemplary embodiment.

An electronic device 100 according to an exemplary embodiment may be used while positioned on a projection surface using a projector lens mirror system.

The electronic device 100 according to an exemplary embodiment may be used while positioned on a table as shown in FIG. 1A or attached to a wall as shown in FIG. 1B.

Referring to FIG. 1A, the electronic device 100 according to an exemplary embodiment may project an image 20 onto a projection surface, which is a portion of a surface of a table 10 on which the electronic device 100 is positioned, only by performing an operation of a user positioning the electronic device 100 on the table 10. A user may enjoy a projection image by performing the operation of positioning the electronic device 100 on the table 10, without a process of adjusting the projection surface of the electronic device 100.

Referring to FIG. 1B, the electronic device 100 according to an exemplary embodiment may project an image 40 onto a projection surface, which is a portion of a surface of a wall 30 on which the electronic device 100 is positioned, by performing an operation of a user attaching the electronic device 100 to the wall 30.

The electronic device according to an exemplary embodiment may determine whether the electronic device is positioned on the projection surface or whether the electronic device is positioned within a predetermined distance from the projection surface and may project content according to a result of the determination.

The electronic device according to an exemplary embodiment may analyze the position of the electronic device and thus may output an indicator for guiding a position of a projection image.

The electronic device according to an exemplary embodiment may determine whether the electronic device is positioned on the projection surface and may provide a guide to a user to position the electronic device on the projection surface according to a result of the determination.

According to an exemplary embodiment, the projection image may be expanded by positioning a plurality of electronic devices including respective projection modules adjacent to one another and projecting content through the plurality of electronic devices together.

Figure 2A:
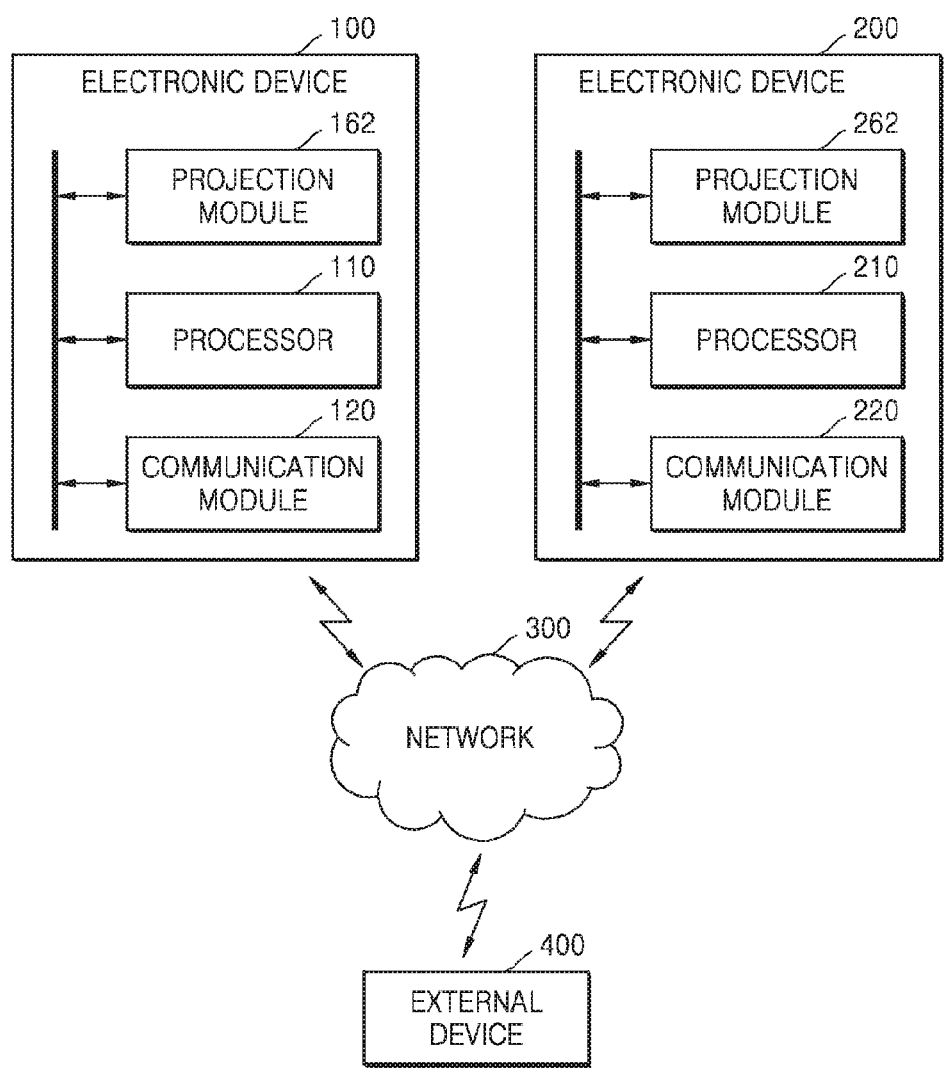
FIG. 2A is a schematic diagram of an electronic device according to an exemplary embodiment.

FIG. 2A is a schematic diagram illustrating a system in which the electronic device 100 communicates with other electronic devices 200 and 400 according to an exemplary embodiment.

Referring to FIG. 2A, the system includes the electronic device 100 including a projection module, the electronic device 200 including a projection module, an external device 400, and a network 300.

The electronic device 100 according to an exemplary embodiment includes a projection module 162 (e.g., projector), a processor 110, and a communication module 120 (e.g., communicator).

The electronic device 200 according to an exemplary embodiment includes a projection module 262, a processor 210, and a communication module 220.

The projection module 162 projects content onto a projection surface by the control of the processor 110. According to an exemplary embodiment, the projection module may be referred to as an optical module.

The communication module 120 communicates, through the network 300, with the external device 400 connected with the electronic device 200 and the electronic device 100 which include projections modules and is configured to transmit content to the electronic device 100 by the control of the processor 110.

The processor 110 according to an exemplary embodiment may determine whether the electronic device 100 is positioned on the projection surface or whether the electronic device is positioned within a predetermined distance from the projection surface and may determine whether to project the content on the basis of the determination.

The processor 110 according to an exemplary embodiment may determine whether the electronic device 100 is positioned on the projection surface and may output an indicator for instructing to position the electronic device 100 on the projection surface.

The processor 110 may recognize the presence of the electronic device 200 positioned adjacent to the electronic device 100 and may determine the expandability of a projection image.

The electronic device 100 and the electronic device 200 may communicate with the external device 400 through the network 300. The electronic device 100 may project content received from the external device 400 through the network using the projection module 162. The electronic device 200 may project content received from the external device 400 through the network using the projection module 262.

The electronic device 100 may recognize the electronic device 200 positioned in the vicinity of the electronic device 100 (e.g., within a predetermined distance). When the electronic device 100 recognizes the electronic device 200, the electronic device 100 and the electronic device 200 may communicate through the network 300. When the electronic device 100 recognizes the electronic device 200, the electronic device 100 may transmit at least some of the content received from the external device 400 to the electronic device 200 to expand the projection image.

In response to a user input for an object displayed in the projection image, the electronic device 100 may transmit information regarding the object to the electronic device 200 through the network 300.

Figure 2B:
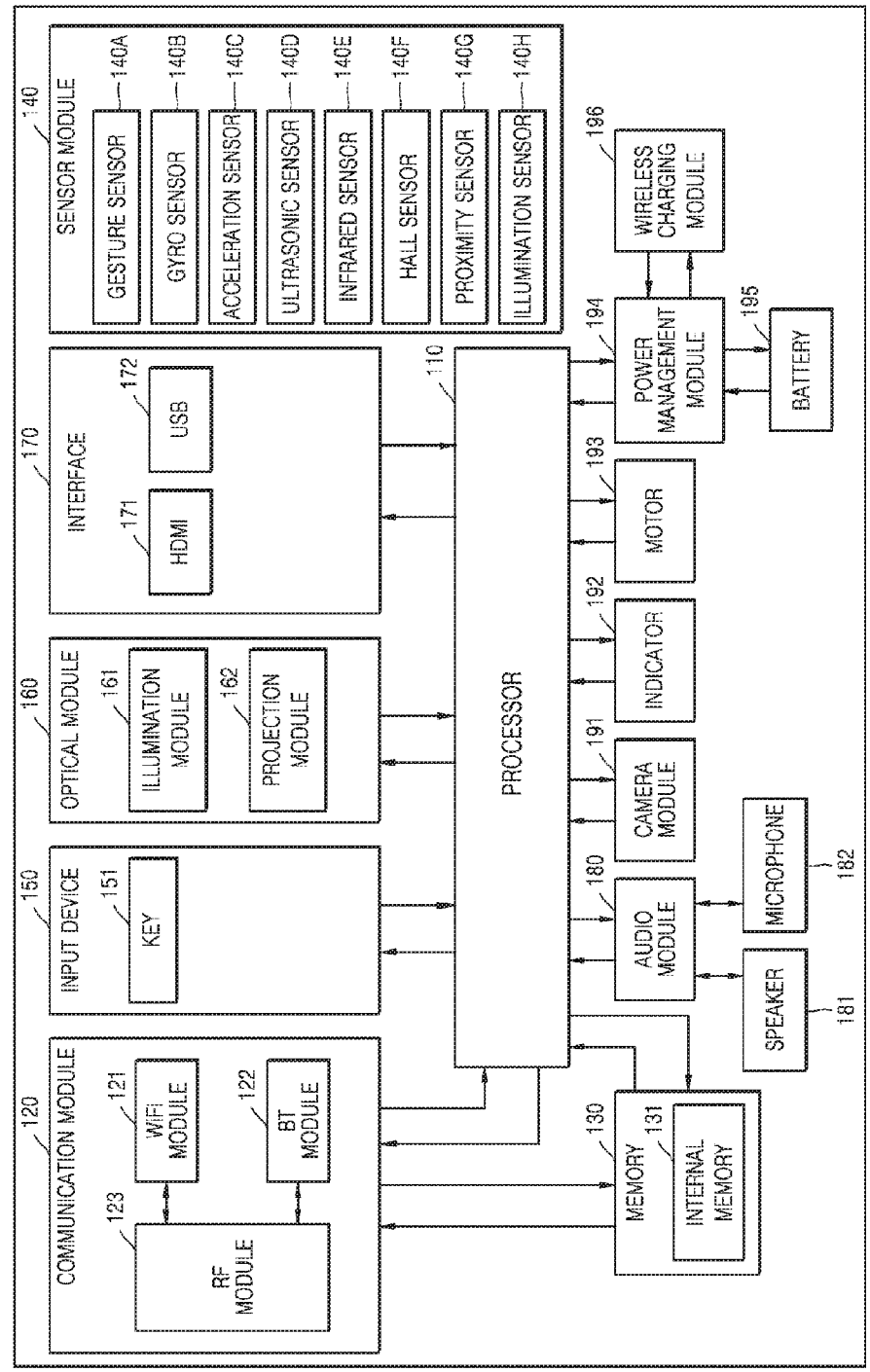
FIG. 2B is a detailed block diagram of an electronic device according to an exemplary embodiment.

FIG. 2B is a detailed block diagram of the electronic device 100 according to an exemplary embodiment.

Referring to FIG. 2B, for example, the electronic device 100 may include any or all of the elements of electronic device 100 shown in FIG. 2A. Referring to FIG. 2B, the electronic device 100 may include one or more processors 110, a communication module 120, a memory 130, a sensor module 140, an input device 150, an optical module 160, an interface 170, an audio module 180, a camera module 191, an indicator 192, a motor 193, a power management module 194, a battery 195, a wireless charging module 196.

The processor 110 may run an operating system or an application program to control a plurality of hardware and/or software elements connected to the processor 110 and may perform processing and operations of various types of data including multimedia data. The processor 110, for example, may be implemented as a system-on-chip (SoC). According to an exemplary embodiment, the processor 110 may further include a graphic processing unit (GPU).

The communication module 120 may perform data transmission/reception in communication with other electronic devices, for example, other electronic devices or servers connected to the electronic device 100 through a network. According to an exemplary embodiment, the communication module 120 may include a Wi-Fi module 121, a Bluetooth (BT) module 122, and a radio frequency (RF) module 123.

For example, each of the Wi-Fi module 121 and the BT module 122 may include a processor that processes data transmitted or received through a corresponding module. The Wi-Fi module 121 and the BT module 122 are shown as separate blocks in FIG. 2A. However, according to an exemplary embodiment, at least one of the Wi-Fi module 121 and the BT module 122 may be included in one integrated chip (IC) or an IC package. For example, at least one of processors corresponding to the Wi-Fi module 121 and the BT module 122 may be implemented as one SoC.

The RF module 123 may perform data transmission/reception, for example, RF signal transmission/reception. The RF module 123 may include, for example, a transceiver, a power amp module (PAM), a frequency filter, a low noise amplifier (LNA), and the like. The RF module 123 may further include a component for transmitting/receiving an electromagnetic wave over the air in wireless communication, such as a conductor or a conducting wire. Although FIG. 2B shows that the Wi-Fi module 121 and the BT module 122 share one RF module 123, at least one of the Wi-Fi module 121 and the BT module 122 may perform RF signal transmission/reception through a separate RF module according to an exemplary embodiment.

The memory 130 may include an internal memory 131. The internal memory 131 may include, for example, at least one of a volatile memory (e.g., a dynamic random access memory (DRAM), a static RAM (SRAM), or a synchronous dynamic RAM (SDRAM)) and a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

The memory 130 may store various types of data, programs, and/or applications that drive and control the electronic device 100 by the control of the processor. The memory 130 may store signals and/or data that is input or output corresponding to the driving of the one or more processors 110, the communication module 120, the sensor module 140, the input device 150, the optical module 160, the interface 170, the audio module 180, the camera module 191, the indicator 192, the motor 193, the power management module 194, the battery 195, and the wireless charging module 196.

The sensor module 140 may measure a physical quantity or sense an operation state of the electronic device 100 and may convert the measured or sensed information into an electrical signal. The sensor module 140 may include, for example, at least one of a gesture sensor 140A, a gyro sensor 140B, an acceleration sensor 140C, an ultrasonic sensor 140D, an infrared sensor 140E, a Hall sensor 140F, a proximity sensor 140G, and an illumination sensor 140H. Additionally or alternatively, the sensor module 140 may include, for example, an E-nose sensor, an electromyography (EMG) sensor, an electroencephalogram (EEG) sensor, an electrocardiogram (ECG) sensor, an iris sensor, a fingerprint sensor, a pressure sensor, etc. The sensor module 140 may further include a control circuit that controls one or more sensors included therein.

According to an exemplary embodiment, the sensor module 140 may use at least one sensor included in the sensor module 140 to detect whether the electronic device is positioned on a projection surface, whether the electronic device is positioned within a predetermined distance from the projection surface, whether the electronic device is positioned horizontally to the ground surface, or whether the electronic device is adjacent to another device.

The input device 150 may include a key 151. The key 151 may include, for example, a physical button, an optical key, and/or a keypad. According to an exemplary embodiment, the electronic device 100 may use the communication module 120 to receive a user input from an external device (e.g., a computer or a server) connected with the communication module 120.

The optical module 160 may include an illumination module 161 and a projection module 162 (e.g., projector). The projection module 162 may project light onto a screen and display an image. For example, the screen may be positioned inside or outside the electronic device 100.

According to an exemplary embodiment, when the electronic device 100 is positioned on the projection surface or within a predetermined distance from the projection surface, the optical module 160 may project content.

According to an exemplary embodiment, when the electronic device 100 is not positioned on the projection surface or within a predetermined distance from the projection surface, the power management module 194 may block power to the optical module 160 and thus prevent the optical module 160 from operating.

A scheme in which the projection module 162 projects light includes a digital light processing (DLP) scheme, a liquid crystal on silicon (LCOS) scheme, a 3LCD scheme, an LCD scheme, a laser scheme, and the like.

The DLP scheme refers to a projection display scheme using a digital micro-mirror device (DMD), which is one of screen display elements. The liquid crystal on silicon (LCOS) scheme may also include performing projection using an LCOS panel that performs displaying by defining a pixel by a plurality of scan lines and data lines, including a crystal having a predetermined molecule arrangement, and transmitting and reflecting light input from the outside through the crystal. The 3LCD scheme includes a liquid crystal display to which lamp light is transmitted and which is divided into three parts. The 3LCD uses red, blue, and green into which each color was divided before light originating from the lamp is enlarged by a lens through an LCD panel. A projector may also be implemented in the 3LCD scheme. In addition, like an LCD, the projector using one LCD panel may also be provided. In addition, the laser scheme may include a light source composed of a red light emitting device, a green light emitting device, and a blue light emitting device, an optical tunnel to which laser light emitted from the light source is incident, and a display device configured to project an image onto a screen using the laser light incident through the optical tunnel. The laser scheme may also include, as a projection module, a structure including a synthesis module for performing synthesis by transmitting or reflecting some colors of the laser light emitted from the light source and a speckle removal unit for removing speckle by irregularly changing a phase of the laser light synthesized through the synthesis module.

The interface 170 may include, for example, a high-definition multimedia interface (HDMI) 171 and a Universal Serial Bus (USB) 172. The interface 170 may be included in, for example, the communication module 120 shown in FIG. 2A. Additionally or alternatively, the interface 170 may include, for example, a mobile high-definition link (MHL) interface, a secure digital (SD) card/multimedia card (MMC) interface, and/or an infrared data association (IrDA) interface.

The audio module 180 may bi-directionally convert a sound and an electrical signal. The audio module 180 may process sound information input or output through, for example, a speaker 181 and/or a microphone 182.

The electronic device 100 may also transmit audio to an external BT device using the BT module 122 included in the communication module 120, instead of including the audio module 180.

The camera module 191 may be a device for capturing a still image and a moving image, and according to an exemplary embodiment, may include one or more image sensors (e.g., a front sensor and/or a rear sensor), a lens, an image signal processor (ISP,), or a flash (for example, a light emitting diode (LED) or a xenon lamp.

The camera module 191 receives an image (e.g., consecutive frames) corresponding to a user's motion including a gesture in a camera recognition range. For example, the recognition range of the camera module 191 may be a distance of about 0.1 meters to about 5 meters from the camera unit to the user. For example, the user's motion may include a body part of a user, such as the face, facial expression, hand, fist, or finger of the user, or a motion of the body part of the user.

The indicator 192 may indicate a state of the electronic device 100 or a component (e.g., the processor 110) thereof, for example, a booting state, a message state, and/or a charging state.

The motor 193 may convert an electrical signal into mechanical vibration. The electronic device 100 may include a processing device (e.g., a graphic processing unit (GPU)) for supporting a mobile TV. The processing device for supporting the mobile TV may process media data according to a standard such as digital multimedia broadcasting (DMB), digital video broadcasting (DVB), and/or media flow.

The power management module 194 may manage power of the electronic device 100. The power management module 194 may include, for example, a power management integrated circuit (PMIC), a charger integrated circuit (IC), and/or a battery or fuel gauge.

According to an exemplary embodiment, when the electronic device 100 is positioned on a projection surface or within a predetermined distance from the projection surface, the power management module 194 may apply power to the optical module 160 to operate the optical module 160.

According to an exemplary embodiment, when the electronic device 100 is not positioned on a projection surface or within a predetermined distance from the projection surface, the power management module 194 may shut off power to the optical module 160 to prevent the optical module 160 from projecting content.

The PMIC may be installed in, for example, an integrated circuit or an SoC semiconductor chip. The charging scheme may be classified into a wired connection and a wireless connection. The charger IC may charge a battery and prevent overvoltage or overcurrent originating from a charger. According to an exemplary embodiment, the charger IC may include a charger IC capable of performing at least one of a wired charging scheme and a wireless charging scheme.

The wireless charging module 196 may include a circuit capable of performing wireless charging, for example, a coil loop, a resonance circuit, or a rectifier. The wireless charging scheme includes, for example, a magnetic resonance scheme, a magnetic induction scheme, and electromagnetic wave scheme.

The battery gauge may measure, for example, a residual quantity of the battery 195 or a voltage, current, or temperature during the charging of the battery 195. The battery 195 may store and generate electricity and may supply power to the electronic device 100 using the stored or generated electricity. The battery 195 may include, for example, a rechargeable battery or a solar battery.

Each of the above-described elements of the electronic device according to one or more exemplary embodiments may include one or more components, and the name of a corresponding element may vary depending on the type of the electronic device. The electronic device according to one or more exemplary embodiments may be configured to include at least one of the above elements and may be configured to remove some elements or add additional other elements. Because some of the elements of the electronic device according to one or more exemplary embodiments are combined to one entity, functions of the elements may be performed the same as before combining.

Figure 2C:
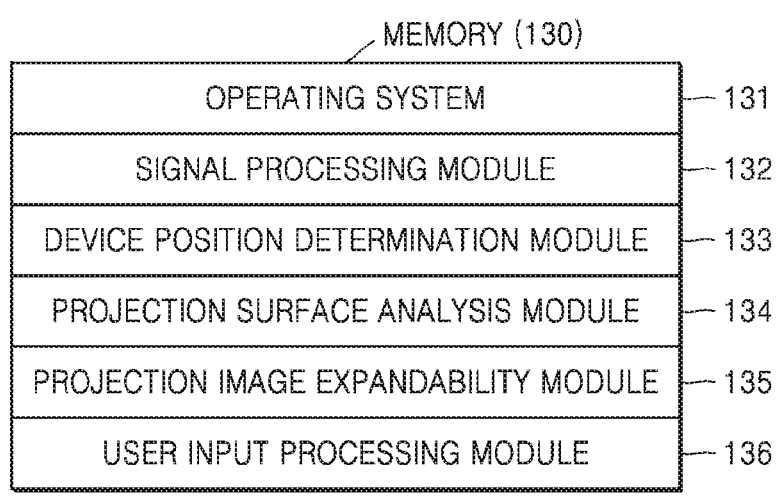
FIG. 2C shows examples of a module stored in a storage unit 130 according to an exemplary embodiment.

FIG. 2C shows examples of a module stored in the memory 130 according to an exemplary embodiment.

Referring to FIG. 2C, the memory 130 may include an operating system 131, a signal processing module 132, a device position determination module 133, a projection surface analysis module 134, a projection image expandability determination module 135, and a user input processing module 136.

The operating system 131 controls overall operations of the electronic device 100.

The signal processing module 132 performs buffering and/or signal decryption so that content received through the communication module 120 may be seen with the optical module 160. The signal processing module 132 processes image data received by the electronic device 100. The signal processing module 132 may perform various image processing operations, such as decoding, scaling, noise filtering, frame rate conversion, and resolution conversion, on video data.

The device position determination module 133 determines whether the electronic device is positioned on the projection surface.

According to an exemplary embodiment, the device position determination module 133 may determine whether the electronic device is positioned on the projection surface or within a predetermined distance from the projection surface and may determine the projection of content according to the determination.

According to an exemplary embodiment, the device position determination module 133 may determine whether the projection surface of the electronic device is vertical or horizontal to the ground surface and may determine whether to output an indicator for instructing to position the electronic device on the projection surface according to the determination.

According to an exemplary embodiment, the device position determination module 133 may determine whether the electronic device is positioned on the projection surface, and may output an indicator for instructing to position the electronic device on the projection surface when it is determined that the electronic device is not positioned on the projection surface.

According to an exemplary embodiment, the device position determination module 133 may use a guidance sound and/or a mechanical sound that instructs to position the electronic device at a designated position as the indicator for instructing to position the electronic device on the projection surface by outputting the sound through the audio module 180.

According to an exemplary embodiment, the device position determination module 133 may use a projection image containing a guidance message that instructs to position the electronic device at a designated position as the indicator for instructing to position the electronic device on the projection surface. The projection image containing the guidance message may be output through the optical module 160.

According to an exemplary embodiment, the device position determination module 133 may use a color or a blinking number of an LED lamp or a laser light guide as an indicator for instructing to position the electronic device on the projection surface. The LED lamp or laser may be output through the indicator 192 of the electronic device 100.

According to an exemplary embodiment, the device position determination module 133 may use a vibration of a vibration device provided in the electronic device as an indicator for instructing to position the electronic device on the projection surface. The above-described vibration may be output through the motor 193.

According to an exemplary embodiment, the device position determination module 133 may determine whether the electronic device is positioned on a level with another adjacent electronic device and may output an indicator for instructing to position the electronic device or the other electronic device on a level with the other when it is determined that the electronic device is not positioned on a level with the other electronic device.

According to an exemplary embodiment, the device position determination module 133 may use a guidance sound or a mechanical sound that instructs to position the electronic device at the designated position as an indicator for instructing to position the electronic device or the other electronic device on a level with the other. The sound may be output through the audio module 180.

According to an exemplary embodiment, the device position determination module 133 may use a projection image containing a guidance message that instructs to position the electronic device at the designated position as an indicator for instructing to position the electronic device or the other electronic device on a level with the other. The projection image containing the guidance message may be output through the optical module 160.

According to an exemplary embodiment, the device position determination module 133 may use a color or a blinking number of an LED lamp or a laser light guide as an indicator for instructing to position the electronic device or the other electronic device level with the projection surface. A light source such as the LED lamp or the laser may be included in the indicator 192 of the electronic device 100.

According to an exemplary embodiment, the device position determination module 133 may perform control to rotate the electronic device such that the electronic device is positioned on the projection surface on the basis of rotation information of the electronic device. The rotation of the electronic device may use a hinge structure included in the electronic device.

The projection surface analysis module 134 corrects an image by analyzing a projector projection surface.

According to an exemplary embodiment, the projection surface analysis module 134 may sense direction information of the electronic device and may correct at least one of geometric information and color information of a projection image on the basis of the directional information of the sensed electronic device. The direction information of the electronic device may be sensed using at least one of the gyro sensor 140B and the acceleration sensor 140C included in the sensor module 140 of the electronic device.

According to an exemplary embodiment, the projection surface analysis module 134 may analyze the projection surface. The projection surface analysis module 134 may not correct a projection image when an angle between the projection surface and the ground surface is less than a predetermined value and may correct the projection image when the angle between the projection surface and the ground surface is equal to or greater than the predetermined value. The angle between the projection surface and the ground surface may be sensed using at least one of the gyro sensor 140B and the acceleration sensor 140C included in the sensor module 140.

According to an exemplary embodiment, the projection surface analysis module 134 may analyze the projection surface. The projection surface analysis module 134 may correct the projection image when the angle between the projection surface and the ground surface is less than the predetermined value and may not correct the projection image when the angle between the projection surface and the ground surface is equal to or greater than the predetermined value.

According to an exemplary embodiment, the projection surface analysis module 134 may determine whether to correct the projection image depending on whether the projection surface of the electronic device is horizontal (e.g., parallel) or vertical (e.g., orthogonal) to the ground surface. Whether the projection surface of the electronic device is horizontal or vertical to the ground surface may be sensed using at least one of the gyro sensor 140B and the acceleration sensor 140C included in the sensor module 140.

According to an exemplary embodiment, the projection surface analysis module 134 may not correct the projection image when the electronic device is positioned on a bottom surface, i.e., when the projection surface is horizontal to the ground surface and may correct the projection image when the electronic device is positioned on a wall, that is, the projection surface is vertical to the ground surface. When the electronic device is positioned on a bottom surface, there may be a reduced need to correct the projection image because the user may easily rotate the electronic device or adjust his or her position and thus have no difficulty in identifying a projection image that is output from the electronic device. However, if the electronic device is positioned on a wall, the need to correct the projection image may increase when the projection image is not output horizontally because the user may have difficulty in recognizing or identifying the projection image.

According to an exemplary embodiment, the projection surface analysis module 134 may correct the size of the projection image when the size of a space on which an image is to be projected is smaller than the size of the projection surface. The projection image expandability determination module 135 determines whether to expand and project the projection image.

According to an exemplary embodiment, the projection image expandability determination module 135 may determine whether there is at least one other electronic device in the vicinity of the electronic device and may determine the expandability of the projection image depending on whether there is at least one other electronic device in the vicinity of the electronic device. According to an exemplary embodiment, whether there is at least one other electronic device in the vicinity of the electronic device may be sensed using at least one of a signal intensity of wireless communication between an electronic device and another adjacent electronic device through the communication module 120 included in the electronic device 100 and a relative distance between the electronic device and the other electronic device measured through the infrared sensor 140E or the ultrasonic sensor 140D included in the sensor module 140.

According to an exemplary embodiment, when the projection image expandability determination module 135 determines the expandability of the projection image because there is at least one other electronic device in the vicinity of the electronic device, the projection image expandability determination module 135 may divide the projection image into at least one separate image and may transmit the at least one separate image to the at least one other electronic device.

The user input processing module 136 senses a user input in the output projection image and performs data processing in response to the sensing.

According to an exemplary embodiment, the user input processing module 136 may sense a user input that instructs to move an object in the projection image and may output the projection image in which the object is moved on the basis of the user input. The user input that instructs to move the object in the projection image may be sensed through the camera module 191 of the electronic device or through the ultrasonic sensor 140D or the infrared sensor 140E included in the sensor module 140.

According to an exemplary embodiment, the user input processing module 136 may sense a user input that instructs to move an object in the projection image onto a projection image corresponding to another electronic device and may transmit the object to the other electronic device on the basis of the user input.

Figure 2D:
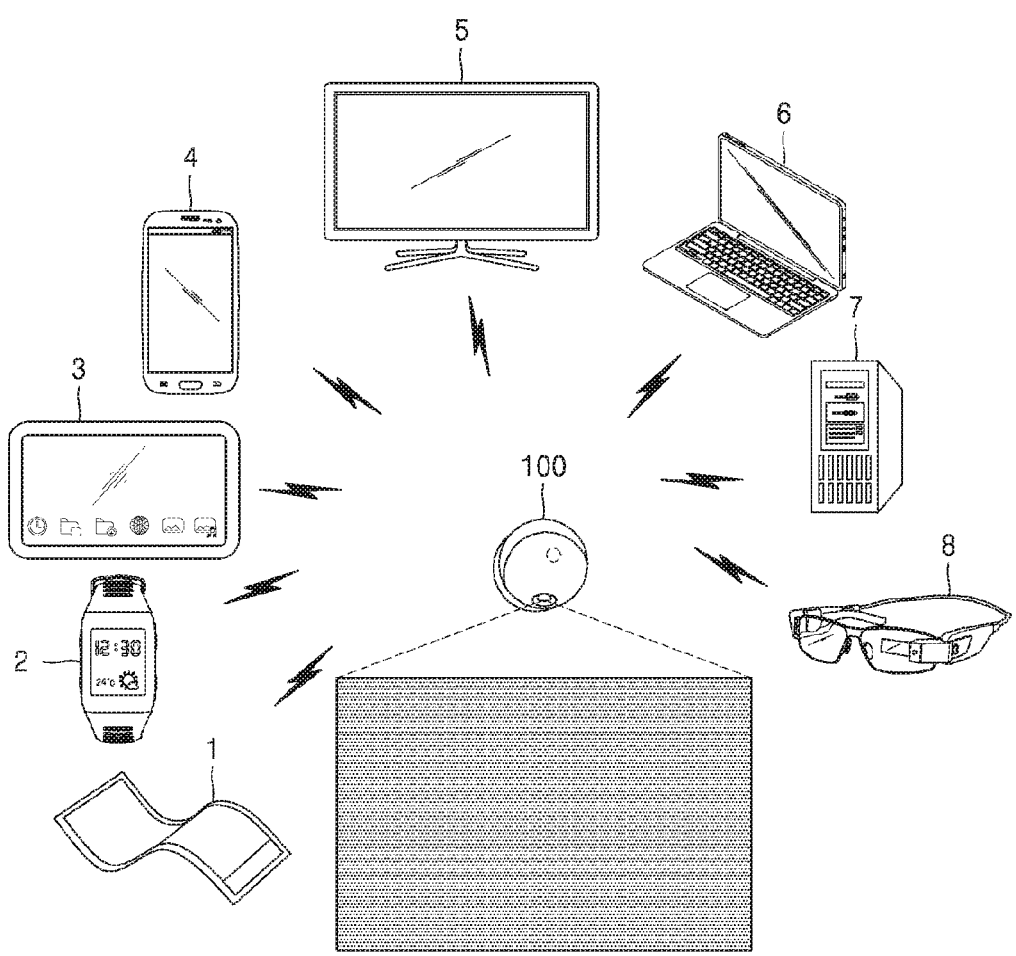
FIG. 2D illustrates examples of an external device from which an electronic device 100 may receive data.

FIG. 2D shows examples of an external device from which the electronic device 100 may receive data.

According to an exemplary embodiment, the electronic device 100 may receive content to be projected through the communication module 120 from an external device. For example, the electronic device 100 may receive content in a wired or wireless manner from at least one of various external devices such as a flexible device 1, a watch-type device 2, a table PC 3, a mobile device 4, a display 5 such as a television, a notebook computer 6, a desktop computer 7, a glasses-shaped device 8, and a head-mount device. The content received from one of these external devices may be mirroring content and may be content different from content displayed on an external device that transmit the content.

According to an exemplary embodiment, the electronic device 100 may receive content to be projected through the interface 170 of the electronic device 100.

According to an exemplary embodiment, the electronic device 100 may acquire the content to be projected from the memory 130 of the electronic device 100.

According to one or more exemplary embodiments, the electronic device 100 may be solely used to project the projection image. However, the projection image may be expanded to various sizes such as about two times, three times, or four times the original size by using two or more electronic devices together.

Figure 3A:
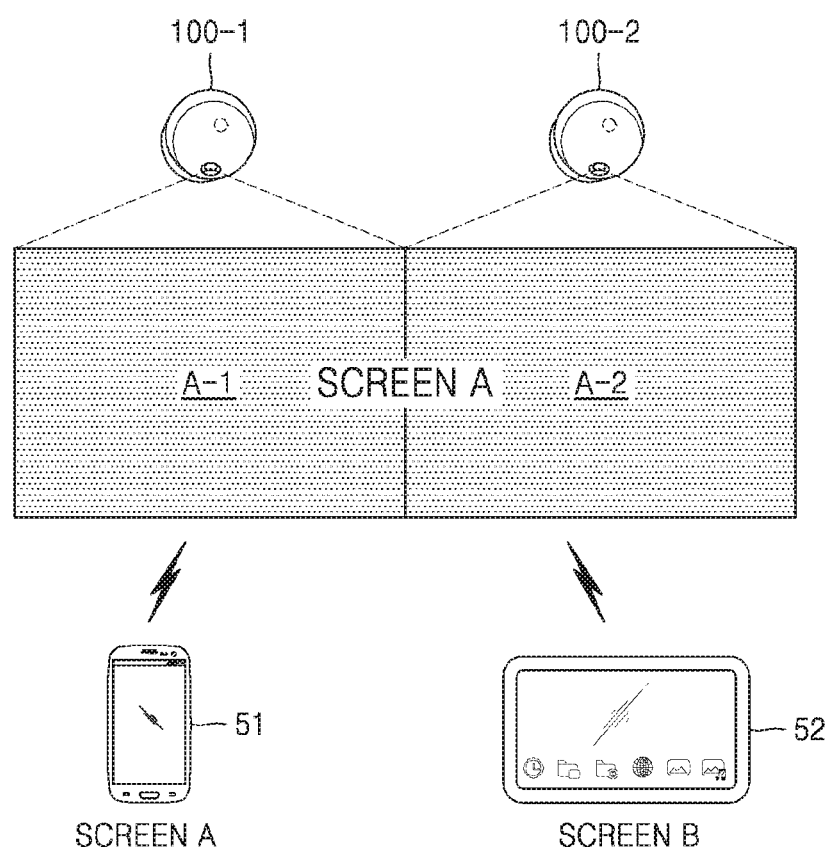
FIG. 3A is an example in which a plurality of electronic devices project one screen according to an exemplary embodiment.

FIG. 3A is an example in which the projection image is expanded by two electronic devices according to an exemplary embodiment.

Referring to FIG. 3A, the size of the projection image may be expanded by a factor of about two when an electronic device 100-1 and an electronic device 100-2 are used together in comparison with when one electronic device is used.

For example, the electronic device 100-1 is connected with an external device 51, and the electronic device 100-2 is connected with an external device 52. The electronic device 100-1 may transmit at least some data of screen A received from the external device 51 to the electronic device 100-2. The projection image may be expanded by the electronic device 100-1 and the electronic device 100-2 that mutually project screen A received from the external device 51, that is, by the electronic device 100-1 that projects portion A-1 of screen A received from the external device 51 and the electronic device 100-2 that projects portion A-2 of screen A received from the electronic device 100-1.

Figure 3B:
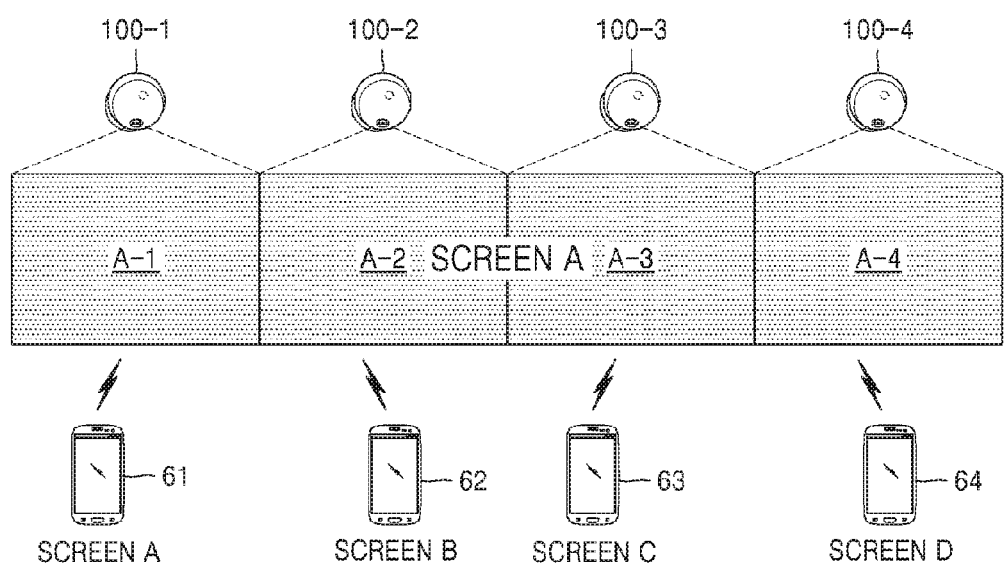
FIG. 3B is an example in which a plurality of electronic devices project respective screens according to an exemplary embodiment.

FIG. 3B is an example in which the projection image is expanded by four electronic devices according to an exemplary embodiment.

Referring to FIG. 3B, the size of the projection image may be expanded by a factor of about four when an electronic device 100-1, an electronic device 100-2, an electronic device 100-3, and an electronic device 100-4 are used together in comparison with when one electronic device is used.

For example, the electronic device 100-1 is connected with an external device 61, the electronic device 100-2 is connected with an external device 62, the electronic device 100-3 is connected with an external device 63, and the electronic device 100-4 is connected with an external device 64. The electronic device 100-1 may transmit at least some data of screen A received from the external device 61 to the electronic device 100-2, the electronic device 100-3, and the electronic device 100-4. The projection image may be expanded by the electronic device 100-1, the electronic device 100-2, the electronic device 100-3, and the electronic device 100-4 that mutually project screen A received from the external device 61, that is, by the electronic device 100-1 that projects portion A-1 of screen A, the electronic device 100-2 that projects portion A-2 of screen A, the electronic device 100-3 that projects portion A-3 of screen A, and the electronic device 100-4 that projects portion A-4 of screen A.

According to an exemplary embodiment, one electronic device may be connected with a plurality of external devices. As shown in FIG. 3B, electronic devices are connected one-to-one with corresponding external devices. However, for example, the electronic device 100-1 may also be connected with one or more of the external device 61, the external device 62, the external device 63, and the external device 64.

According to an exemplary embodiment, a plurality of electronic devices may be connected with one external device. For example, the plurality of electronic devices 100-1, 100-2, 100-3, and 100-4 may also be connected with any one of the external device 61, the external device 62, the external device 63, and the external device 64.

Figure 3C:
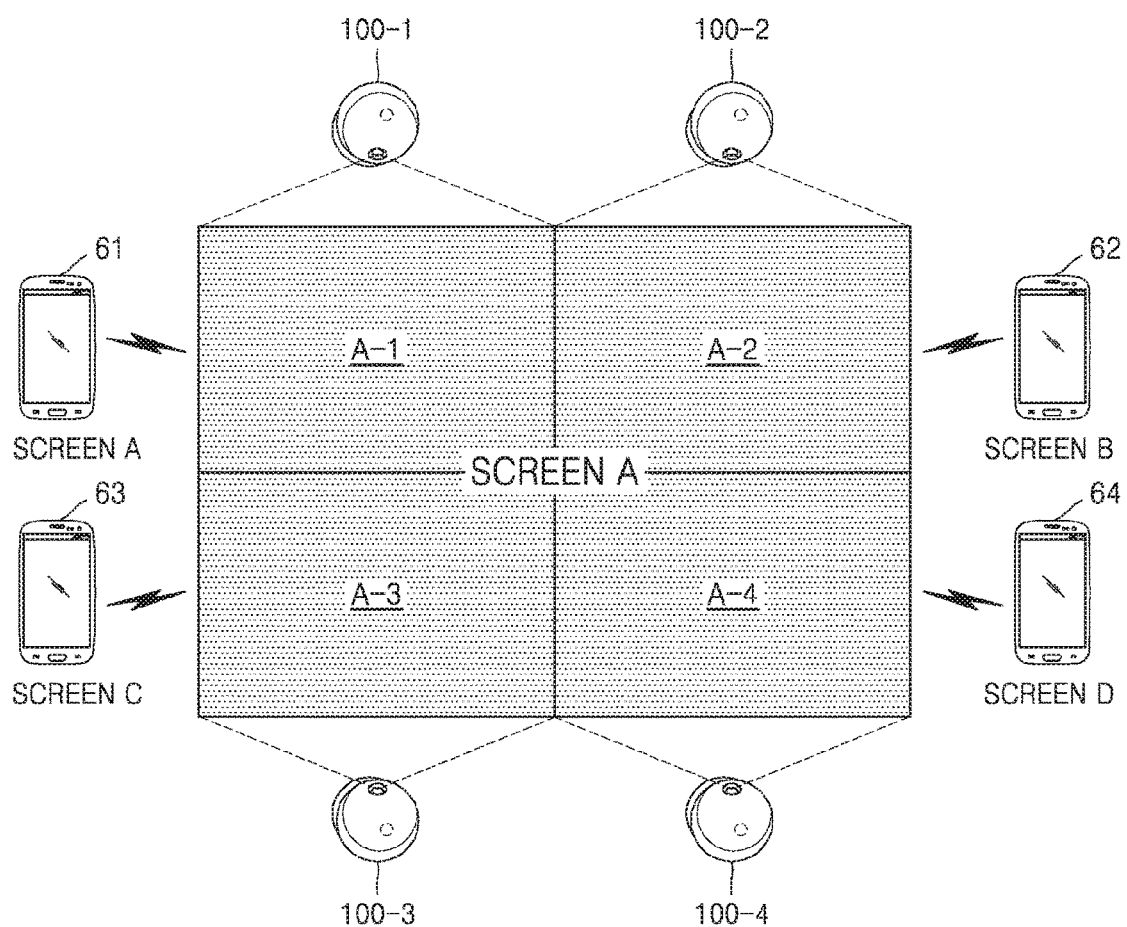
FIG. 3C is an example in which a plurality of electronic devices project respective screens according to an exemplary embodiment.

FIG. 3C is another example in which the projection image is expanded by four electronic devices according to an exemplary embodiment.

Referring to FIG. 3C, the size of the projection image may be expanded by a factor of about four when an electronic device 100-1, an electronic device 100-2, an electronic device 100-3, and an electronic device 100-4 are used together in comparison with when one electronic device is used. According to an expanded example shown in FIG. 3C, like the expanded example shown in FIG. 3B, the projection image is expanded in size by a factor of about four. However, the electronic devices shown in FIG. 3C are arranged in two rows and two columns to expand the size of the projection image, instead of being arranged in one row.

The arrangements shown in FIGS. 3A and 3B are exemplary. It should be fully understood by those skilled in the art that the size of the projection image may be expanded in various ways by using any number of electronic devices together in various setups.

According to one or more exemplary embodiments, electronic devices may implement the expanded projection image by mutually projecting one image and may also respectively project different images.

Figure 3D:
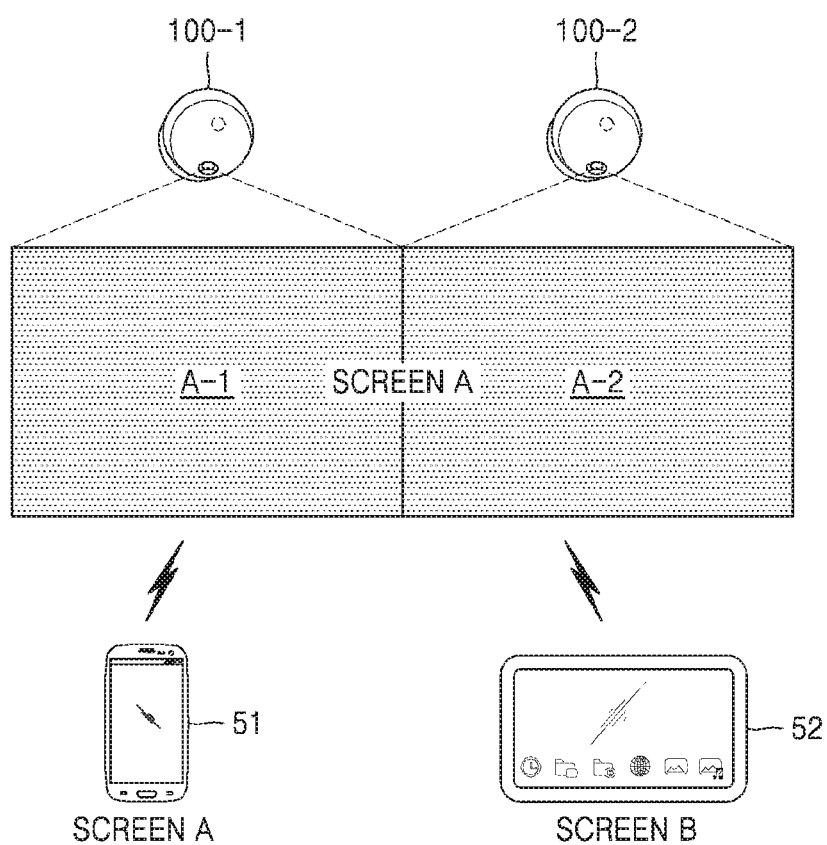
FIG. 3D is an example of expanding one screen using two electronic devices according to an exemplary embodiment.

FIG. 3D is an example in which a plurality of electronic devices project one screen according to an exemplary embodiment.

Referring to FIG. 3D, an electronic device 100-1 is connected with an external device 51, and an electronic device 100-2 is connected with an external device 52. A projection image may be expanded by the electronic device 100-1 and the electronic device 100-2 that mutually project screen A received from the external device 51, that is, by the electronic device 100-1 that transmits at least some data of screen A received from the external device 51 to the electronic device 100-2 and the electronic device 100-2 that projects the received at least some data. In this way, a plurality of electronic devices may mutually project one screen, thus allowing users to enjoy a relatively large screen.

Figure 3E:
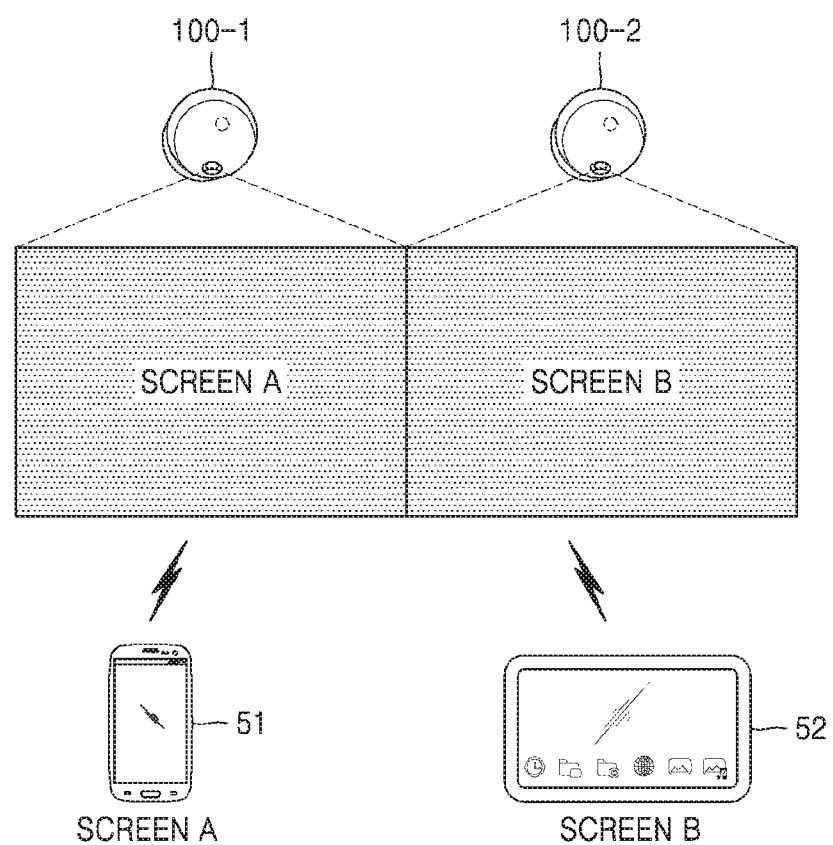
FIG. 3E is an example of projecting different screens using two electronic devices according to an exemplary embodiment.

FIG. 3E is an example in which a plurality of electronic devices respectively project different screens according to an exemplary embodiment.

Referring to FIG. 3E, an electronic device 100-1 is connected with an external device 51, and an electronic device 100-2 is connected with an external device 52. The electronic device 100-1 may project screen A received from the external device 51, and the electronic device 100-2 may project screen B received from the external device 52 connected therewith. In this way, a plurality of electronic devices may respectively project different screens, thus allowing a user of each external device to perform a task while a screen desired by the user is projected through the electronic device of the user. For example, each of a user of the external device 51 and a user of the external device 52 may project a screen in which a file folder is displayed through a corresponding electronic device and may process a file transmission/reception task, etc. For example, each of the user of the external device 51 and the user of the external device 52 projects a PPT screen that he or she is working on through his or her electronic device. While performing a task on the PPT screen, each of the user of the external device 51 and the user of the external device 52 may process a task of moving objects included in his or her PPT screen into the other's PPT screen or moving objects included in the other's PPT screen into his or her PPT screen.

Figure 4:
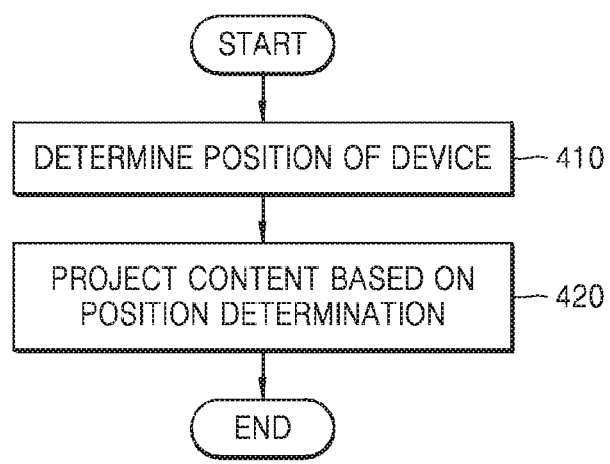
FIG. 4 is a flowchart showing an operation in which an electronic device projects content according to an exemplary embodiment.

FIG. 4 is a flowchart showing an operation in which an electronic device projects content according to an exemplary embodiment.

Referring to FIG. 4, in operation 410, an electronic device 100 determines a position of the electronic device 100.

According to an exemplary embodiment, a processor 110 of the electronic device 100 may use a device position determination module 133 to determine whether the electronic device 100 is positioned on a projection surface.

According to an exemplary embodiment, the processor 110 of the electronic device 100 may use the device position determination module 133 to determine whether the electronic device 100 is positioned within a predetermined distance from the projection surface.

When the device position determination module 133 determines whether the electronic device 100 is positioned on the projection surface or within the predetermined distance from the projection surface, the device position determination module 133 may analyze a sensor value measured by one or more sensors included in a sensor module 140. In this case, an available sensor may use one or more of a proximity sensor 140G, an illumination sensor 140H, a Hall sensor (e.g., a Hall effect IC) 140F, an ultrasonic sensor 140D, an infrared sensor 140E, and a pressure sensor.

In operation 420, the electronic device 100 projects content on the basis of the determination of the position.

According to an exemplary embodiment, the processor 110 of the electronic device 100 controls an optical module 160 to project the content according to the determination of whether the electronic device 100 is positioned on the projection surface. That is, the electronic device 100 projects the content when it is determined that the electronic device 100 is positioned on the projection surface, and does not project the content when it is determined that the electronic device 100 is not positioned on the projection surface. For example, the processor 110 of the electronic device 100 may project the content through the optical module 160 when it is determined that the electronic device 100 is positioned on the projection surface. If it is determined that the electronic device 100 is not positioned on the projection surface, although the electronic device 100 is powered on, the processor 110 of the electronic device 100 may prevent the content from being projected through the optical module 160 by powering off the optical module 160 or the illumination module 161 of the optical module 160. In this way, the electronic device 100 may project the content only when the electronic device 100 is positioned on the projection surface and may not project the content by powering off the optical module 160 that projects the content when the electronic device 100 is not positioned on the projection surface, thus preventing unnecessary power consumption.

According to an exemplary embodiment, when the electronic device 100 is positioned on the projection surface, the projected content may be empty content having no contents.

According to an exemplary embodiment, the content projected when the electronic device 100 is positioned on the projection surface may be content containing a designated message. For example, the designated message may include "<the content is ready to be projected>."

According to an exemplary embodiment, the processor 110 of the electronic device 100 controls the optical module 160 to project the content according to the determination of whether the electronic device 100 is positioned within a predetermined distance from the projection surface. That is, the electronic device 100 projects the content when it is determined that the electronic device 100 is positioned within the predetermined distance from the projection surface, and the electronic device 10 does not project the content when it is determined that the electronic device 100 is not positioned within the predetermined distance from the projection surface. For example, when it is determined that the electronic device 100 is positioned within the predetermined distance from the projection surface, the processor 110 of the electronic device 100 may project the content through the optical module 160. If it is determined that the electronic device 100 is not positioned within the predetermined distance from the projection surface, although the electronic device 100 is powered on, the processor 110 of the electronic device 100 may prevent the content from being projected through the optical module 160 by powering off the optical module 160 or the illumination module 161 of the optical module 160. In this way, the electronic device 100 may project the content when the electronic device 100 is positioned within the predetermined distance from the projection surface and may not project the content by powering off the optical module 160 that projects the content when the electronic device 100 is not positioned within the predetermined distance from the projection surface, thus preventing unnecessary power consumption. In addition, when the electronic device 100 is not positioned on the projection surface but is positioned within the predetermined distance from the projection surface, the electronic device 100 may project content to inform a user of an approximate position of the projection surface in advance when the user positions the electronic device 100, thus providing convenience of use of the electronic device 100.

Figure 5A:
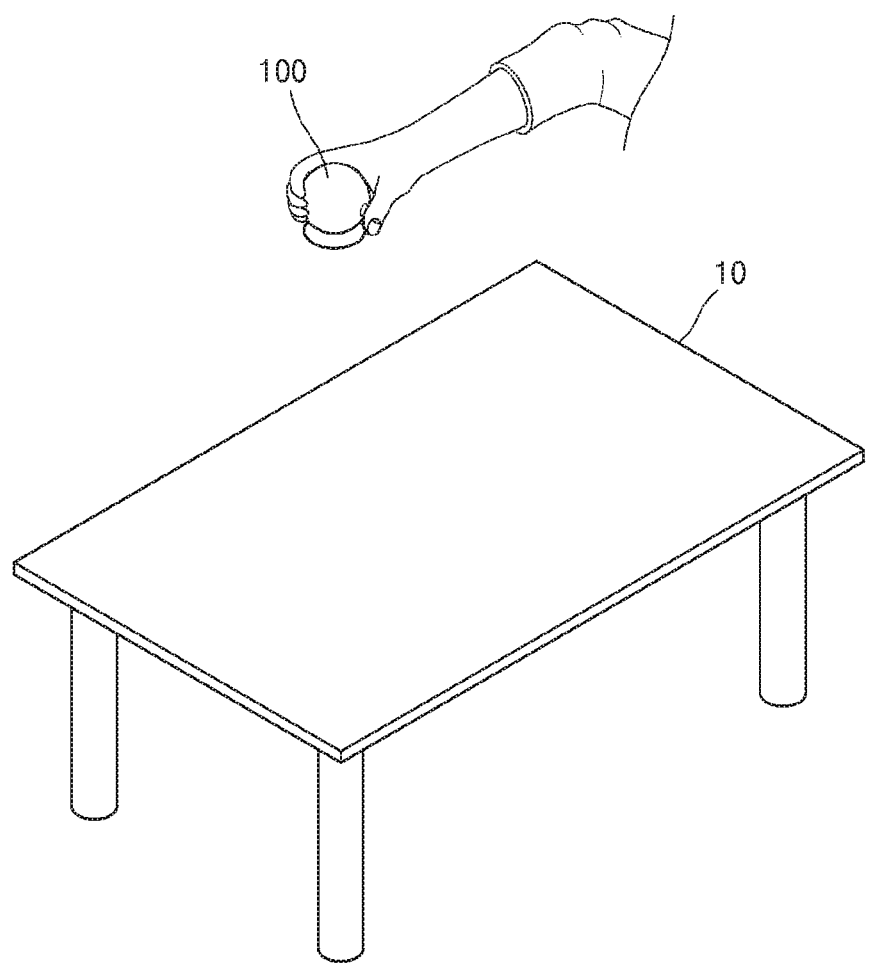
FIGS. 5A to 5C are reference diagrams illustrating an operation in which a processor 110 of the electronic device 100 controls an optical module 160 to project content according to determination of whether the electronic device 100 is positioned on a projection surface or within a predetermined distance from the projection surface according to an exemplary embodiment.
Figure 5B:
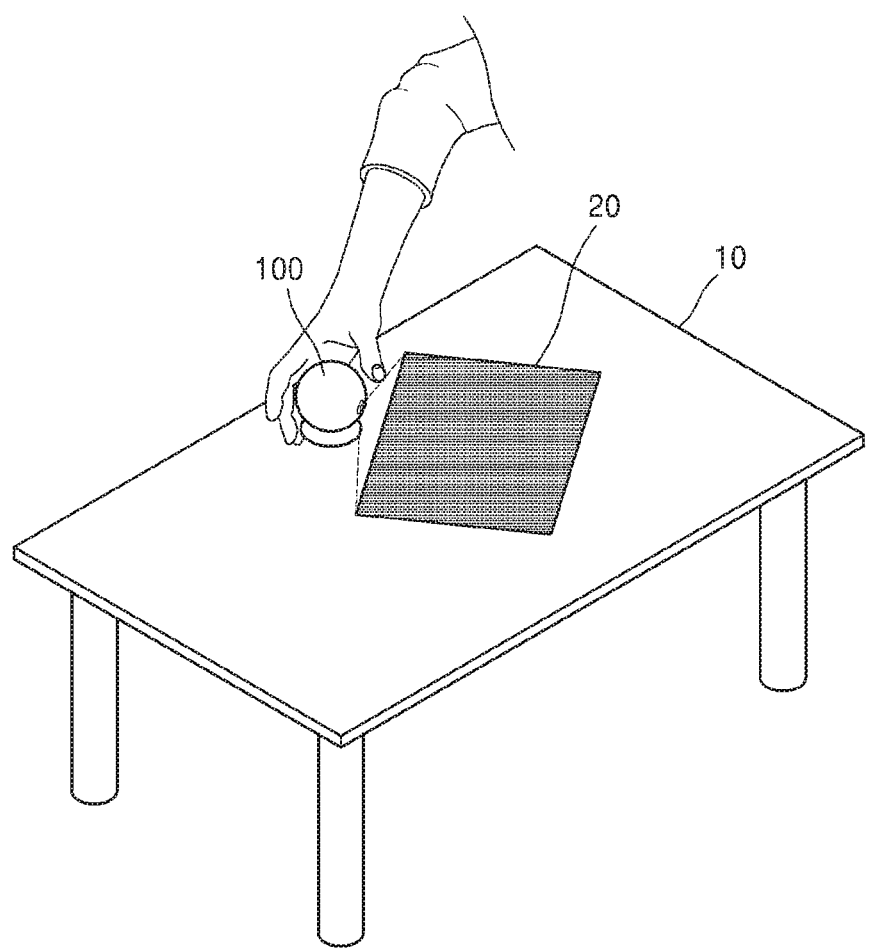
Figure 5C:
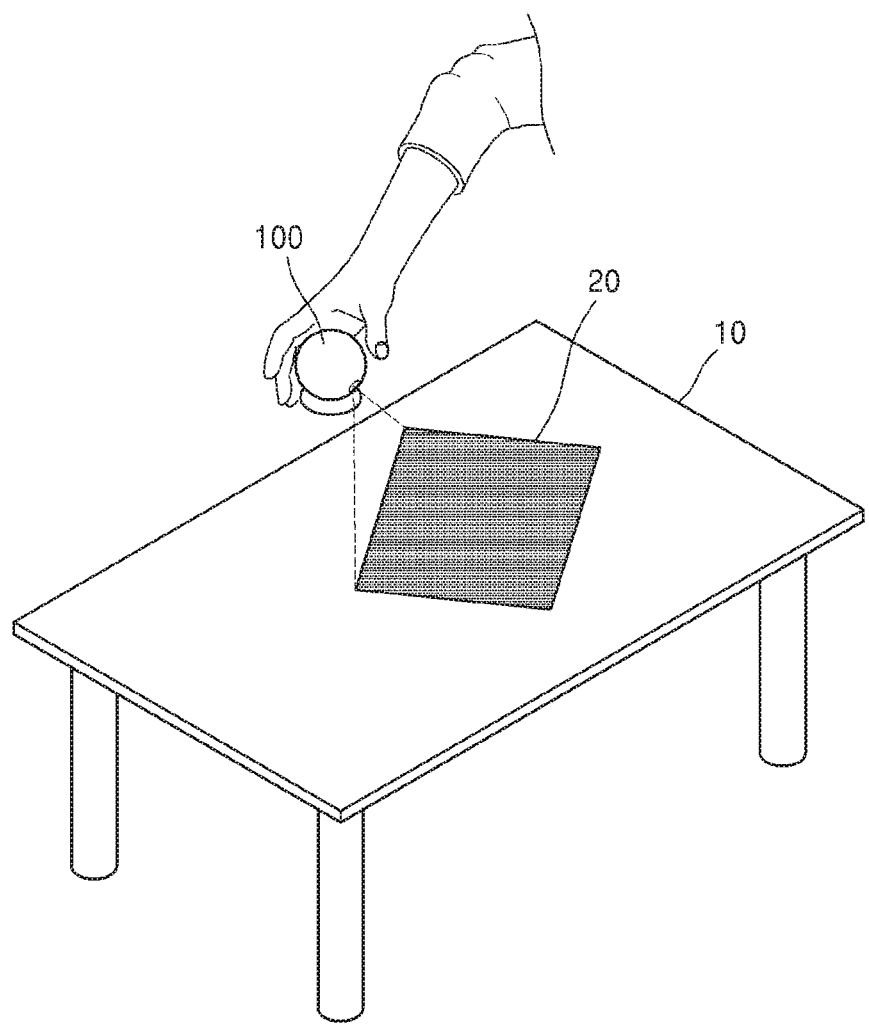

FIGS. 5A to 5C are reference diagrams illustrating an operation in which a processor 110 of the electronic device 100 controls an optical module 160 to project content according to determination of whether the electronic device 100 is positioned on a projection surface or within a predetermined distance from the projection surface according to an exemplary embodiment.

Referring to FIG. 5A, when the electronic device 100 is not positioned on the projection surface, the electronic device 100 does not apply power to an optical module 160 of the electronic device 100 and thus content is not projected.

Referring to FIG. 5B, when the electronic device 100 is positioned on the projection surface, the electronic device 100 also applies power to the optical module 160 of the electronic device 100 to perform projection of the content 20.

Referring to FIG. 5C, when the electronic device 100 is not positioned on a projection surface but positioned within a predetermined distance from the projection surface, the electronic device 100 applies power to an optical module 160 of the electronic device 100 to perform projection of the content 20.

Figure 6:
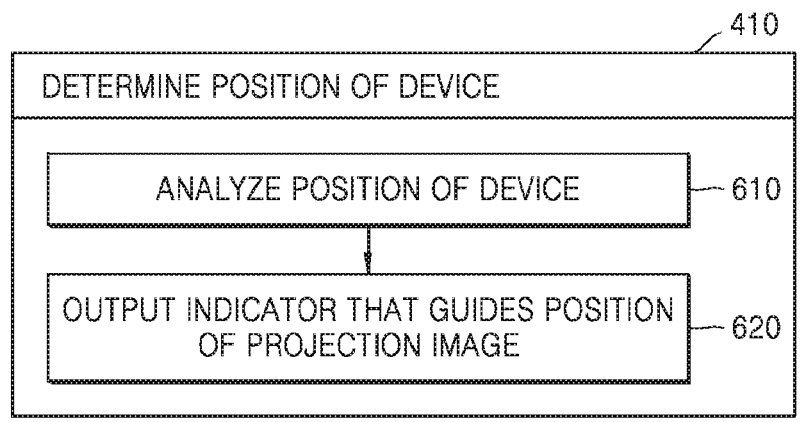
FIG. 6 is a flowchart showing a detailed operation of determining a position of a device shown in FIG. 4 according to an exemplary embodiment.

FIG. 6 is a flowchart showing a detailed operation of determining a position of a device according to an exemplary embodiment.

Referring to FIG. 6, in operation 610, an electronic device 100 analyzes a position of the device.

According to an exemplary embodiment, a processor 110 of the electronic device 100 may use a device position determination module 133 to analyze the position of the electronic device 100. The device position determination module 133 may analyze a sensor value measured by one or more sensors included in a sensor module 140 to analyze the position. That is, to determine whether the electronic device 100 is positioned within a predetermined distance from a projection surface. An available sensor may include one or more of a proximity sensor 140G, an illumination sensor 140H, a Hall sensor (e.g., a Hall effect IC) 140F, an ultrasonic sensor 140D, an infrared sensor 140E, and a pressure sensor. The determined distance from the projection surface may be determined in various ways.

In operation 620, the electronic device 100 outputs an indicator for guiding a position of a projection image.

According to an exemplary embodiment, the processor 110 of the electronic device 100 may use the device position determination module 133 to output the indicator for guiding the position of the projection image.

Figure 7A:
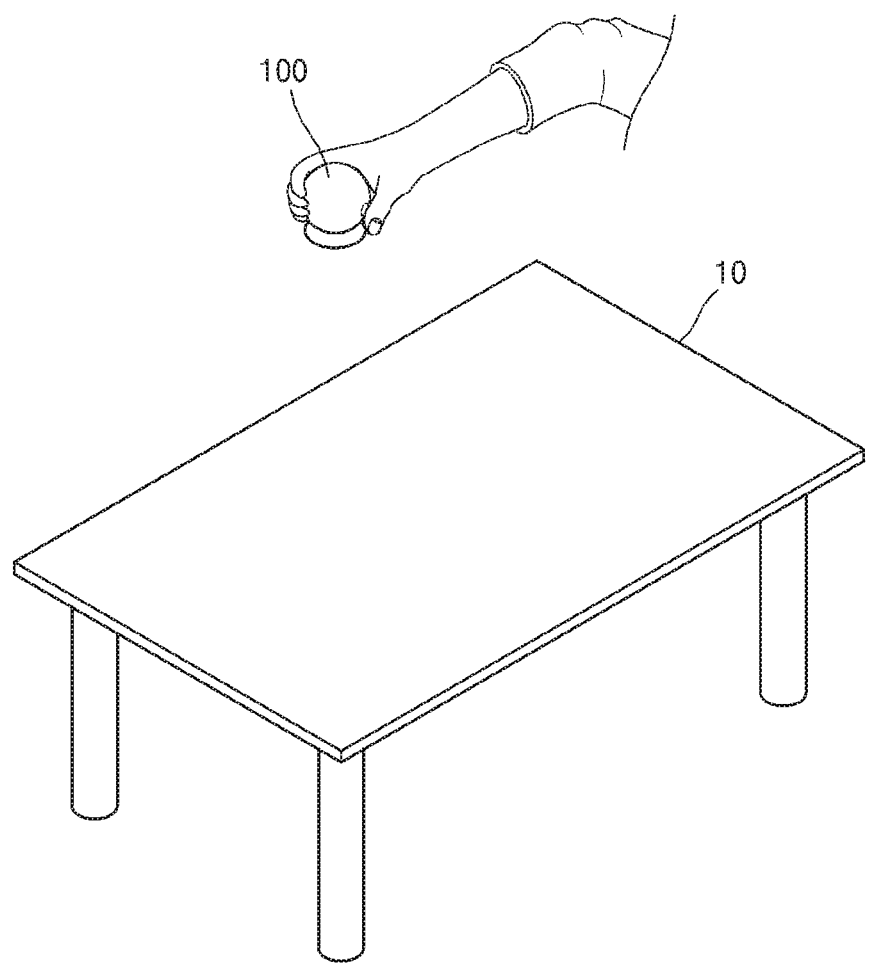
FIGS. 7A to 7D are reference diagrams illustrating an operation in which a processor 110 of an electronic device 100 outputs an indicator for guiding a position of a projection image according to a position analysis of whether the electronic device 100) is positioned within a predetermined distance from a projection surface according to an exemplary embodiment.
Figure 7B:
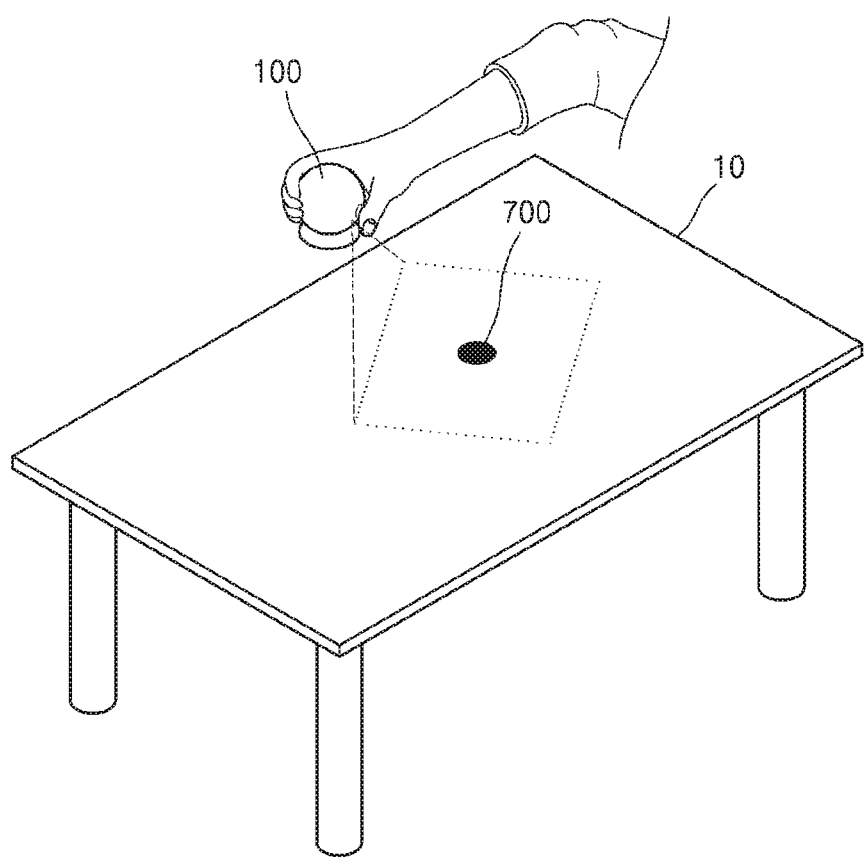
Figure 7C:
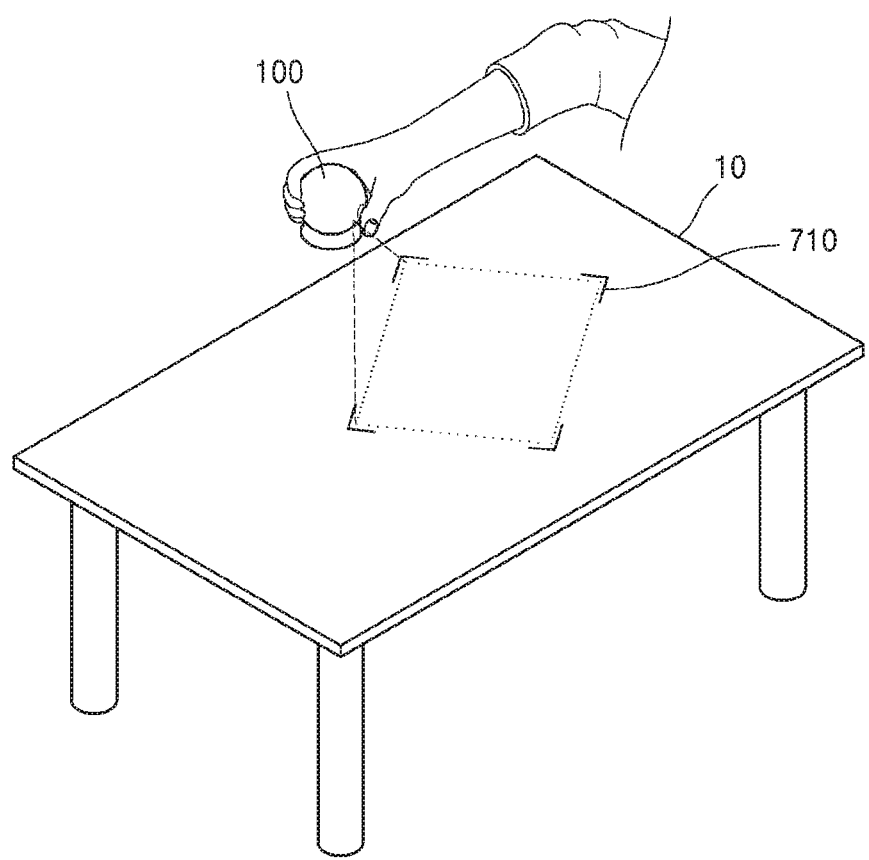

FIGS. 7A to 7C are reference diagrams illustrating an operation in which a processor 110 of an electronic device 100 outputs an indicator for guiding a position of a projection image according to a position analysis of whether the electronic device 100 is positioned within a predetermined distance from a projection surface according to an exemplary embodiment.

Referring to FIG. 7A, when the electronic device 100 is positioned far from the projection surface, i.e., when the electronic device is not positioned within a predetermined distance from the projection surface, the electronic device 100 does not apply power to an optical module 160. Thus content is not projected.

Referring to FIG. 7B, when the electronic device 100 is positioned within a predetermined distance from the projection surface, the electronic device 100 may display a center position 700 of the projection image using, for example, a laser light source to inform a user of a position of the projection image when the user positions the electronic device 100.

Referring to FIG. 7C, when the electronic device 100 is positioned within the predetermined distance from the projection surface, the electronic device 100 may display positions 710 of the four corners of the projection image using, for example, a laser light source.

Figure 7D:
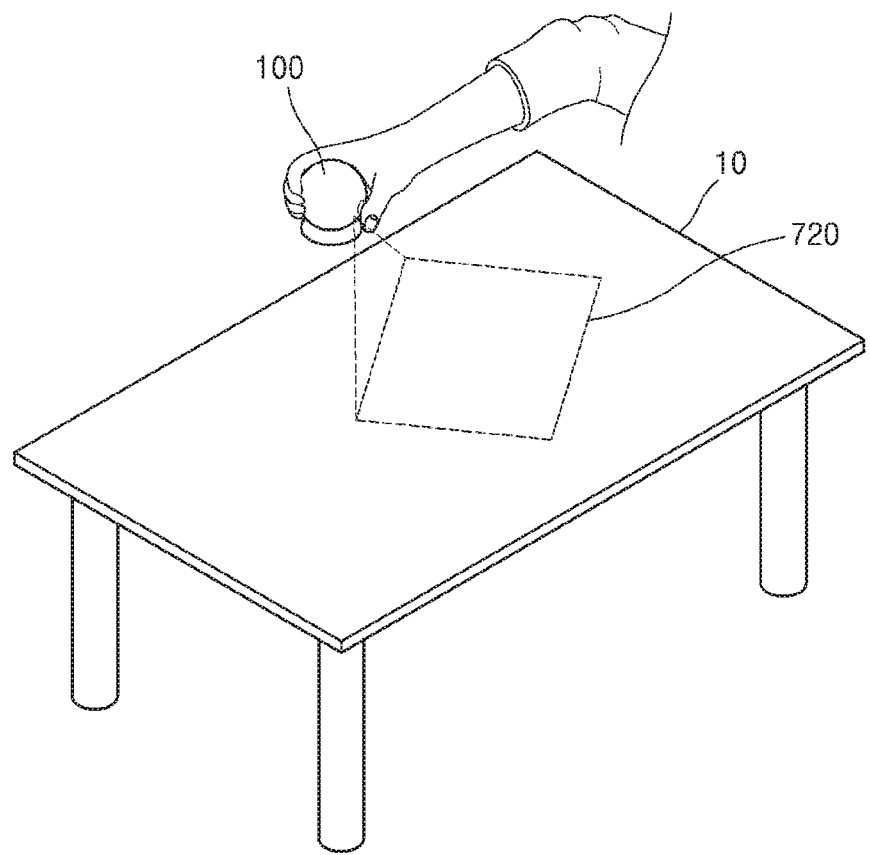

Referring to FIG. 7D, when the electronic device 100 is positioned within the predetermined distance from the projection surface, the electronic device 100 may display a position 720 of an outline of the projection image using, for example, a laser light source or a projection module.

It should be understood by those skilled in the art that a means for informing of a position of the projection image of the electronic device 100 may be determined in various ways.

Figure 8A:
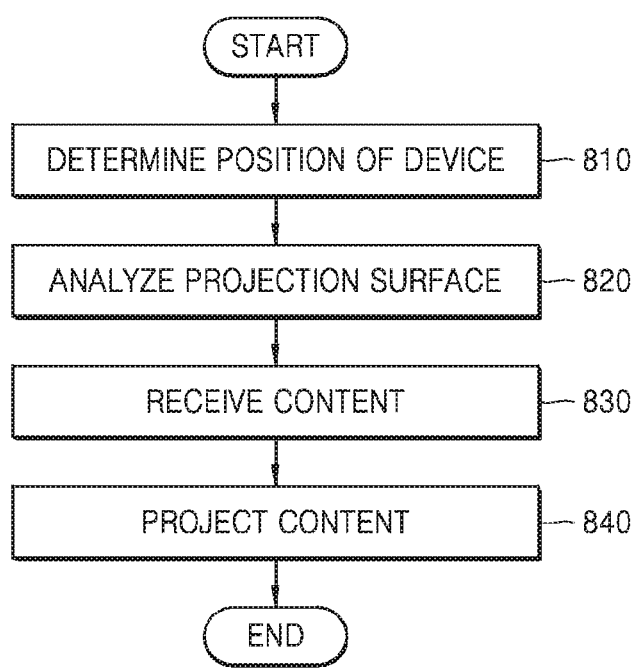
FIG. 8A is a flowchart showing an operation of an electronic device according to an exemplary embodiment.

FIG. 8A is a flowchart showing an operation in which an electronic device projects content according to an exemplary embodiment.

Referring to FIG. 8A, in operation 810, an electronic device 100 determines a position of the electronic device 100.

According to an exemplary embodiment, a processor 110 of the electronic device 100 may use a device position determination module 133 to determine whether the electronic device 100 is positioned on a projection surface or within a predetermined distance from the projection surface. On the basis of the determination, the processor 110 of the electronic device 100 may determine whether to project content through an optical module.

According to an exemplary embodiment, the processor 110 of the electronic device 100 may use a device position determination module 133 to determine the position of the electronic device 100. When the position of the electronic device 100 is not suitable for the projection surface, the processor 110 of the electronic device 100 may output an indicator for instructing to position the electronic device 100 on the projection surface. In addition, when one or more other electronic devices adjacent to the electronic device 100 are recognized, the processor 110 may also output an indicator for instructing to position the electronic device 100 and the other adjacent electronic devices level with one another. The position determination operation of the electronic device will be described below in detail.

In operation 820, the electronic device 100 analyzes a projection surface.

The processor 110 of the electronic device 100 may use a projection surface analysis module 134 to analyze the projection surface of the electronic device 100 and may use direction information or rotation information of the electronic device 100 to correct geometric information or color information of the projection image or rotate the projection image. The projection surface analysis operation of the electronic device will be described below in detail with reference to FIGS. 13 to 21.

In operation 830, the electronic device 100 acquires content.

The processor 110 of the electronic device 100 may acquire content to be projected from at least one of a communication module 120, an interface 170, and a memory 130 and may perform buffering and/or signal decryption on the acquired content to be shown with a projection module using a signal processing module 132.

In operation 840, the electronic device 100 projects the content.

The processor 110 of the electronic device 100 may project content onto the projection surface using a projection module 162.

Below, the position determination operation of the electronic device will be described in detail with reference to FIGS. 8B to 12E.

Figure 8B:
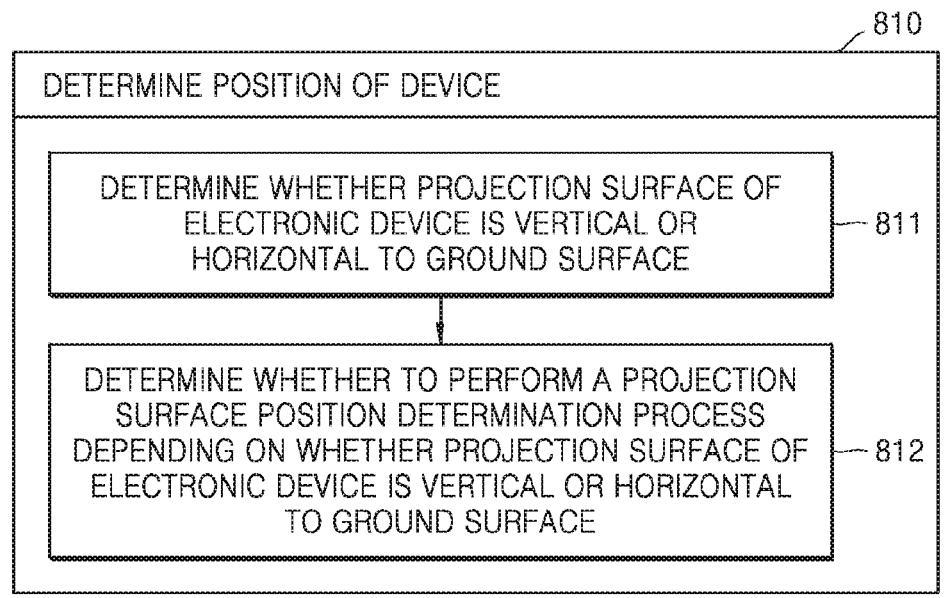
FIG. 8B is a flowchart showing some operations in a position determination process of the device shown in FIG. 8A.

FIG. 8B is a flowchart showing some operations in a position determination process 810 of the device shown in FIG. 8A. The operations shown in FIG. 8B may be included in the device position determination process 810 and may also be regarded as pre-operations performed before the device position determination process 810.

Referring to FIG. 8B, in operation 811, an electronic device 100 determines whether the projection surface of the electronic device is vertical or horizontal to the ground surface.

The processor 110 of the electronic device 100 may use the device position determination module 133 to determine whether the projection surface of the electronic device is vertical or horizontal to the ground surface. When the projection surface of the electronic device is horizontal to the ground surface, this indicates that the electronic device is positioned on a bottom surface. When the projection surface of the electronic device is vertical to the ground surface, this indicates that the electronic device 100 is installed on a wall. The device position determination module 133 may use at least one of a gyro sensor 140B and an acceleration sensor 140C included in a sensor module 140 to determine whether the projection surface of the electronic device 100 is vertical or horizontal to the ground surface.

In operation 812, the electronic device determines whether to perform the projection surface position determination process according to whether the projection surface of the electronic device is vertical or horizontal to the ground surface.

The processor 110 of the electronic device 100 may use the device position determination module 133 to determine whether to perform the projection surface position determination process according to whether the electronic device 100 is positioned on the bottom surface or installed on the wall. If the electronic device 100 is installed on the wall, when a horizontal surface of the projection image is not positioned horizontally to, but is inclined from the ground surface (for example, as shown in FIG. 17B), it may be difficult for a user to be aware of the projection image. When the electronic device 100 is positioned on the bottom surface or on a table, the user easily manipulates and positions the electronic device 100 as the user desires. Accordingly, when the electronic device 100 is installed on the wall, there may be a need for the device position determination. When the electronic device 100 is installed on the bottom surface, there may be a reduced need for the device position determination. Accordingly, in consideration of these points, according to an exemplary embodiment, the device position determination module 133 may not perform the device position determination process when the electronic device 100 is positioned on the bottom surface or the table and may perform the device position determination process when the electronic device 100 is installed on the wall. The operation shown in FIG. 8B is an example, and the position determination of the electronic device may also be performed regardless of whether the electronic device is positioned on the bottom surface or on the wall.

Figure 8C:
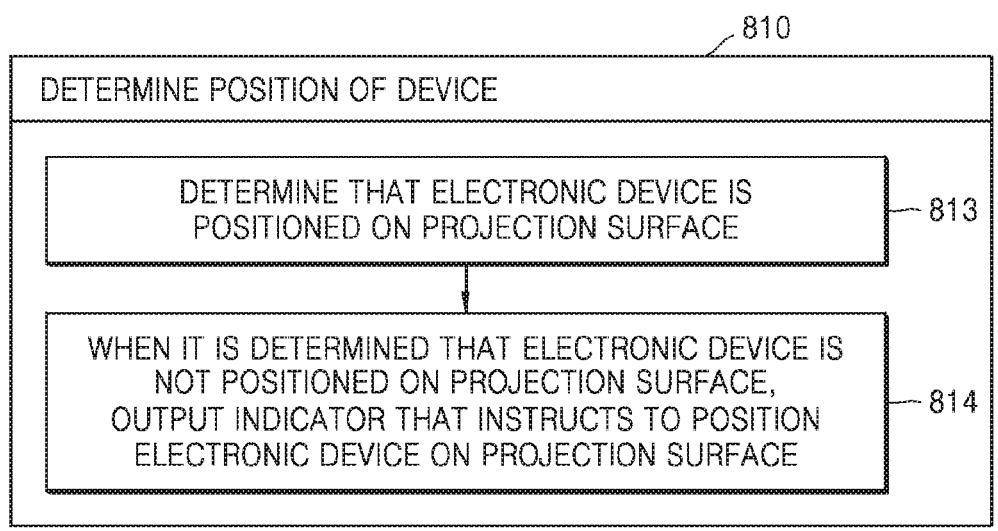
FIG. 8C is a flowchart showing some operations in a position determination process of the device shown in FIG. 8A.

FIG. 8C is a flowchart showing some operations in a position determination process of the device shown in FIG. 8A.

Referring to FIG. 8C, in operation 813, an electronic device 100 determines whether the electronic device is positioned on a projection surface.

The processor 110 of the electronic device 100 may use the device position determination module 133 to determine whether the electronic device 100 is suitably positioned on the projection surface. The device position determination module 133 may use at least one of a gyro sensor 140B and an acceleration sensor 140C included in a sensor module 140 to determine whether the electronic device 100 is suitably positioned on the projection surface, i.e., whether the electronic device 100 is positioned horizontally to the ground surface.

In operation 814, when it is determined that the electronic device 100 is not positioned on the projection surface, the electronic device 100 outputs an indicator for instructing to position the electronic device on the projection surface.

When it is determined by the device position determination module 133 that the electronic device 100 is not positioned on the projection surface. That is, if the electronic device 100 is not positioned horizontally to the ground surface, the processor 110 of the electronic device 100 may output an indicator for instructing to position the electronic device 100 on the projection surface.

The electronic device 100 may use at least one of light, sound, a projection image, and vibration as the indicator for instructing to position the electronic device 100 on the projection surface.

Figure 9A:
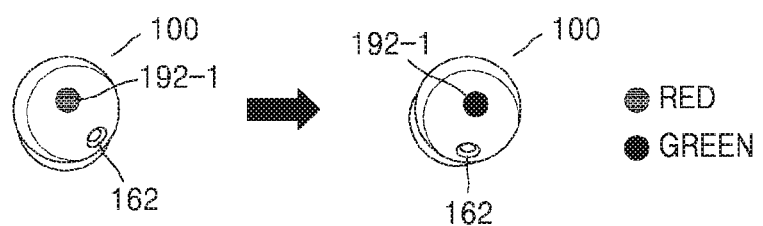
FIG. 9A is a diagram showing an LED color as an example of an indicator for instructing to position an electronic device according to an exemplary embodiment.

FIG. 9A is a diagram showing an example in which light is used as an indicator for instructing to position an electronic device and an LED color is used as an example of the light according to an exemplary embodiment.

Referring to FIG. 9A, an electronic device 100 includes a projection module 162 for projecting content and an LED lamp 192-1 as an exemplary means for providing an indicator for instructing to position the electronic device. The LED lamp 192-1 may use the color of the LED lamp to provide a guide to a user to position the electronic device 100 horizontally. For example, the color of the LED lamp 192-1 may become green when the electronic device 100 is positioned horizontally to the ground surface, and may become red when the electronic device 100 is not positioned horizontally. When the color of the LED lamp 192-1 becomes red after the electronic device 100 is installed, the user may be aware that the electronic device 100 is not positioned horizontally. Accordingly, the user may position the electronic device at a suitable position of the projection surface by adjusting the position of the electronic device 100 such that the color of the LED lamp 192-1 of the electronic device 100 is green.

In FIG. 9A, if the electronic device 100 is not positioned horizontally, the color of the LED lamp 192-1 may be red. When the user positions the electronic device 100 horizontally as shown at the right side of FIG. 9A, the color of the LED lamp 192-1 of the electronic device 100 may become green.

In the above example, the LED color is green when the electronic device 100 is suitably positioned on the projection surface, and the LED color is red when the electronic device 100 is not suitably positioned on the projection surface. However, this is an example, and it should be fully understood by those skilled in the art that other colors may be used as an LED color for representing that the electronic device is suitably positioned on the projection surface and an LED color for representing that the electronic device is not suitably positioned on the projection surface as long as they are distinct from each other.

Furthermore, according to an exemplary embodiment, the electronic device 100 may provide a guide to a user by setting a blinking rate of the LED lamp 192-1 differently in proportion to the degree of how far the electronic device 100 is from horizontality. For example, the electronic device 100 may indicate to the user how far the electronic device 100 is from horizontality by increasing the blinking rate of the LED lamp 192-1 as the electronic device 100 is farther from the horizontal position and by decreasing the blinking rate of the LED lamp 192-1 as the electronic device 100 is closer to horizontality, or vice versa.

Figure 9B:
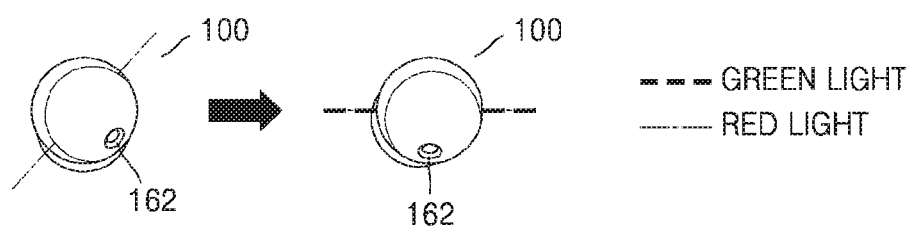
FIG. 9B is a diagram showing a laser LED as an example of an indicator for instructing to position an electronic device according to an exemplary embodiment.

FIG. 9B is a diagram showing an example in which light is used as an indicator for instructing to position an electronic device and a laser is used as an example of the light according to an exemplary embodiment.

Referring to FIG. 9B, an electronic device 100 includes an optical module 160 for projecting content and a light source such as the laser or the LED lamp as an exemplary means for providing an indicator for instructing to position the electronic device. The light source such as the laser or the LED lamp may use a color of laser light emitted from the light source such as the laser or the LED lamp to provide a guide to the user to position the electronic device 100 horizontally. For example, the light source such as the laser or the LED lamp may emit green light when the electronic device 100 is positioned horizontally to the ground surface and may emit red light when the electronic device 100 is not positioned horizontally to the ground surface. When the color of light emitted from the light source such as the laser or the LED lamp becomes red after the electronic device 100 is installed, the user may be aware that the electronic device 100 is not positioned horizontally. Accordingly, the user may position the electronic device 100 at a suitable position of the projection surface by adjusting the position of the electronic device 100 such that the color of laser light emitted from the light source such as the laser or the LED lamp of the electronic device 100 is green.

In FIG. 9B, if the electronic device 100 is not positioned horizontally, the electronic device may emit red light through the light source such as the laser or the LED lamp. In addition, the electronic device 100 may also emit green light for the horizontality to provide a guide for positioning the electronic device 100 horizontally. When the user positions the electronic device 100 horizontally as shown at the right of FIG. 9B, the light source such as the laser or the LED lamp of the electronic device 100 may stop emitting red light and may emit green light.

In the above example, the laser color is green when the electronic device 100 is suitably positioned on the projection surface, and the laser color is red when the electronic device 100 is not suitably positioned on the projection surface. However, this is an example, and it should be fully understood by those skilled in the art that other colors may be used as a laser color for representing that the electronic device is suitably positioned on the projection surface and a laser color for representing that the electronic device is not suitably positioned on the projection surface as long as they are distinct from each other.

Furthermore, according to an exemplary embodiment, the electronic device 100 may provide a guide to a user by a blinking rate of the light source such as the laser or the LED lamp differently in proportion to the degree of how far the electronic device 100 is from horizontality. For example, the electronic device 100 may indicate to the user how far the electronic device 100 is from horizontality by increasing the blinking rate of the light source such as the laser or the LED lamp as the electronic device 100 is farther from horizontality and by decreasing the blinking rate of the laser or the LED lamp as the electronic device 100 is closer to horizontality, or vice versa.

Figure 9C:
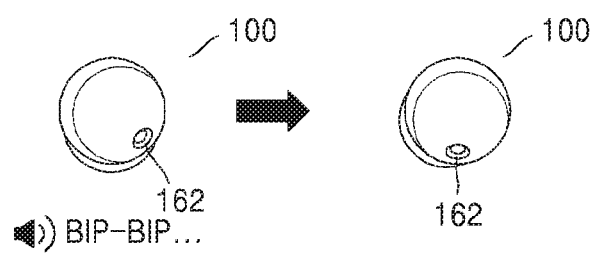
FIG. 9C is a diagram showing a mechanical sound as an example of an indicator for instructing to position an electronic device according to an exemplary embodiment.

FIG. 9C is a diagram showing a mechanical sound as an example of an indicator for instructing to position an electronic device according to an exemplary embodiment.

Referring to FIG. 9C, an electronic device 100 includes a projection module 162 for projecting content and an audio module 180 (see FIG. 2B) as an exemplary means for providing an indicator for instructing to position the electronic device. The audio module 180 may use a mechanical sound to provide a guide to a user to position the electronic device 100 horizontally. For example, the audio module 180 may not output the mechanical sound when the electronic device is positioned horizontally to the ground surface and may output the mechanical sound when the electronic device is not positioned horizontally. When the mechanical sound is output from the electronic device 100 after the electronic device 100 is installed, the user may be aware that the electronic device 100 is not positioned horizontally. Accordingly, the user may position the electronic device at a suitable position of the projection surface by adjusting the position of the electronic device 100 such that the mechanical sound is not output from the electronic device 100.

In FIG. 9C, if the electronic device 100 is not positioned horizontally, a mechanical sound such as <Bip-bip-bip> is output from the electronic device 100. When the user positions the electronic device 100 horizontally as shown at right side of FIG. 9C, the electronic device 100 stops outputting the mechanical sound.

According to an exemplary embodiment, the electronic device 100 may provide a guide to the user by setting a repetition rate of the mechanical sound differently in proportion to the degree of how far which the electronic device 100 is from horizontality. For example, the electronic device 100 may allow the user to be intuitively aware of how far the electronic device 100 is from horizontality by increasing the repetition rate of the mechanical sound as the electronic device 100 is farther from horizontality and by decreasing the repetition rate of the mechanical sound as the electronic device 100 is closer to horizontality.

Figure 9D:
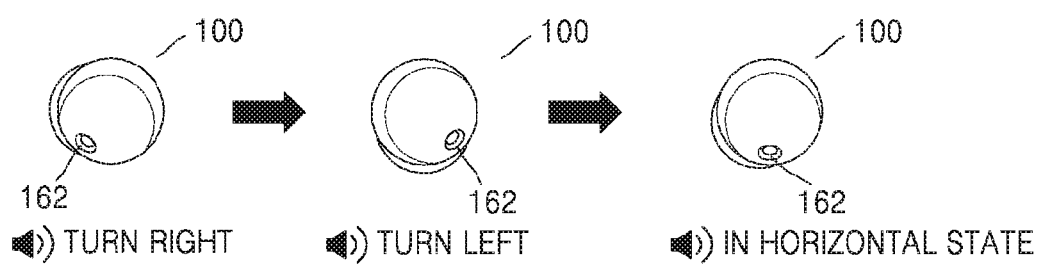
FIG. 9D is a diagram showing a voice guidance sound as an example of an indicator for instructing to position an electronic device according to an exemplary embodiment.

FIG. 9D is a diagram showing a voice guidance sound as an example of an indicator for instructing to position an electronic device according to an exemplary embodiment.

Referring to FIG. 9D, an electronic device 100 includes an optical module 160 for projecting content and an audio module 180 (see FIG. 2B) as an exemplary means for providing an indicator for instructing to position the electronic device. The audio module 180 may use a voice guidance sound to guide a user to position the electronic device 100 horizontally. For example, the audio module 180 may output a voice guidance sound <in horizontal state> when the electronic device 100 is positioned horizontally to the ground surface and may output a voice guidance sound such as <turn right> or <turn left> when the electronic device 100 is not positioned horizontally. When the voice guidance sound such as <turn right> or <turn left> is output from the electronic device 100 after the electronic device 100 is installed, the user may be aware that the electronic device 100 is not positioned horizontally. Accordingly, the user may position the electronic device at a suitable position of the projection surface by adjusting the position of the electronic device 100 such that the voice guidance sound <in horizontal state> is output from the electronic device 100.

In FIG. 9D, if the electronic device 100 is not positioned horizontally, the voice guidance sound such as <turn right> or <turn left> is output from the electronic device 100. When the user positions the electronic device 100 horizontally as shown at right side of FIG. 9D, the electronic device 100 may output a voice guidance sound <in horizontal state>.

In the above example, it should be fully understood by those skilled in the art that a voice guidance message output from the audio module when the electronic device 100 is positioned suitably on the projection surface and a voice guidance message output from the audio module when the electronic device 100 is not positioned suitably may be implemented in various ways.

FIG. 9E is a diagram showing an exemplary guidance image as an example of an indicator for instructing to position an electronic device according to an exemplary embodiment.

Referring to FIG. 9E, an electronic device 100 includes an optical module 160 for projecting content and uses the optical module 160 as an exemplary means for providing an indicator for instructing to position the electronic device. The optical module 160 may use a guidance image to guide a user to position the electronic device 100 horizontally. For example, the optical module 160 may output a guidance image including a message <in horizontal state> when the electronic device 100 is positioned horizontally and may output a guidance image including a message <turn right>, <turn to direction →>, <turn left>, or <turn to direction ←> when the electronic device 100 is not positioned horizontally. When an image such as <turn right> or <turn left> is projected from the electronic device 100 after the electronic device 100 is installed, the user may be aware that the electronic device 100 is not positioned horizontally. Accordingly, the user may position the electronic device at a suitable position of the projection surface by adjusting the position of the electronic device 100 such that a guidance image <in horizontal state> is projected from the electronic device 100.

In FIG. 9E, if the electronic device 100 is not positioned horizontally, a guidance image 910 such as <turn right> or a guidance image 920 such as <turn left> is projected from the electronic device 100. When the user positions the electronic device 100 horizontally as shown at right side of FIG. 9E, the electronic device 100 may output a guidance image 930 <in horizontal state>.

In the above example, it should be fully understood by those skilled in the art that a guidance message of an image that is output by a projection module when the electronic device 100 is positioned suitably on the projection surface and a guidance message that is output when the electronic device 100 is not suitably positioned may be implemented in various ways.

Figure 9F:
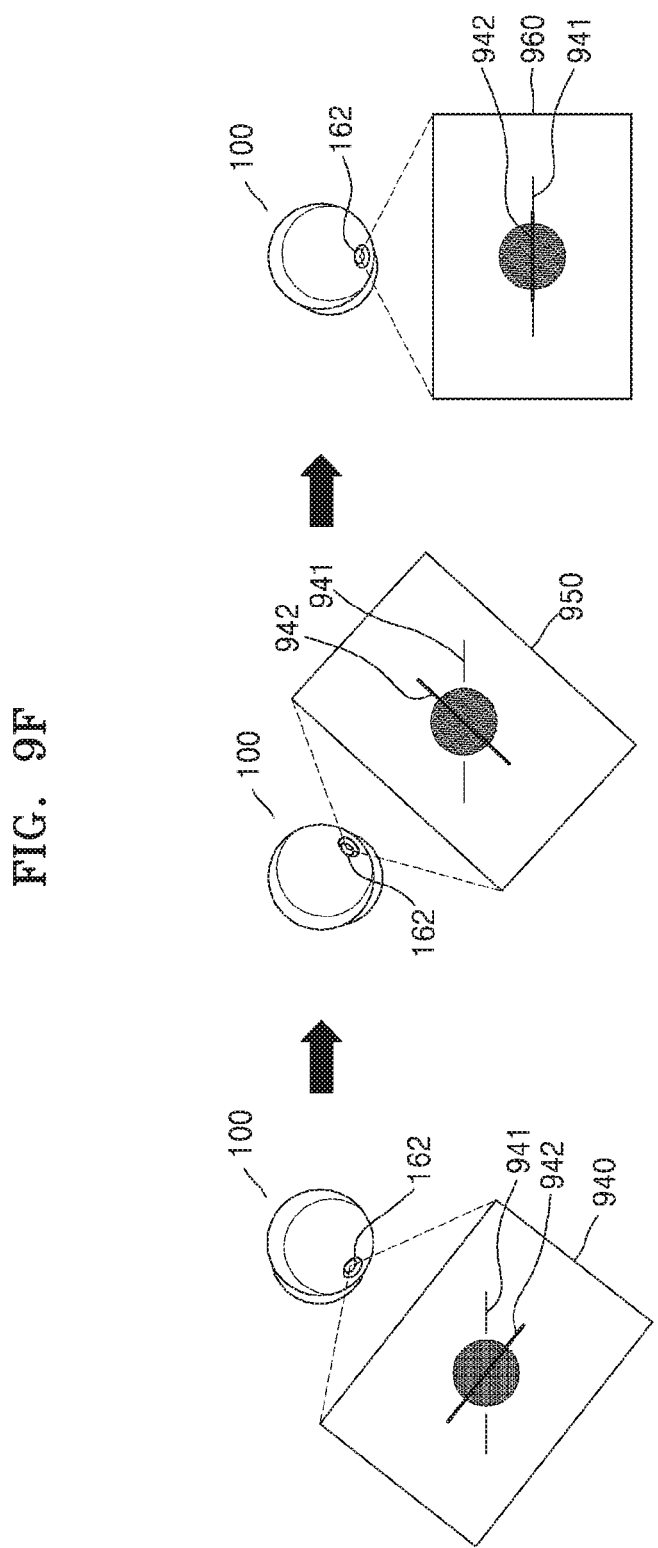
FIG. 9F is a diagram showing another exemplary guidance image as an example of an indicator for instructing to position an electronic device according to an exemplary embodiment.

FIG. 9F is a diagram showing another exemplary guidance image as an example of an indicator for instructing to position an electronic device according to an exemplary embodiment. An example shown in FIG. 9F uses a guidance image including a picture message as an indicator while an example shown in FIG. 9E uses a guidance image including a text message as an indicator.

Referring to FIG. 9F, an electronic device 100 includes an optical module 160 for projecting content and uses the optical module 160 as an exemplary means for providing an indicator for instructing to position the electronic device. The optical module 160 may use a guidance image to provide a guide to a user to position the electronic device 100 horizontally. For example, when the electronic device is not positioned horizontally, the optical module 160 may output an image including a picture in which a guide line 941 for positioning the electronic device horizontally and a line 942 for indicating a current position of the electronic device are shown together. On the other hand, when the electronic device is positioned horizontally, the optical module 160 may output an image including a picture in which the guide line 941 for positioning the electronic device horizontally and the line 942 for indicating the current position of the electronic device are shown to overlap each other. When an image including a picture in which the guide line 941 and the current state line 942 do not match up is projected from the electronic device 100 after the electronic device 100 is installed, the user may be aware that the electronic device 100 is not positioned horizontally. Accordingly, the user may position the electronic device at a suitable position of the projection surface by adjusting the position of the electronic device 100 such that a guidance image including a picture in which the guide line 941 and the current state line 942 overlap each other is projected from the electronic device 100.

In FIG. 9F, if the electronic device 100 is not positioned horizontally, a guidance image 940 or 950 including a picture in which the guide line 941 and the current state line 942 do not match up is projected from the electronic device 100. As shown at right side of FIG. 9F, the electronic device 100 may project a guidance image including a picture in which the degree to which the guide line 941 and the current state line 942 do not match up with each other is reduced when the user positions the electronic device 100 almost horizontally and may output a guidance image 960 in which the guide line 941 and the current state line 942 are shown to overlap each other when the user positions the electronic device 100 horizontally. In this way, by performing the projection corresponding to the degree to which the guide line 941 and the current state line 942 do not match up according to the position adjustment of the electronic device 100 of the user, the user may check a projection image that represents a relation between the guide line 941 and the current state line 942 according to the position adjustment, and thus may intuitively and easily position the electronic device 100.

Figure 9G:
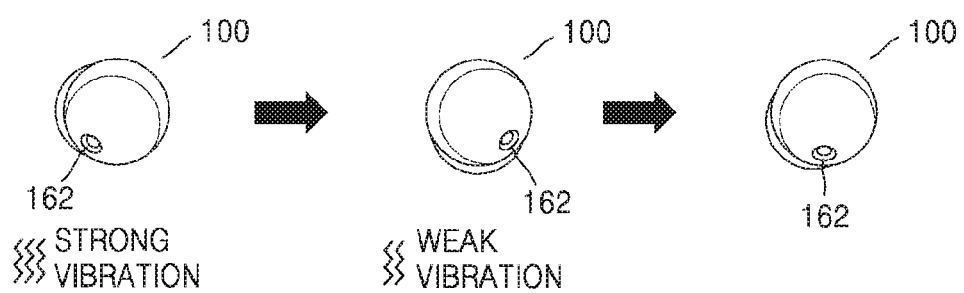
FIG. 9G is a diagram showing vibration as an example of an indicator for instructing to position an electronic device according to an exemplary embodiment.

FIG. 9G is a diagram showing vibration as an example of an indicator for instructing to position an electronic device according to an exemplary embodiment.

Referring to FIG. 9G, an electronic device 100 includes an optical module 160 for projecting content and uses a motor 193 as an exemplary means for providing an indicator for instructing to position the electronic device. The motor 193 may use vibration to guide a user to position the electronic device 100 horizontally. For example, the motor 193 outputs the vibration when the electronic device is not positioned horizontally, and stops outputting the vibration when the electronic device is positioned horizontally. When the vibration is output from the electronic device 100 after the electronic device 100 is installed, the user may be aware that electronic device 100 is not positioned horizontally. Accordingly, the user may position the electronic device at a suitable position of the projection surface by adjusting the position of the electronic device 100 such that the electronic device 100 stops outputting the vibration.

In FIG. 9G, if the electronic device 100 is not positioned horizontally, vibration is output from the electronic device 100. In addition, according to an exemplary embodiment, the electronic device 100 may output strong vibration when the electronic device 100 is far from horizontality and may output weak vibration when the electronic device 100 is close to horizontality. As shown at right side of FIG. 9G, the electronic device 100 may decrease the intensity of the vibration when the user positions the electronic device 100 almost horizontally, and may stop outputting the vibration when the user positions the electronic device 100 horizontally. In this way, by setting the intensity of the vibration differently depending on the position of the electronic device 100 of the user, the user may check how close the electronic device 100 is to horizontality according to his or her position and thus may intuitively and easily position the electronic device 100 horizontally.

According to an exemplary embodiment, when it is determined by the device position determination module 133 that the electronic device 100 is not positioned on the projection surface, the electronic device 100 may be positioned on the projection surface by using a hinge structure included in the electronic device 100 to automatically rotate the electronic device 100.

Figure 10:
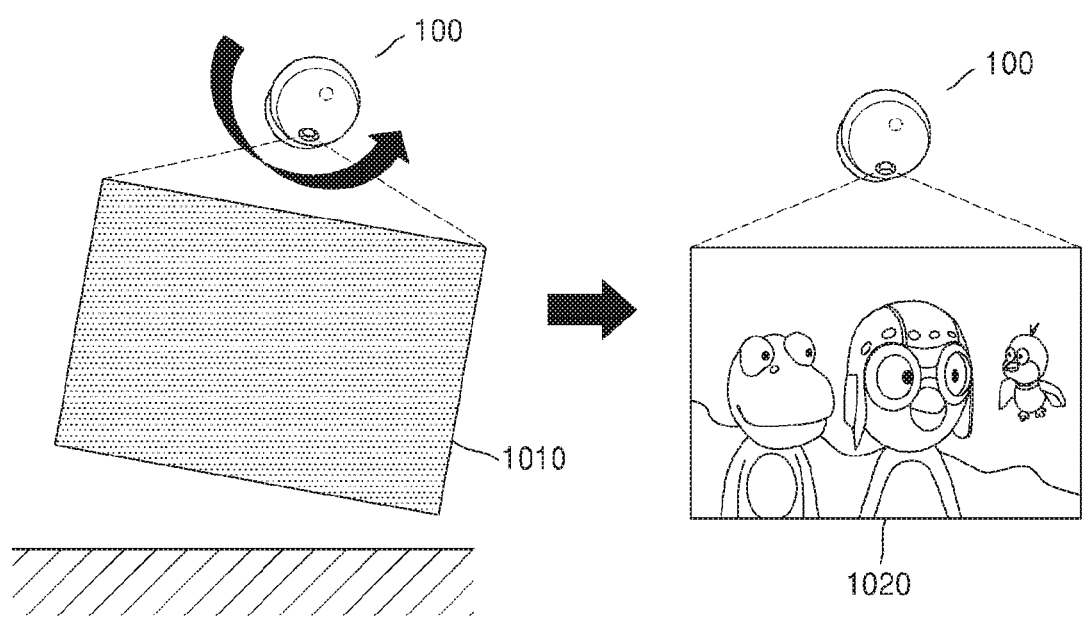
FIG. 10 is a diagram illustrating a concept of automatically rotating an electronic device by using a hinge structure according to an exemplary embodiment.

FIG. 10 is a diagram illustrating a concept of automatically rotating an electronic device by using a hinge structure according to an exemplary embodiment.

Referring to the left side of FIG. 10, an electronic device 100 determines that the electronic device 100 is not positioned on a projection surface 1010 because the projection surface 1010 is not positioned horizontally to the ground surface.

When it is determined that the electronic device 100 is not positioned on the projection surface, the electronic device 100 may calculate a rotation angle to position the electronic device 100 horizontally, using a value measured by a gyro sensor 1408 or an acceleration sensor 140C included in a sensor module 140.

Referring to the right side of FIG. 10, the electronic device 100 may be automatically positioned on the projection surface by using the hinge structure to automatically rotate the electronic device 100 by the calculated rotation angle. The electronic device 100 projects an image onto the projection surface 1020 that is set to be horizontal.

According to an exemplary embodiment, the electronic device 100 may be rotated on the basis of rotation information. The hinge structure may be built in the electronic device 100, and thus the electronic device 100 itself may be rotated. Also, the hinge structure may be built in the bottom of the optical module of the electronic device 100, and thus, according to an exemplary embodiment, only the optical module of the electronic device 100 may be rotated.

Figure 11:
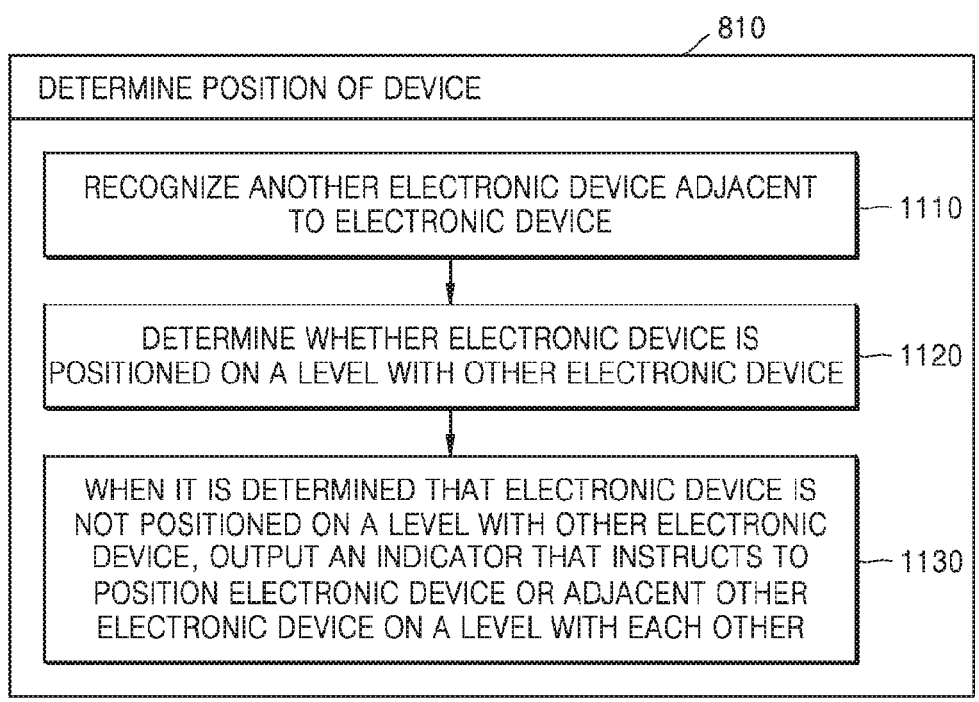
FIG. 11 is a flowchart showing some operations in a position determination process of an electronic device shown in FIG. 6.

FIG. 11 is a flowchart showing some operations in a position determination process of the electronic device shown in FIG. 6.

Referring to FIG. 11, in operation 1110, an electronic device 100 recognizes another electronic device adjacent to the electronic device 100.

The processor 110 of the electronic device 100 may use the device position determination module 133 to recognize the other electronic device adjacent to the electronic device 100. In a method of sensing whether there is an electronic device adjacent to the electronic device 100, signal intensity in wireless communication, or a relative distance measured from an infrared sensor or an ultrasonic sensor may be used.

According to an exemplary embodiment, the device position determination module 133 may use a communication module 120 to measure the signal intensity in the wireless communication and may determine that a nearby electronic device is sufficiently adjacent when the signal intensity is equal to or greater than a certain value. Various communication techniques such as Wi-Fi, Bluetooth, or Zigbee may be used for the wireless communication.

According to an exemplary embodiment, the device position determination module 133 may use an infrared sensor 140E or the ultrasonic sensor 140D for measuring the relative distance between the electronic device 100 and the nearby electronic device to measure the relative distance, and may recognize that the nearby electronic device is positioned when the measured relative distance is equal to or less than a threshold value.

In operation 1120, the electronic device 100 determines that the electronic device is positioned on a level with another adjacent electronic device.

The processor 110 of the electronic device 100 may use the device position determination module 133 to determine whether the electronic device is positioned on a level with the other adjacent electronic device. The device position determination module 133 may use at least one of the gyro sensor 140B and the acceleration sensor 140C included in the sensor module 140 to determine whether the electronic device 100 is positioned on a level with the other adjacent electronic device.

In operation 1130, when it is determined that the electronic device 100 is not positioned on a level with the other adjacent electronic device, the electronic device 100 outputs an indicator for instructing to position the electronic device 100 or the other adjacent electronic device on a level with the other.

When the device position determination module 133 determines that the electronic device 100 is not positioned on a level with the other adjacent electronic device, the processor 110 of the electronic device 100 may output an indicator for instructing to position the electronic device 100 or the other adjacent electronic device level with the other.

The electronic device 100 may use at least one of light, a projection image, and sound as the indicator for instructing to position the electronic device 100 or the other adjacent electronic device on a level with the other. Examples of the indicators that use the light, the sound, and the projection image will be described below.

Figure 12A:
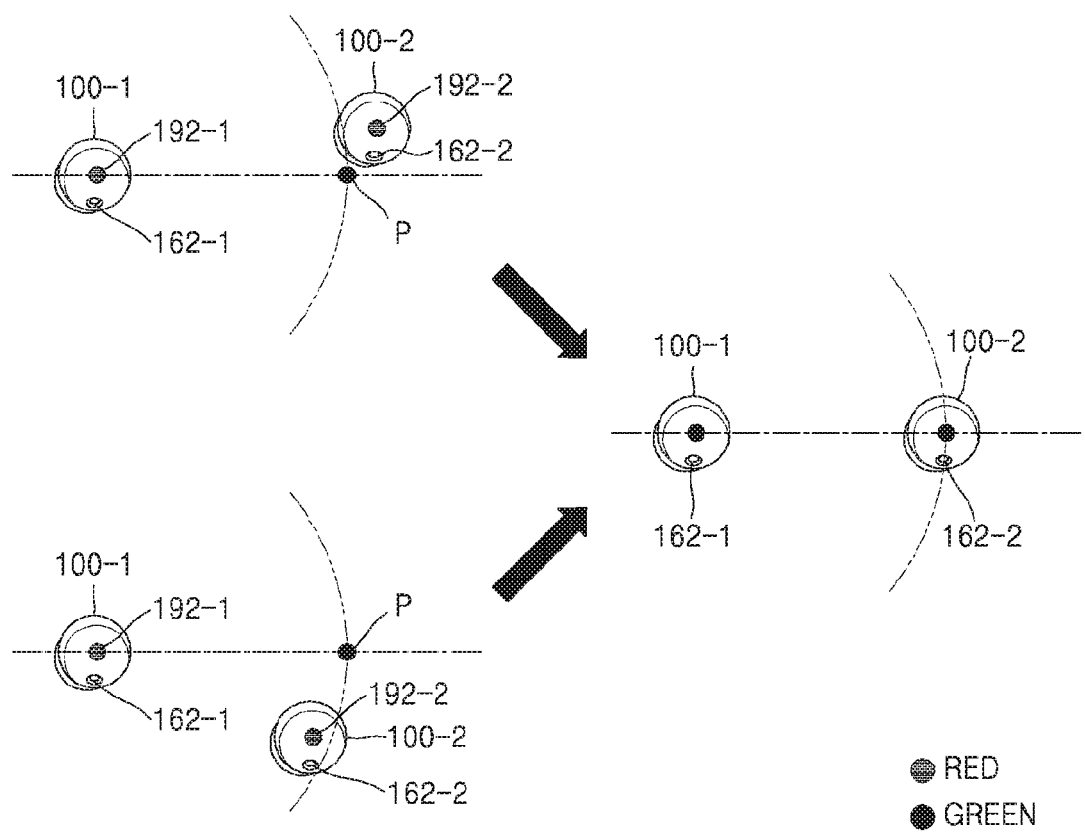
FIG. 12A is a diagram showing an LED color as an example of an indicator for instructing to position an electronic device according to an exemplary embodiment.

FIG. 12A is a diagram showing an example in which light is used as an indicator for instructing to position an electronic device according to an exemplary embodiment and an LED color is used as an example of the light.

Referring to FIG. 12A, an electronic device 100-1 includes a projection module 162-1 for projecting content and an LED lamp 192-1 as an exemplary means for providing an indicator for instructing to position the electronic device. An electronic device 100-2 includes a projection module 162-2 for projecting content and an LED lamp 192-2 as an exemplary means for providing an indicator for instructing to position the electronic device. The LED lamp 192-1 or 192-2 may use the color of the LED lamp to guide a user to position the electronic device 100-1 or 100-2 on a level with the other. For example, the color of the LED lamps 192-1 and 192-2 may become green when the electronic devices 100-1 and 100-2 are positioned on a level with each other and may become red when the electronic devices 100-1 and 100-2 are not positioned on a level with each other. When the colors of the LED lamps 192-1 and 192-2 become red after the electronic device 100-1 or 100-2 are installed, the user may be aware that the electronic devices 100-1 and 100-2 are not positioned on a level with each other. Accordingly, the user may position the electronic devices 100-1 and 100-2 on a level with each other by adjusting the position of the electronic device 100-1 or 100-2 such that the LED lamp 192-1 of the electronic device 100-1 and the LED lamp 192-2 of the electronic device 100-2 are green.

In FIG. 12A, if the electronic devices 100-1 and 100-2 are not positioned on a level with each other, the colors of the LED lamps 192-1 and 192-2 are red. As shown at right side of FIG. 12A, for example, when the user positions the electronic device 100-2 on a level with the electronic device 100-1, that is, when the electronic device 100-2 is positioned at position P, the LED lamps 192-1 and 192-2 of the electronic devices 100-1 and 100-2 may become green. It will be appreciated that the electronic device 100-1 may become on a level with the electronic device 100-2 by moving the electronic device 100-1.

In the above example, the LED color is green when the electronic devices 100-1 and 100-2 are positioned on a level with each other, and the LED color is red when the electronic devices 100-1 and 100-2 are not positioned on a level with each other. However, this is an example, and it should be fully understood by those skilled in the art that other colors may be used as an LED color for representing that the electronic devices are positioned on a level with each other and an LED color for representing that the electronic devices are not positioned on a level with each other.

According to an exemplary embodiment, the electronic device 100 may provide a guide to a user by setting blinking rates of the LED lamps 192-1 and 192-2 in proportion to the degree of how far the electronic devices 100-1 and 100-2 are from being level. For example, the electronic devices 100-1 and 100-2 may allow the user to be intuitively aware of how far the electronic devices 100-1 and 100-2 are from being level by increasing the blinking rates of the LED lamps 192-1 and 192-2 as the electronic devices 100-1 and 100-2 are farther from being level and by decreasing the blinking rates of the LED lamps 192-1 and 192-2 as the electronic devices 100-1 and 100-2 are closer to being level, and vice versa.

Figure 12B:
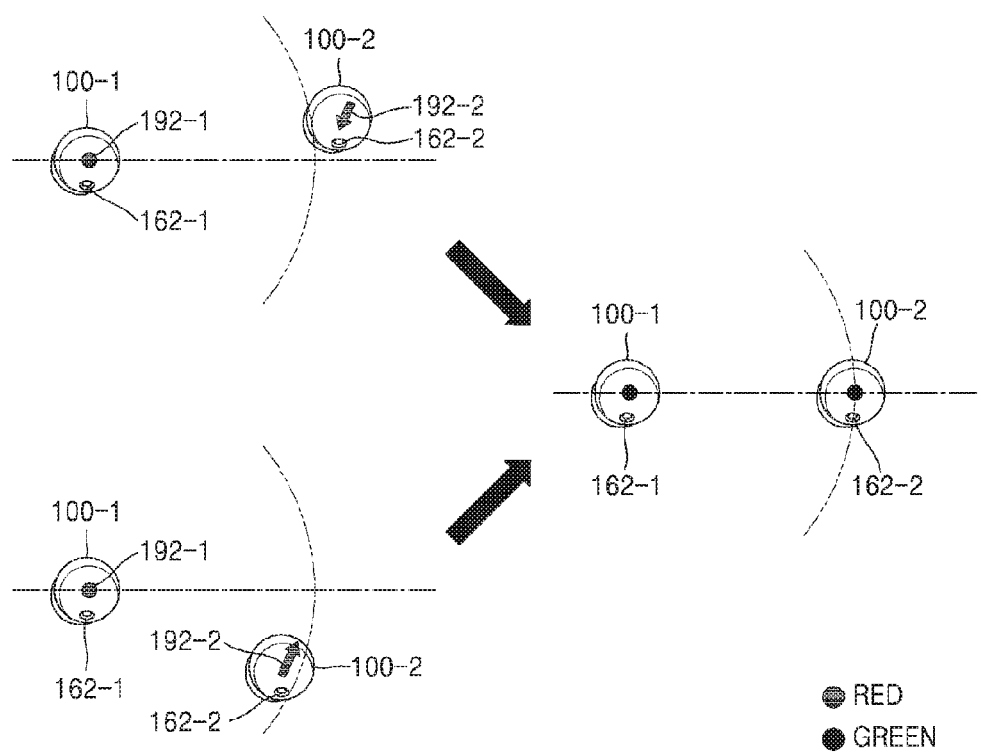
FIG. 12B is a diagram showing an LED color and an arrow length as an example of an indicator for instructing to position an electronic device according to an exemplary embodiment.

FIG. 12B is a diagram showing an example in which light is used as an indicator for instructing to position an electronic device and an LED color and an LED light form are used as an example of the light according to an exemplary embodiment.

According to an exemplary embodiment, the LED light form is further used to instruct a user to position the electronic device. That is, while the LED lamp shown in FIG. 12A outputs light in the form of one dot, the LED lamp shown in FIG. 12B may have a plurality of LED light sources and output light in various forms using one or more of the plurality of LED light sources. The plurality of LED light sources may be arranged in the form of a 3×3 square and may also be arranged in the form of a concentric circle with three lines.

The LED lamp 192-1 or 192-2 may use the color of the LED lamp or the form of light emitted from the LED lamp to guide a user to position the electronic device 100-1 or 100-2 on a level with the other. For example, the light emitted from the LED lamps 192-1 and 192-2 may be represented as a green dot when the electronic devices 100-1 and 100-2 are positioned on a level with each other and may be represented as a red dot or a red arrow when the electronic devices 100-1 and 100-2 are not positioned on a level with each other. In addition, the LED lamps 192-1 and 192-2 may change the length of the arrows in proportion to a distance from which the electronic devices 100-1 and 100-2 are from being level.

In FIG. 12B, if the electronic devices 100-1 and 100-2 are not positioned on a level with each other, the colors of the LED lamps 192-1 and 192-2 are red. One of the two electronic devices 100-1 and 100-2 may be set as a reference electronic device, and the other may be set as an electronic device to be moved. A method of setting one of the two electronic devices as a reference electronic device may be performed in various ways. For example, an electronic device that is first attached or positioned out of the two electronic devices may be set as the reference electronic device. LED lamp light emitted from the reference electronic device among the two electronic devices may be represented as a red dot, and LED lamp light emitted from the other electronic device may be represented as an arrow. In FIG. 12B, the electronic device 100-1 may be set as the reference electronic device and configured to output a red dot to indicate that the electronic device 100-1 is not level with the electronic device 100-2 while the electronic device 100-2 may output light in the form of a red arrow to indicate a position where the electronic device 100-2 is to be positioned to a user. When the user adjusts the position of the electronic device 100-2 such that the electronic device 100-2 is positioned on a level with the electronic device 100-1, the color of the LED lamps 192-1 and 192-2 of the electronic devices 100-1 and 100-2 may be green.

In the above example, the LED color is green when the electronic devices 100-1 and 100-2 are positioned on a level with each other, and the LED color is red when the electronic devices 100-1 and 100-2 are not positioned on a level with each other. However, this is an example, and it should be fully understood by those skilled in the art that other colors may be used as an LED color for representing that the electronic devices are positioned on a level with each other and an LED color for representing that the electronic devices are not positioned on a level with each other.

Figure 12C:
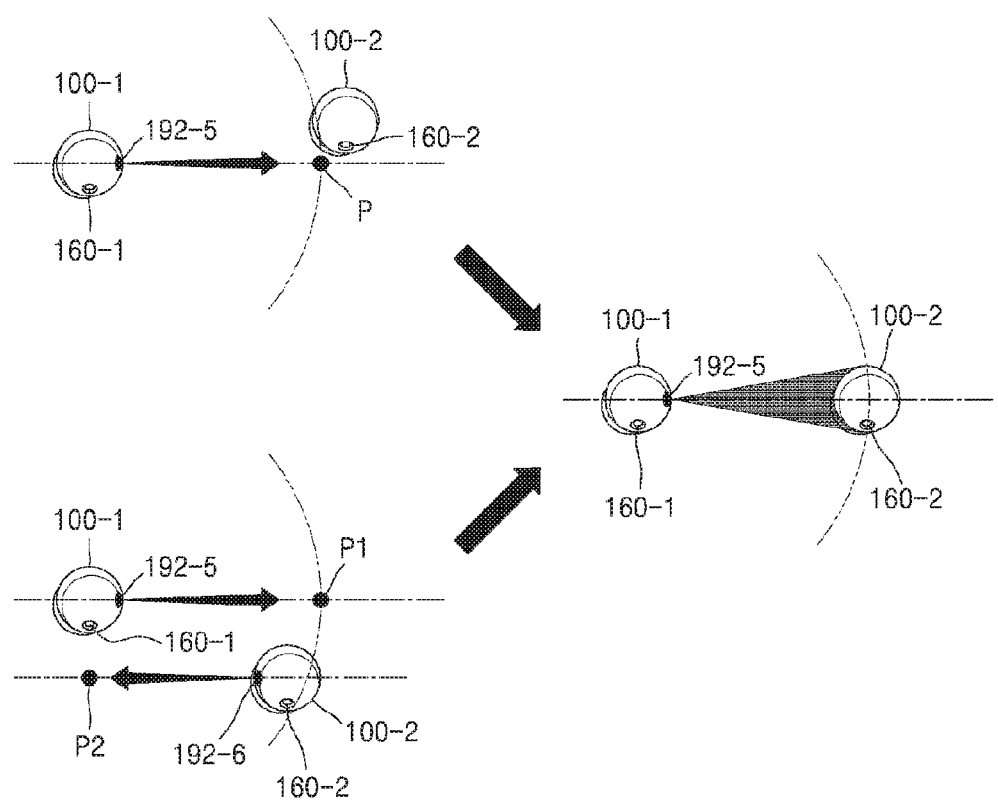
FIG. 12C is a diagram showing a laser LED as an example of an indicator for instructing to position an electronic device according to an exemplary embodiment.

FIG. 12C is a diagram showing an example in which light is used as an indicator for instructing to position an electronic device and a laser is used as an example of the light according to an exemplary embodiment.

Referring to FIG. 12C, an electronic device 100-1 includes an optical module 160-1 and a light source 192-5 such as the laser or the LED lamp as an exemplary means for providing an indicator for instructing to position the electronic device. An electronic device 100-2 includes an optical module 160-2 and a light source 192-6 such as the laser or the LED lamp as an exemplary means for providing an indicator for instructing to position the electronic device.

According to an exemplary embodiment, when a plurality of electronic devices are adjacent to one another, one of the plurality of electronic devices may be set as a reference electronic device, and the reference electronic device may provide a guide for positions where other electronic devices are to be positioned to be on a level with one another. For example, when the electronic devices are not on a level with one another, the reference electronic device out of the plurality of electronic devices may provide a guide for the positions where the electronic devices are to be positioned to be on a level with one another using red light of a light source such as the laser or the LED lamp. On the other hand, when the electronic devices are on a level with one another, the reference electronic device may display that the electronic devices are on a level with one another using green light of the light source such as the laser or the LED lamp.

In FIG. 12C, if the electronic devices 100-1 and 100-2 are not positioned on a level with each other, the reference electronic device 100-1 may display, through a laser 192-5, position P where the electronic device 100-2 is to be positioned to be on a level with the electronic device 100-1.

In the lower left diagram of FIG. 12C, if the electronic devices 100-1 and 100-2 are not positioned to be on a level with each other, the electronic device 100-1 may display, through a light source 192-5 such as the laser or the LED lamp, position P1 where the electronic device 100-2 is to be positioned to be on a level with the electronic device 100-1, and the electronic device 100-2 may display, through a light source 192-6 such as the laser or the LED lamp, position P2 where the electronic device 100-1 is to be positioned to be on a level with the electronic device 100-2. As shown at right side of FIG. 12C, for example, when the user positions the electronic device 100-2 in position P guided by the electronic device 100-1, the electronic device 100-1 may output green laser through the light source 192-5 such as the laser or the LED lamp.

In the above example, the laser color is green when the electronic devices 100-1 and 100-2 are positioned on a level with each other, and the laser color is red when the electronic devices 100-1 and 100-2 are not positioned on a level with each other. However, this is an example, and it should be fully understood by those skilled in the art that other colors may be used as a laser color for representing that the electronic devices are positioned on a level with each other and a laser color for representing that the electronic devices are not positioned on a level with each other.

FIGS. 12D and 12E are diagrams showing an example in which a laser LED and an aspect ratio are used together as an example of an indicator for instructing to position an electronic device according to an exemplary embodiment.

Referring to FIGS. 12D and 12E, an electronic device 100-1 includes an optical module 160-1 and a light source 192-5 such as the laser or the LED lamp as an exemplary means for providing an indicator for instructing to position the electronic device. An electronic device 100-2 includes an optical module 160-2 and a light source 192-6 such as the laser or the LED lamp as an exemplary means for providing an indicator for instructing to position the electronic device.

The reference electronic device among the plurality of electronic devices may use laser to provide a guide about points where the other electronic devices are to be positioned to be on a level with one another. In addition, the reference electronic device may display a plurality of points where the other electronic devices are to be positioned and may project, through the optical module, a guidance image about an aspect ratio that may be configured for each point.

In FIG. 12D, if the electronic devices 100-1 and 100-2 are not positioned on a level with each other, the reference electronic device 100-1 may display, through the light source 192-5 such as the laser or the LED lamp, a plurality of points where the electronic device 100-2 is to be positioned to be on a level with the electronic device 100-1. In an example of FIG. 12D, the electronic device 100-1 emits laser using the light source 192-5 such as the laser or the LED lamp. In this case, the electronic device 100-1 may display two points P3 and P4. As shown at right side of FIG. 12D, for example, when the user positions the electronic device 100-2 in position P4 guided by the electronic device 100-1, the electronic device 100-1 may output green laser through the light source 192-5 such as the laser or the LED lamp and also may project an image including text <16:9> to inform the user that a 16:9 screen may be formed through the arrangement of the electronic devices 100-1 and 100-2.

If the user positions the electronic device 100-2 in position P3 guided by the electronic device 100-1 as shown at left side of FIG. 12E, the electronic device 100-1 may output green laser through the light source 192-5 such as the laser or the LED lamp and also may project an image including text <4:3> to inform the user that a 4:3 screen may be formed through the arrangement of the electronic devices 100-1 and 100-2, as shown at right side of FIG. 12E.

Figure 12F:
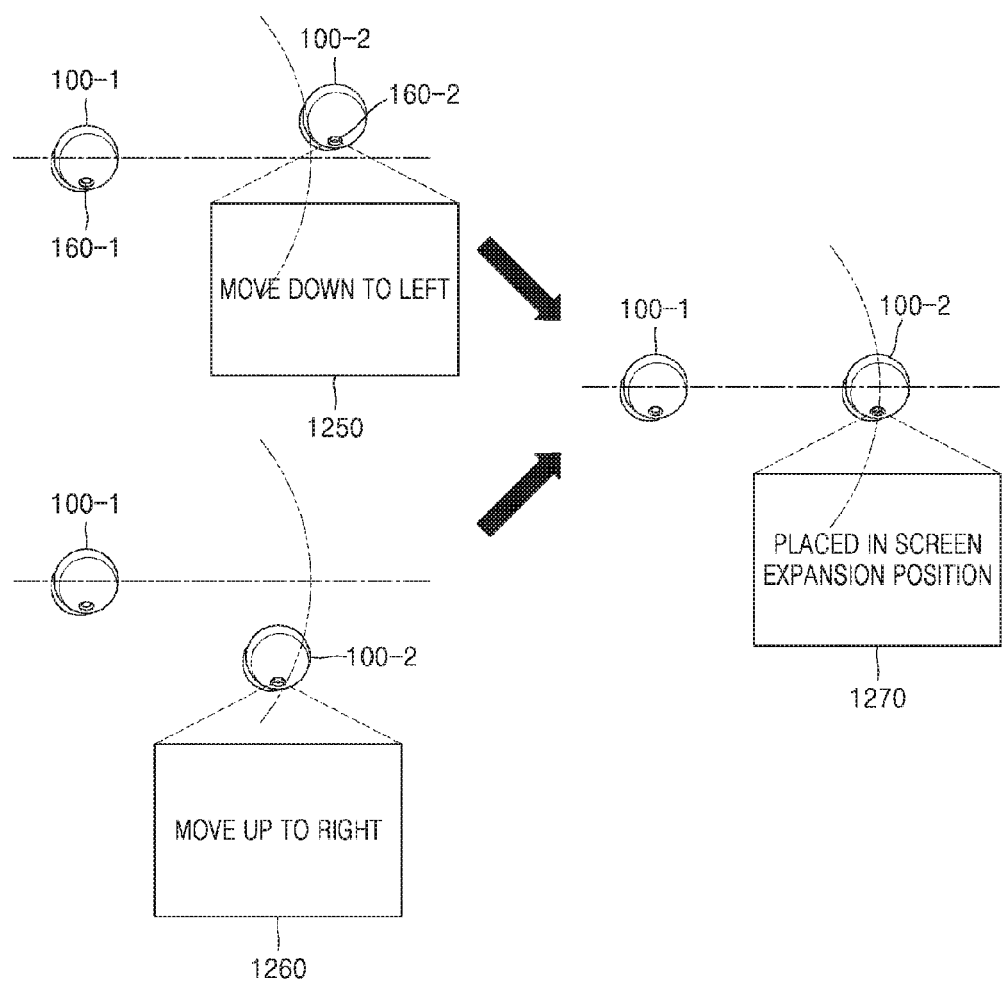
FIG. 12F is a diagram showing a guidance image as an example of an indicator for instructing to position an electronic device according to an exemplary embodiment.

FIG. 12F is a diagram showing a guidance image as an example of an indicator for instructing to position an electronic device according to an exemplary embodiment.

Referring to FIG. 12F, an electronic device 100-1 includes an optical module 160-1 for projecting content and uses the optical module 160-1 as an exemplary means for providing an indicator for instructing to position the electronic device, and an electronic device 100-2 uses an optical module 160-2. The optical module 160-1 and the optical module 160-2 may use a guidance image of a projection image to guide the user to position the electronic device 100-1 or 100-2 on a level with the other. For example, each of the optical module 160-1 and the optical module 160-2 may project an image including a guidance message indicating that the electronic devices 100-1 and 100-2 are positioned on a level with each other when the electronic devices 100-1 and 100-2 are positioned on a level with each other, and may project an image including a guidance message indicating that the electronic devices 100-1 and 100-2 are not positioned on a level with each other when the electronic devices 100-1 and 100-2 are not positioned on a level with each other.

Referring to upper left FIG. 12E, if the electronic devices 100-1 and 100-2 are not positioned on a level with each other, the optical module 160-2 of the electronic device 100-2 may project an image 1250 including a guidance message such as <move down and left> or <move in direction ↓ and direction ←>. Referring to lower left of FIG. 12E, if the electronic devices 100-1 and 100-2 are not positioned on a level with each other, the optical module 160-2 of the electronic device 100-2 may project an image 1260 including a guidance message such as <move up and right> or <move in direction ↑ and direction →>. As shown at right side of FIG. 12E, for example, when the user positions the electronic device 100-2 on a level with the electronic device 100-1, the electronic device 100-2 may project an image 1270 including a guidance message such as <placed in screen expansion position> through the optical module 160-2.

According to an exemplary embodiment, when the device position determination module 133 determines that the electronic device 100 is not positioned horizontally, the electronic device 100 may be positioned on the projection surface by using a hinge structure included in the electronic device 100.

Figure 13:
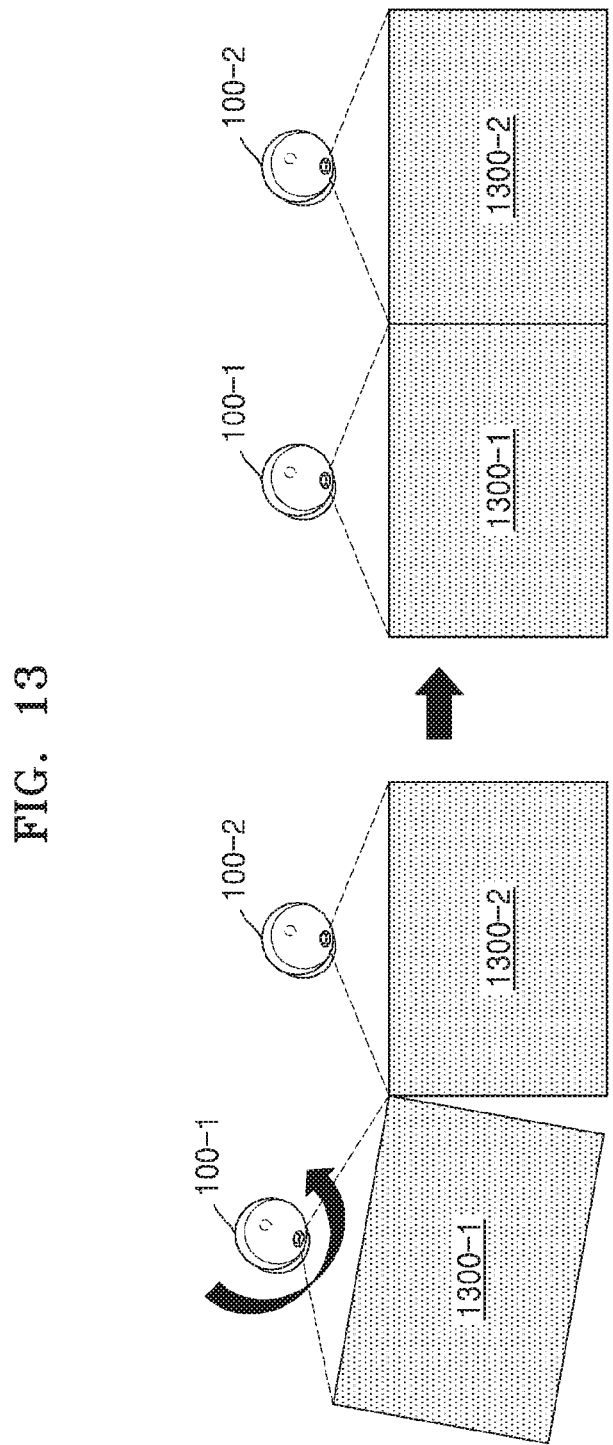
FIG. 13 is a reference diagram illustrating an example of adjusting the horizontality of a plurality of electronic devices by using a hinge structure according to an exemplary embodiment.

FIG. 13 is a reference diagram illustrating an example of adjusting the horizontality of a plurality of electronic devices by using a hinge structure according to an exemplary embodiment.

Referring to left side of FIG. 13, an electronic device 100-1 determines that the electronic device 100-1 is not positioned on a projection surface 1300-1 because the projection surface 1300-1 is not positioned horizontally to the ground surface. When it is determined that the electronic device 100-1 is not positioned on the projection surface, the electronic device 100-1 may calculate a rotation angle to position the electronic device 100 horizontally, using a value measured by a gyro sensor 1408 or an acceleration sensor 140C included in a sensor module 140.

Similarly, an electronic device 100-2 determines that the electronic device 100-2 is not positioned on a projection surface 1300-2 because the projection surface 1300-2 is not positioned horizontally to the ground surface. When it is determined that the electronic device 100-2 is not positioned on the projection surface, the electronic device 100-2 may calculate a rotation angle to position the electronic device 100 horizontally, using a value measured by a gyro sensor 140B or an acceleration sensor 140C included in a sensor module 140.

Referring to the right side of FIG. 13, the electronic device 100-1 may be automatically positioned on the projection surface by using the hinge structure to automatically rotate the electronic device 100-1 by the calculated rotation angle. The electronic device 100-1 may project an image onto the projection surface 1300-1 that is set horizontally.

In this way, when a plurality of electronic devices are adjacent to one another, and at least one of the plurality of electronic devices is not positioned horizontally, a plurality of projection surfaces may be arranged to expand a projection image by rotating the electronic device that is not positioned horizontally using the hinge structure of the electronic device.

Figure 14:
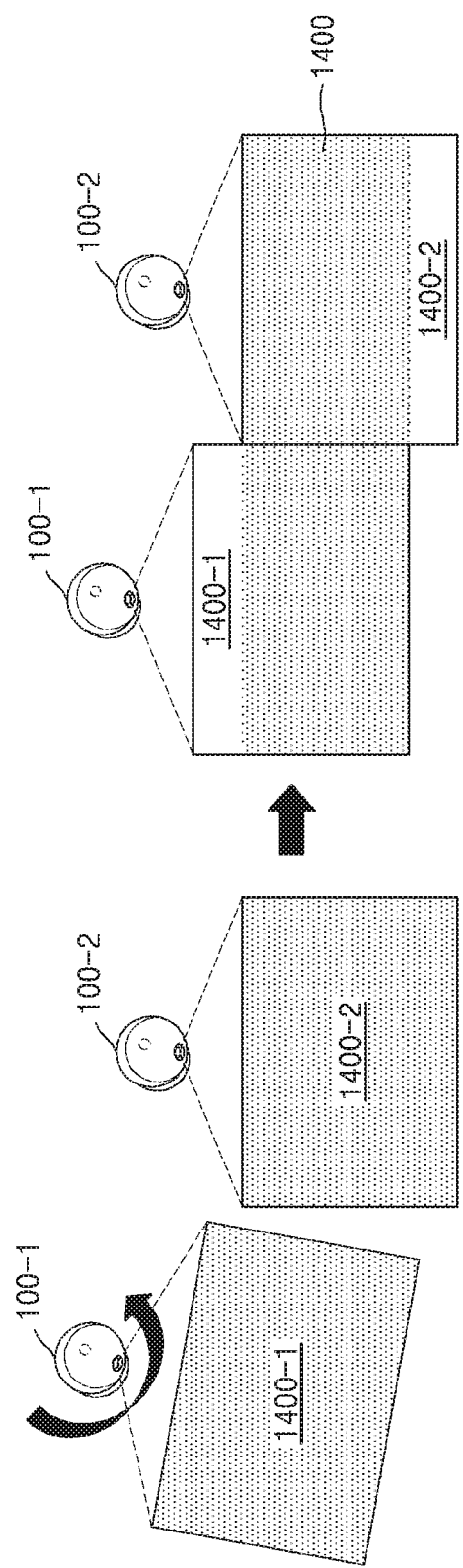
FIG. 14 is a reference diagram illustrating another example of adjusting the horizontality of a plurality of electronic devices by using a hinge structure according to an exemplary embodiment.

FIG. 14 is a reference diagram illustrating an example of adjusting the horizontality of a plurality of electronic devices by using a hinge structure according to an exemplary embodiment.

Referring to the left side of FIG. 14, an electronic device 100-1 determines that the electronic device 100-1 is not positioned on a projection surface 1400-1 because the projection surface 1400-1 is not positioned horizontally to the ground surface. When it is determined that the electronic device 100-1 is not positioned on the projection surface, the electronic device 100-1 may calculate a rotation angle to position the electronic device 100 horizontally, using a value measured by a gyro sensor 140B or an acceleration sensor 140C included in a sensor module 140.

Similarly, an electronic device 100-2 determines that the electronic device 100-2 is not positioned on a projection surface 1400-1 because the projection surface 1400-2 is not positioned horizontally to the ground surface. When it is determined that the electronic device 100-2 is not positioned on the projection surface, the electronic device 100-2 may calculate a rotation angle to position the electronic device 100-2 horizontally, using a value measured by a gyro sensor 140B or an acceleration sensor 140C included in a sensor module 140.

Referring to the right side of FIG. 14, the electronic device 100-1 may be automatically positioned on the projection surface by using the hinge structure to automatically rotate the electronic device 100-1 by the calculated rotation angle. The electronic device 100-1 may project an image onto the projection surface 1400-1 that is set horizontally.

However, as shown at right side of FIG. 14, although the electronic device 100-1 is rotated such that the projection surface of the electronic device 100-1 is horizontal to the ground surface, the projection surface of the electronic device 100-1 may not be arranged level with a projection surface of an adjacent electronic device 100-2. In this case, the electronic device 100-1 and the electronic device 100-2 may project images onto the projection surface 1400-1 and the projection surface 1400-2, respectively.

In addition, when the electronic device 100-1 and the electronic device 100-2 recognize each other, i.e., when the electronic device 100-1 recognizes that there is the electronic device 100-2 in the vicinity of the electronic device 100-1, the electronic device 100-1 may expand the projection image using the projection surface of the electronic device 100-2. In this case, as shown at right side of FIG. 14, the projection surface 1400-1 of the electronic device 100-1 and the projection surface 1400-2 of the electronic device 100-2 may not be appropriately on a level with each other. In this case, at least one of the electronic device 100-1 and the electronic device 100-2 may analyze the projection surface 1400-1 and the projection surface 1400-2 and may determine a region 1400 to be used to expand the projection image from the projection surface 1400-1 and the projection surface 1400-2. Subsequently, the electronic device 100-1 and the electronic device 100-2 may control respective optical modules to project images through the determined region 1400.

According to an exemplary embodiment, when it is determined by a device position determination module that the device is not positioned suitably, the electronic device 100 may enter a sleep mode or a standby mode.

As an example in which the device is not positioned appropriately, there may be a case in which the user carries the electronic device 100 instead of laying the electronic device 100 on a floor or installing the electronic device 100 on a wall.

An example in which the device is not positioned appropriately may include a case in which, when the user may install the electronic device on a wall, the electronic device 100 is not positioned horizontally.

The sleep mode or the standby mode refers to a mode in which an illumination system of an optical module is turned off to not output the projection image. Thus, the battery consumption caused by unnecessarily projecting an image may be reduced.

According to an exemplary embodiment, the electronic device 100 may analyze the projection surface and correct the image using the projection surface analysis module 134.

According to an exemplary embodiment, the electronic device 100 may sense direction information of the electronic device 100 to correct a distorted image. For example, the electronic device 100 may measure the degree to which the electronic device 100 is rotated using an acceleration sensor or a gyro sensor and may correct the projection image.

Because the direction of the optical module of the electronic device 100 is not exactly horizontal but is inclined, an image projected from the optical module is not displayed horizontally. In this case, the electronic device 100 may use rotation information of the electronic device 100 to correct and output only the projection image while leaving the projection surface as it is.

According to an exemplary embodiment, the electronic device 100 may use a camera included in the electronic device 100 to analyze an image projected from the electronic device and correct the image. In addition, according to an exemplary embodiment, a situation in which the electronic device is positioned on the projection surface may be captured using an electronic device including a camera different from that of the electronic device, and the degree to which the projection surface is corrected may be analyzed through the captured image. According to an exemplary embodiment, the electronic device may use a camera module included therein to correct color information and geometric information of the projected surface.

Figure 15:
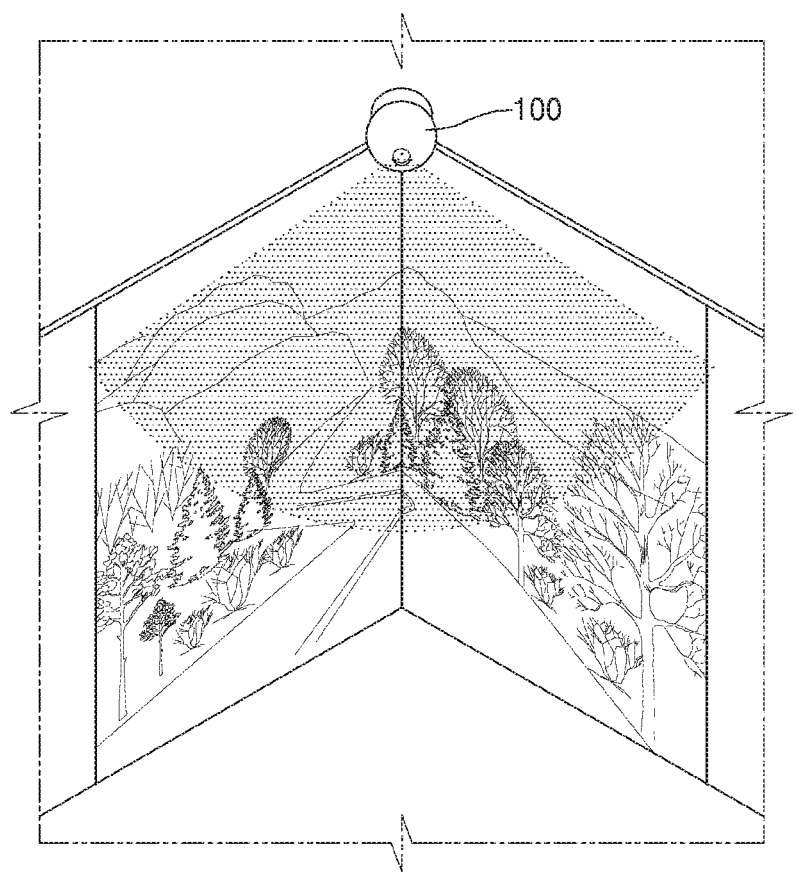
FIG. 15 shows an example of geometric correction among projection surface analyses according to an exemplary embodiment.

FIG. 15 shows an example of geometric correction among projection surface analyses according to an exemplary embodiment.

The geometric correction denotes that an image is corrected in consideration of concave and convex portions when the projection surface geometrically has concave and convex portions.

According to an exemplary embodiment, when the electronic device 100 is attached or hung on a wall and configured to project an image, one or more threshold values may be set for an angle between the ground surface and the projection surface, and the image may be corrected differently depending on each threshold value.

Figure 16:
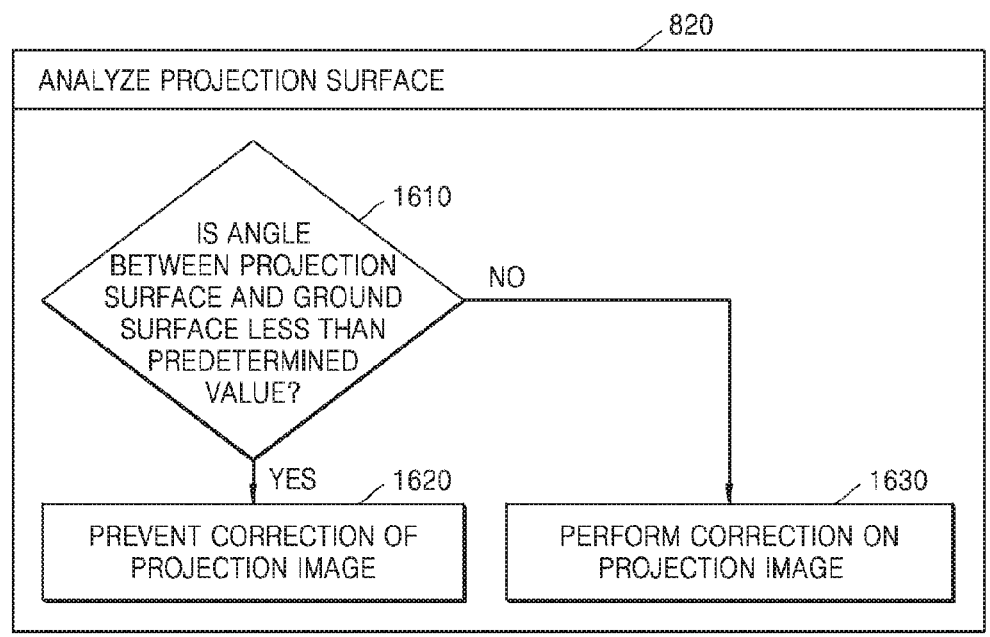
FIG. 16 is a flowchart showing some operations in a projection surface analysis process, according to an exemplary embodiment.

FIG. 16 is a flowchart showing a method of correcting an image differently depending on a rotation degree of the projection surface.

Figure 17A:
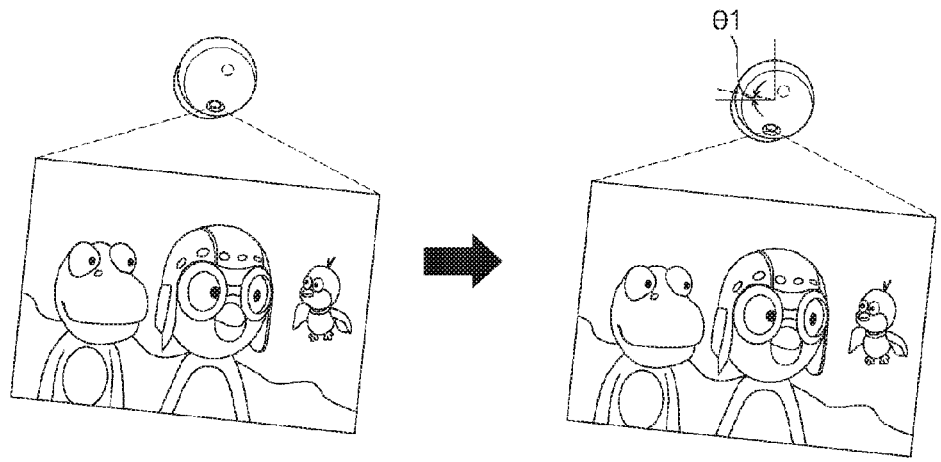
FIGS. 17A to 17C are reference diagrams illustrating an example in which correction is not performed when an angle between an electronic device and a ground surface is equal to or less than a first threshold value and correction is performed when the angle is greater than a second threshold value according to an exemplary embodiment shown in FIG. 14.
Figure 17B:
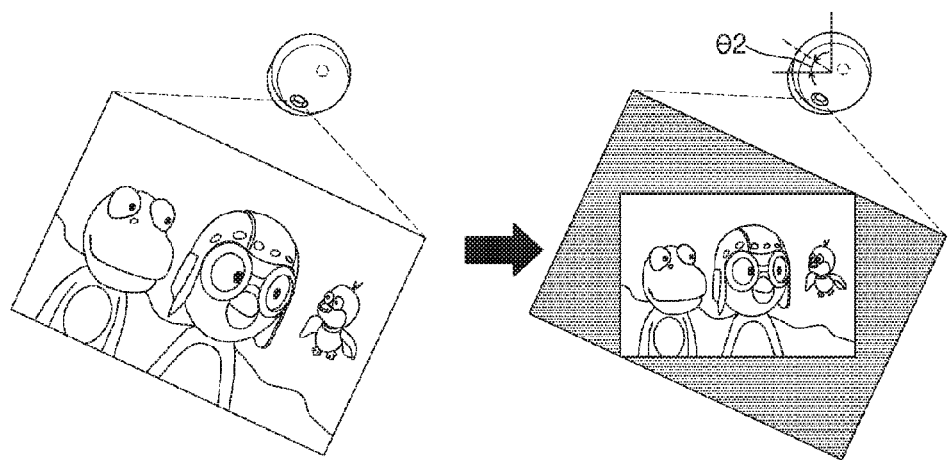
Figure 17C:
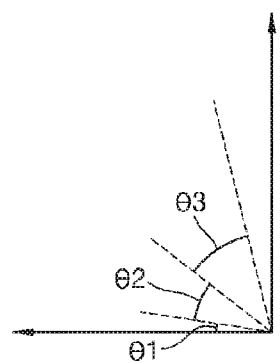

FIGS. 17A to 17C are reference diagrams illustrating an operation according to an exemplary embodiment shown in FIG. 16.

An example in which the correction is not performed when an angle between the ground surface and the projection surface of the electronic device is equal to or less than a first threshold and the correction is performed when the angle is greater than a second threshold will be described below with reference to FIGS. 16 and 17.

Referring to FIG. 16, in operation 1610, a processor 110 of an electronic device 100 determines whether an angle between the projection surface and the ground surface is less than a predetermined value by using a projection surface analysis module 134.

The projection surface analysis module 134 may measure an angle between the projection surface and the ground surface by using at least one of a gyro sensor and an acceleration sensor included in a sensor module.

In operation 1620, the processor 110 of the electronic device 100 does not correct the projection image when the angle between the projection surface and the ground surface that is measured by the projection surface analysis module 134 is less than the predetermined value.

The predetermined value may be determined in various ways. Referring to FIG. 17C, the predetermined value may determine a smallest angle θ1, an angle θ2 greater than θ1, and an angle θ3 greater than θ2. The angle may be a fixed value and may be directly set by a user. According to an exemplary embodiment, the user may change such a threshold angle.

Referring to FIG. 17A, when the angle between the ground surface and the projection surface is less than the threshold angle θ1, the projection surface analysis module 134 may project the image on the projection surface without correcting the image to prevent the reduction of the screen caused by correcting the projection image, as shown in FIG. 17A.

In operation 1630, the projection surface analysis module 134 corrects the projection image when the angle between the projection surface and the ground surface is greater than or equal to a predetermined value.

Referring to FIG. 17B, when the angle between the ground surface and the projection surface is greater than the threshold angle θ1 and less than the threshold angle θ2, the projection surface analysis module 134 may perform correction such that the image is projected horizontally to the ground surface as shown in FIG. 17B. By performing correction such that the image is projected horizontally to the ground surface, the projection image may be reduced, but user recognition difficulty caused by rotating and then outputting the image may be prevented.

Figure 18:
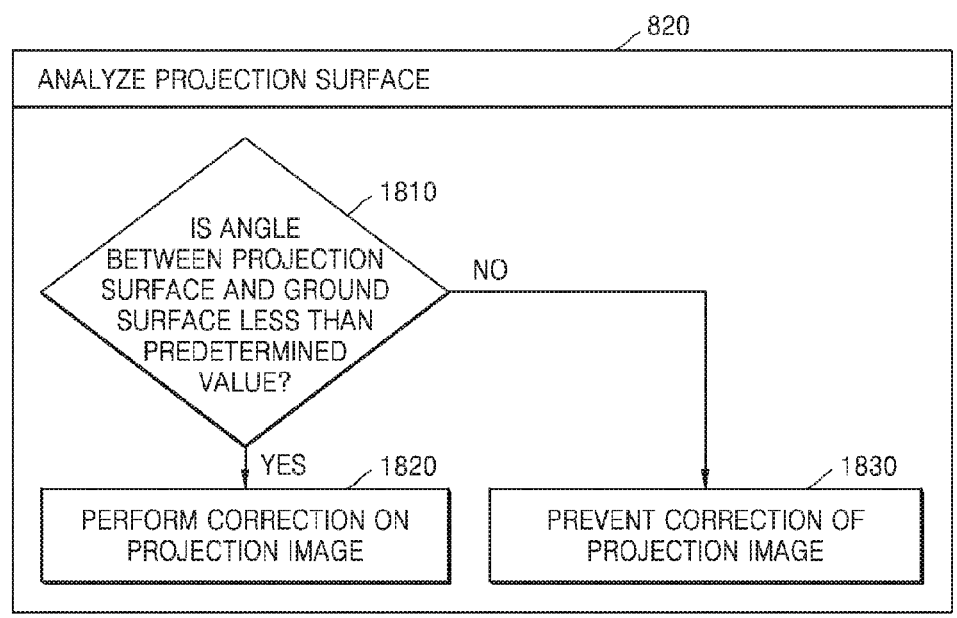
FIG. 18 is a flowchart showing some operations in a projection surface analysis process, according to an exemplary embodiment.

FIG. 18 is a flowchart showing a method of correcting an image differently depending on a rotation degree of the projection surface.

Figure 19A:
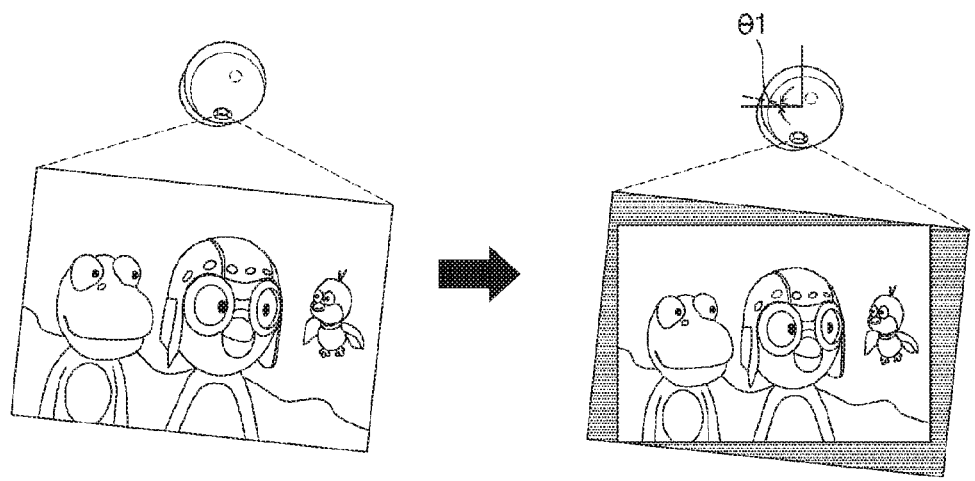
FIGS. 19A and 19B are reference diagrams illustrating an example in which correction is performed when an angle between an electronic device and the ground surface is equal to or less than a first threshold value and correction is not performed when the angle is greater than a second threshold value according to an exemplary embodiment.
Figure 19B:
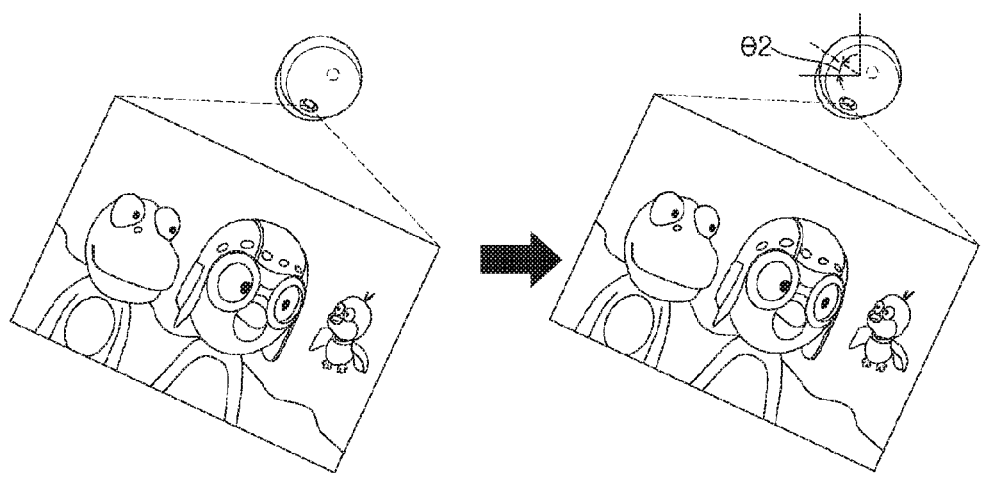

FIGS. 19A and 19B are reference diagrams illustrating an operation according to an exemplary embodiment shown in FIG. 18.

An example in which the correction is performed when an angle between the ground surface and the projection surface of the electronic device is equal to or less than a first threshold and the correction is not performed when the angle is greater than a second threshold will be described below with reference to FIGS. 18 and 19.

Referring to FIG. 18, in operation 1810, a processor 110 of an electronic device 100 determines whether an angle between the projection surface and the ground surface is less than a predetermined value, using a projection surface analysis module 134.

The projection surface analysis module 134 may measure an angle between the projection surface and the ground surface by using at least one of a gyro sensor and an acceleration sensor included in a sensor module.

In operation 1820, the processor 110 of the electronic device 100 corrects the projection image when the angle between the projection surface and the ground surface that is measured by the projection surface analysis module 134 is less than a predetermined value.

Referring to left side of FIG. 19A, when the angle between the ground surface and the projection surface is less than the threshold angle θ1, the projection surface analysis module 134 may correct the image as shown at right side of FIG. 19A. When the rotation degree of the electronic device is not great, the image may be corrected to be horizontal without necessarily being reduced in size, and thus the image recognition may be improved without a great loss of the image size.

In operation 1830, the projection surface analysis module 134 projects an image without correcting the projection image when the angle between the projection surface and the ground surface is less than a predetermined value.

Referring to left side of FIG. 19B, when the angle between the ground surface and the projection surface is greater than the threshold angle θ1 and less than the threshold angle θ2, the projection surface analysis module 134 may project the image on the projection surface without correcting the image as shown at right side of FIG. 19B. When the rotation degree of the electronic device is large, and only the image is corrected while the projection surface is left as is, the size of the image may be reduced to correct the image to be horizontal, and thus image recognition may be deteriorated. Therefore, according to an exemplary embodiment, the image may be projected without the image correction.

According to an exemplary embodiment, when an angle between the ground surface and a projection surface of an electronic device 100 installed on a wall is greater than θ2 and less than θ3, the image may be changed to a landscape mode and then shown or may be corrected to be projected horizontally to the ground surface.

Figure 20:
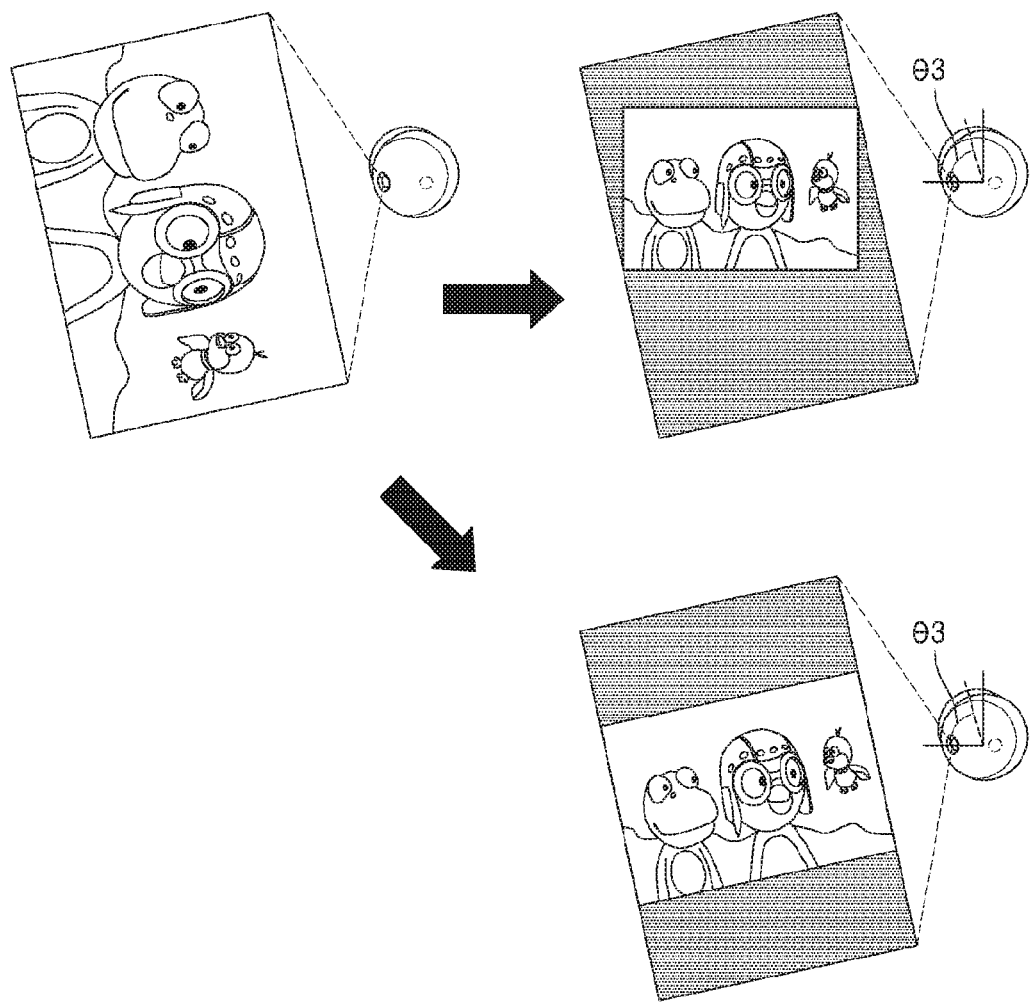
FIG. 20 is a reference diagram illustrating an example in which correction is performed or not when an angle between an electronic device and the ground surface is greater than a third threshold value according to an exemplary embodiment.

FIG. 20 is a reference diagram illustrating an example in which correction is performed or not when an angle between an electronic device and the ground surface is greater than a third threshold value according to an exemplary embodiment.

Referring to left side of FIG. 20, when an angle between the ground surface and a projection surface of an electronic device 100 installed on a wall is greater than a second threshold value and less than a third threshold value, the image may be corrected to be projected horizontally to the ground surface as shown at top right of FIG. 20, or may be changed to a landscape mode and then corrected as shown at bottom right of FIG. 20.

Figure 21A:
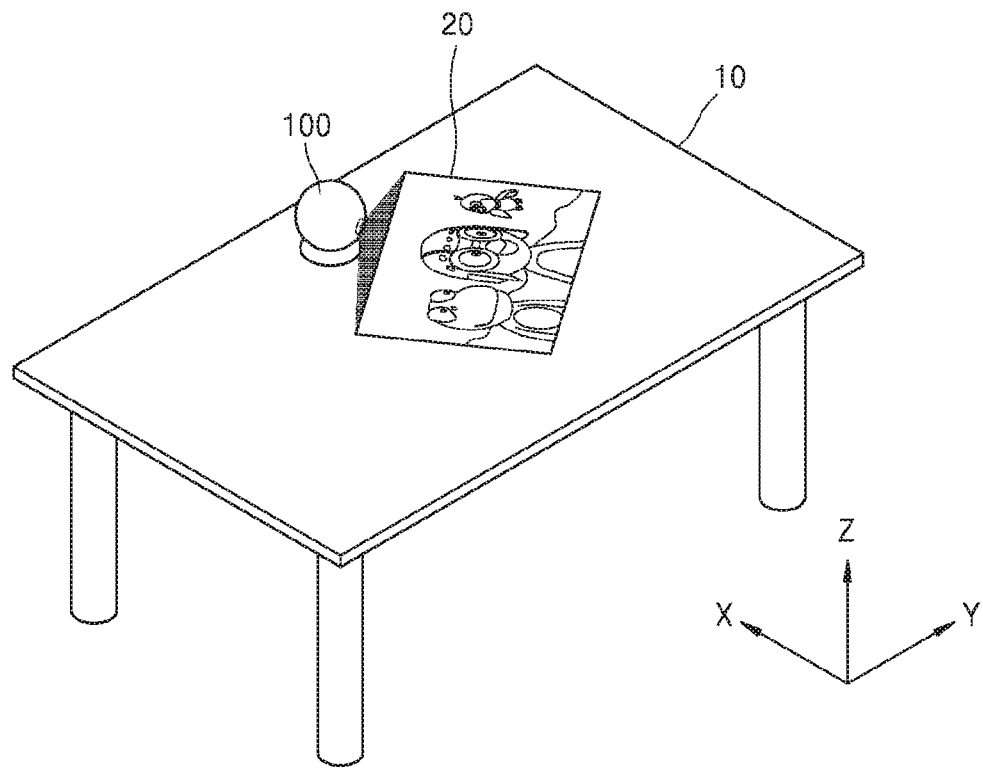
FIGS. 21A and 21B are reference diagrams illustrating an example in which correction is not performed over a table according to an exemplary embodiment.
Figure 21B:
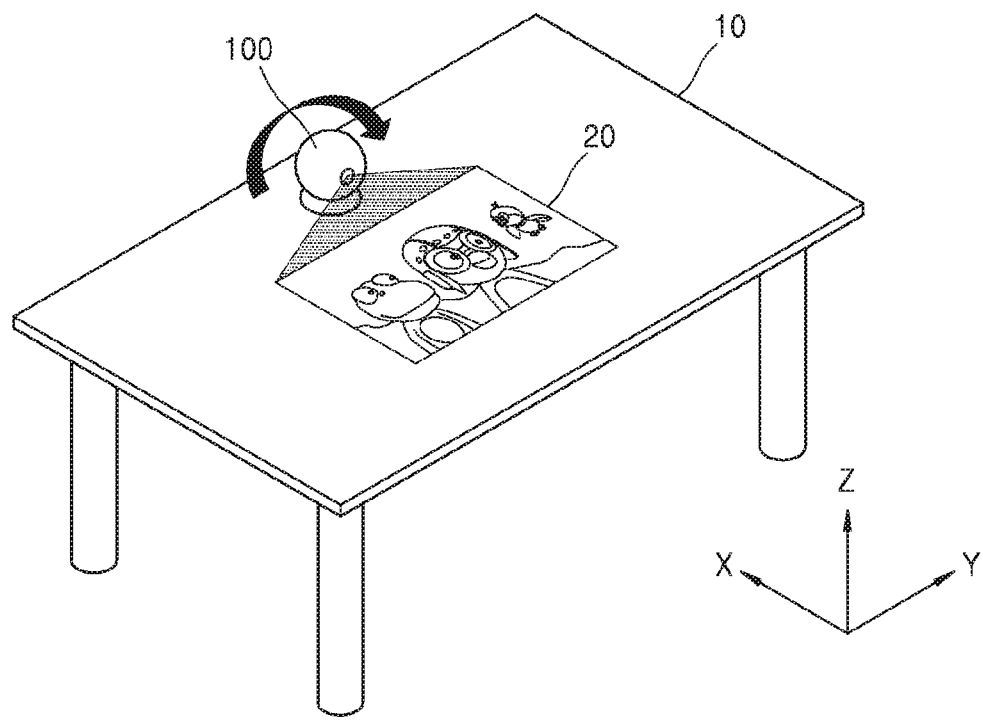

FIGS. 21A and 21B are reference diagrams illustrating an example in which correction is not performed when a projection surface of an electronic device is horizontal to the ground surface according to an exemplary embodiment.

According to an exemplary embodiment, when the projection surface of the electronic device is positioned horizontally to the ground surface, i.e., when the electronic device is placed on a floor or a table, the electronic device 100 may not correct the screen according to a geomagnetic sensor included in the electronic device. That is, when a change in a value with respect to a z axis is equal to or less than a threshold value and a position of the electronic device is changed only in an x-axis direction and a y-axis direction, the electronic device 100 may not correct the screen according to a geomagnetic sensor included in the electronic device. In other words, by determining whether the electronic device is attached or hung on a wall to perform projection and whether the electronic device is placed on a floor to perform projection, a correction scheme based on values according to the acceleration sensor included in the electronic device 100 may be set differently.

Referring to FIGS. 21A and 21B, when the electronic device 100 is positioned on a table, the electronic device 100 may not correct an image in association with the rotation position, regardless of a direction in which the electronic device 100 is disposed, and the electronic device 100 may project the image to the projection surface corresponding to a state in which the electronic device 100 is positioned on the table.

Thus, the user may allow the electronic device 100 to project an image such that the projection surface faces a direction in which the user is positioned by easily moving the electronic device 100 or by changing the direction of the electronic device 100 and then positioning the electronic device 100, regardless of a direction of a table at which the user is positioned.

Figure 22A:
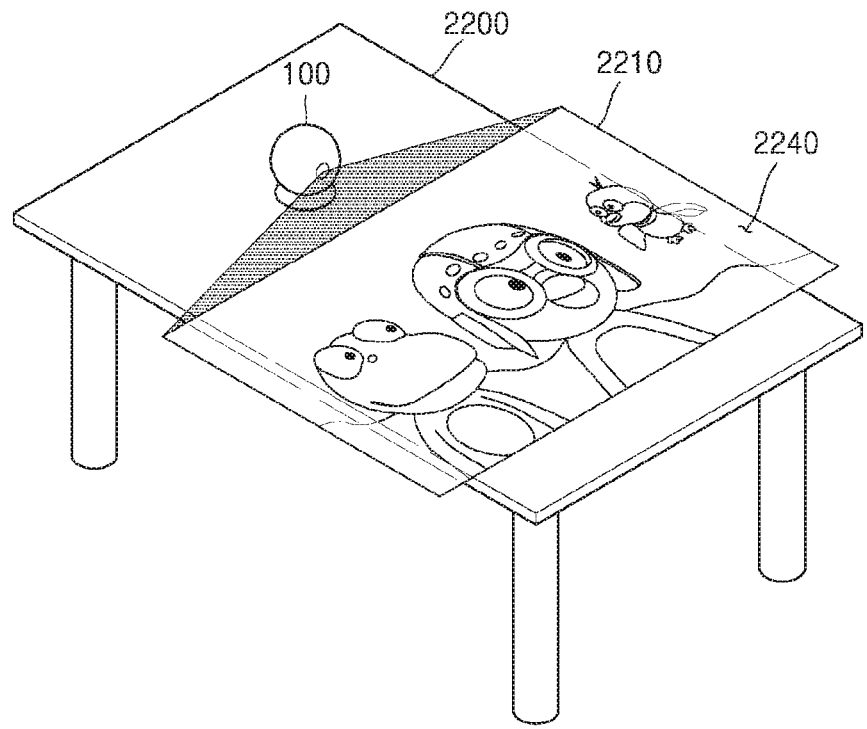
FIGS. 22A and 22B are diagrams illustrating an example in which a size of a projection image is corrected when a projection surface is smaller than the projection image according to an exemplary embodiment.
Figure 22B:
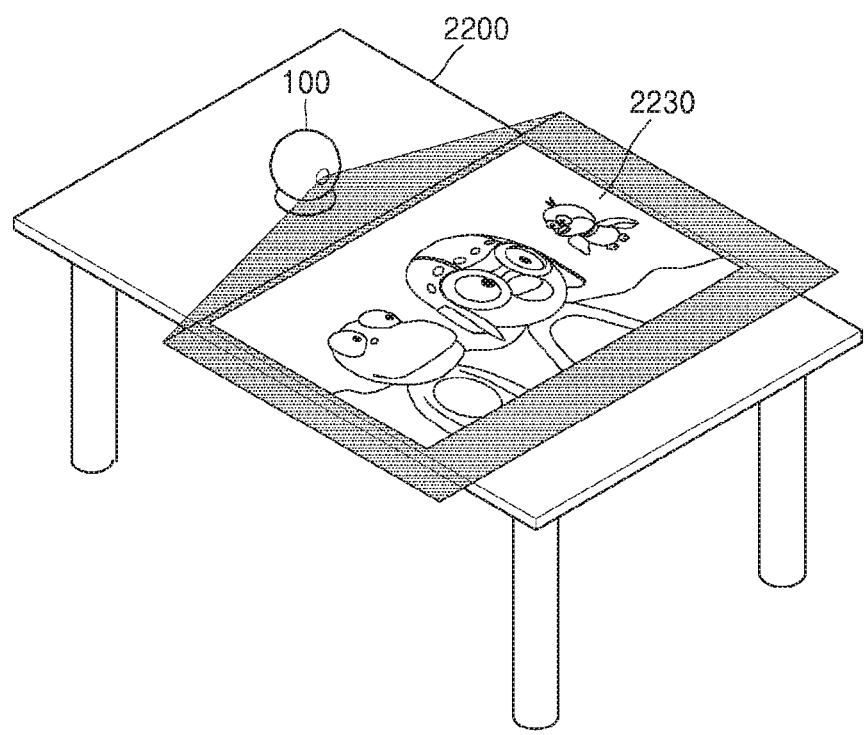

FIGS. 22A and 22B are diagrams illustrating an example in which a size of a projection image is corrected when a projection surface is smaller than the projection image according to an exemplary embodiment.

According to an exemplary embodiment, when the size of the floor on which the electronic device 100 performs projection is smaller than the size of the projection surface on which the electronic device 100 performs optical projection, the electronic device 100 may analyze the size of the surface on which the electronic device 100 is to perform projection using image recognition technology and may project an image smaller than the surface to which the image is to be optically projected with software.

Referring to FIG. 22A, the electronic device 100 is positioned on a table 2200. The size of the projection surface projected by the electronic device 100 is denoted as 2210 and is greater than that of the table 2200. Thus, when the electronic device 100 projects an image without correcting the image, a boundary 2240 of the projection image is projected not onto the table but in the air, and thus the image is not displayed appropriately.

In this case, the electronic device 100 may analyze the size of the floor to which an image is to be projected, i.e., the size of a space to which an image is to be projected, and may adjust the size of the image to be projected in accordance with the size of the floor to which the image is to be projected. Referring to FIG. 22B, the electronic device 100 may adjust the size of the image to be projected and project an image 2230 in accordance with the size of the table, thus preventing the image from being projected beyond the table and in the air.

According to an exemplary embodiment, the electronic device 100 projects content when there are not nearby electronic devices, but the electronic device 100 may project content along with another nearby electronic device when the electronic device 100 recognizes the other nearby electronic device.

According to an exemplary embodiment, when images are combined using a plurality of electronic devices, one image may be synthesized from the images of the plurality of electronic devices in consideration of information about directions of two or more electronic devices and information about a distance between the electronic devices. A method of determining whether there are a plurality of nearby electronic devices is described above.

Figure 23A:
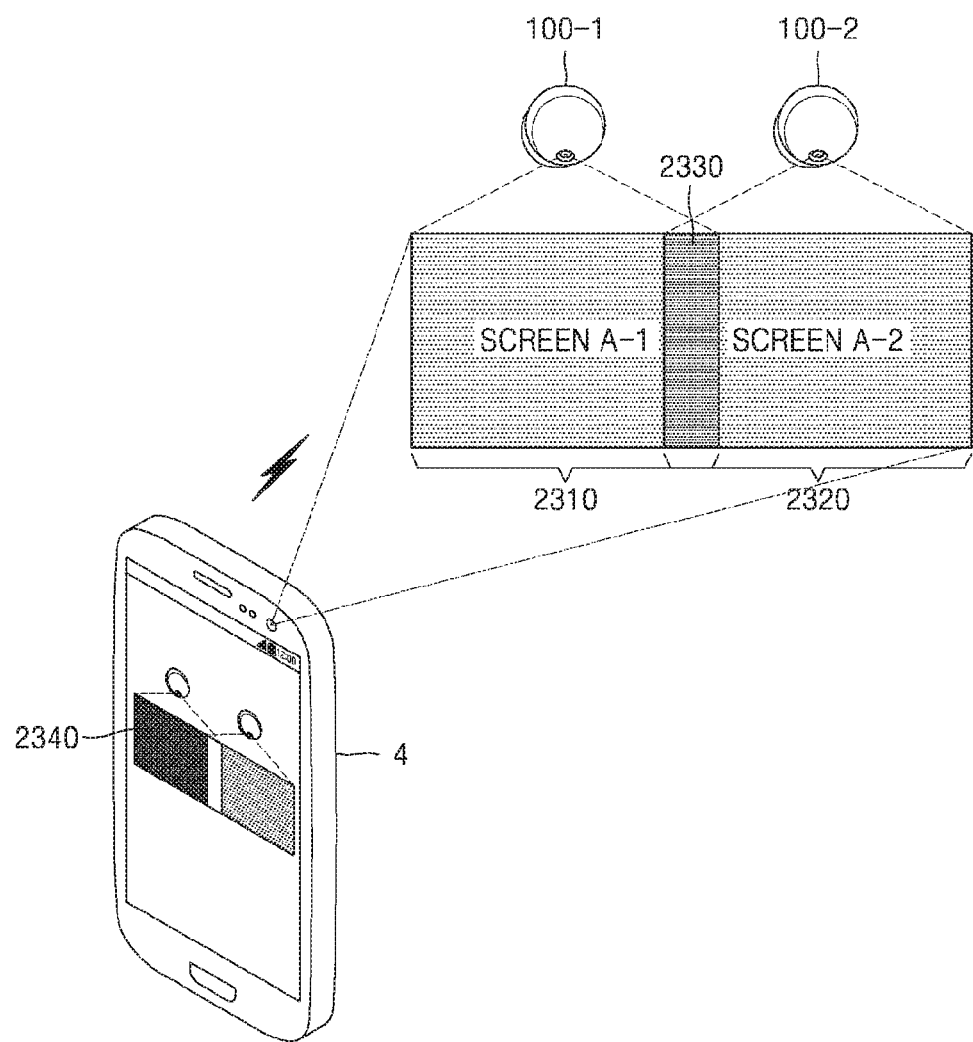
FIG. 23A is a reference diagram illustrating a method of combining images of a projection surface through image recognition according to an exemplary embodiment.

FIG. 23A is a reference diagram illustrating a method of combining images of a projection surface through image recognition according to an exemplary embodiment.

A device having a camera, for example, a smartphone 4, captures two or more projection images and analyzes the captured images to check an overlap of the projection images and a separation region and transmits corresponding information to an electronic device 100-1. The electronic device 100-1 may receive information about the overlap region or the separation region and may perform a synthesis process on the overlap region or the separation region to form one natural screen.

Referring to FIG. 23A, screen A-1 and screen A-2 projected by the electronic device 100-1 and the electronic device 100-2 originate from the same content A. The content A is received from one external device and divided into screen A-1 2310 and screen A-2 2320. The electronic devices 100-1 and 100-2 project screen A-1 2310 and screen A-2 2320, respectively. Referring to FIG. 23A, because screen A-1 2310 projected by the electronic device 100-1 and screen A-2 2320 projected by the electronic device 100-2 overlap each other, it can be seen that an overlap region 2330 has been generated. Heterogeneity between the project images may occur due to the overlap region, and the projection images may be naturally connected by utilizing edge blending technology. The smartphone 4, which is one external device, may analyze an image 2340 obtained by capturing the projection images and may send information about how long the edge blending is to be performed to the electronic device 100-1 and the electronic device 100-2. The electronic device 100-1 and the electronic device 100-2 may naturally connect the images by adjusting alpha values in screen A-1 and screen A-2 on the basis of a corresponding overlap region.

Figure 23B:
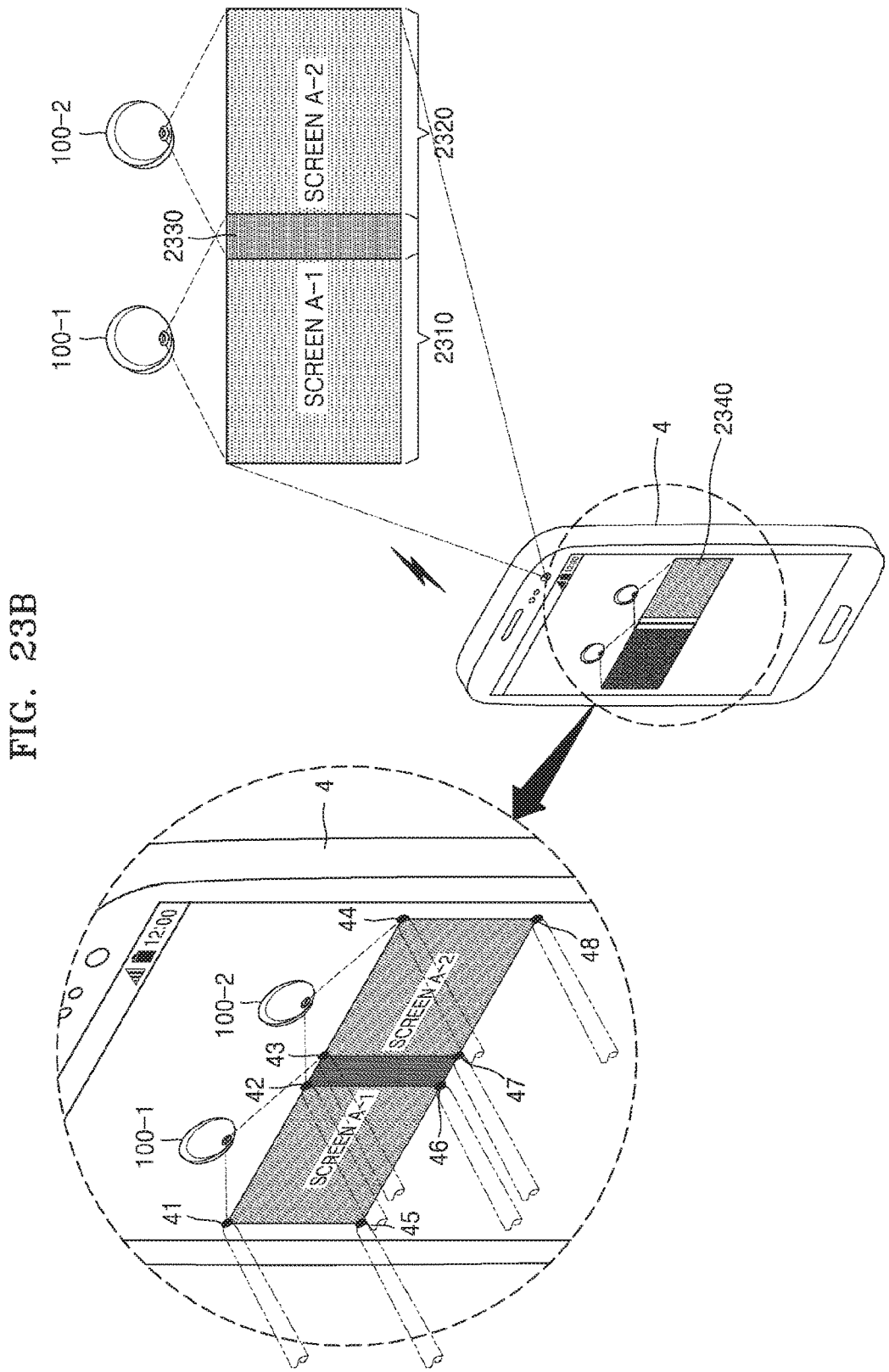
FIG. 23B is a reference diagram illustrating a method of combining images of a projection surface through a stylus according to an exemplary embodiment.

FIG. 23B is a reference diagram illustrating a method of combining images of a projection surface through a stylus according to an exemplary embodiment.

According to an exemplary embodiment, an image may be acquired using a device having a camera and corrected by passively capturing edges of the projected surface using an additional input or an additional mechanism of a user, for example, a stylus.

Referring to FIG. 23B, screen A-1 and screen A-2 projected by the electronic device 100-1 and the electronic device 100-2 are captured using a smartphone 4.

A user may view screen A-1 and screen A-2 captured by the smartphone 4 and check an overlap region of images by touching vertices 41, 43, 45, and 47 of the four corners of screen A-1 and also touching vertices 42, 44, 46, and 48 of the four corners of screen A-2.

The smartphone 4 may check the overlap region having vertices 42, 43, 46, and 47 according to the stylus touch input and send information about the overlap region to the electronic device 100-1 and the electronic device 100-2. The electronic device 100-1 and the electronic device 100-2 may naturally connect the images by adjusting alpha values in screen A-1 and screen A-2 on the basis of a corresponding overlap region.

Figure 24:
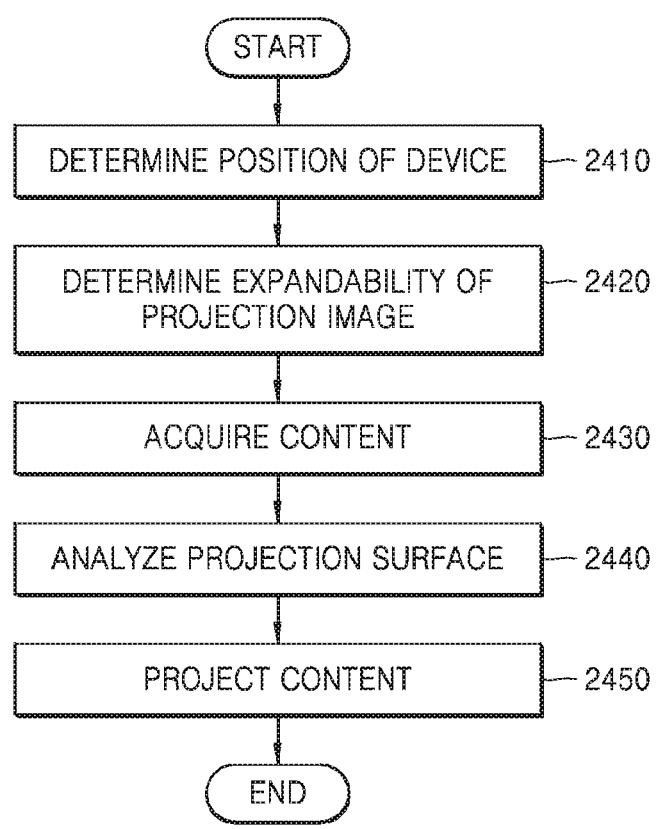
FIG. 24 is a flowchart showing an example of an operation in which an electronic device expands a projection surface and projects content according to an exemplary embodiment.

FIG. 24 is a flowchart showing an example of an operation in which an electronic device expands a projection image and projects content according to an exemplary embodiment.

Referring to FIG. 24, in operation 2410, an electronic device 100 determines a position of the electronic device 100.

A processor 110 of the electronic device 100 may use a device position determination module 133 to determine the position of the electronic device 100. When the position of the electronic device 100 is not suitable for a projection surface, the processor 110 of the electronic device 100 may output an indicator for instructing to position the electronic device 100 on the projection surface. In addition, when one or more other adjacent electronic devices are recognized, the processor 110 may also output an indicator for instructing to position the electronic device 100 and the other adjacent electronic devices level with one another. The position determination operation of the electronic device is the same as described above with reference to FIGS. 8A to 12.

In operation 2420, the electronic device 100 determines the expandability of a projection image.

The processor 110 of the electronic device 100 may use a projection image expandability determination module 135 to determine whether to expand the projection image. To determine whether to expand the projection image, the projection image expandability determination module 135 may determine whether there is another electronic device in the vicinity of the electronic device 100 using an infrared sensor 140E or an ultrasonic sensor 140D included in a communication module 120 or a sensor module 140. When the projection image expandability determination module 135 determines that there is another electronic device in the vicinity of the electronic device 100 and that an image is to be expanded and projected, the projection image expandability determination module 135 performs a process for the plurality of electronic devices to project the image according to the determination. The expandability determination operation of the electronic device will be described below in detail with reference to FIGS. 25 to 27.

In operation 2430, the electronic device 100 acquires content.

The processor 110 of the electronic device 100 may acquire content to be projected from at least one of a communication module 120, an interface 170, and a memory 130 and may perform buffering or signal decryption so that the acquired content is shown with a projection module, using a signal processing module 132.

In operation 2440, the electronic device 100 analyzes a projection surface.

The processor 110 of the electronic device 100 may use a projection surface analysis module 134 to analyze the projection surface of the electronic device 100 and may use direction information or rotation information of the electronic device 100 to correct geometric information or color information of the projection image or rotate the projection image. The projection surface analysis operation of the electronic device is the same as described in detail with reference to FIGS. 13 to 21B.

According to an exemplary embodiment, when the projection image expandability determination module 135 determines to expand the projection image, the projection surface analysis module 134 may determine some content to be projected by the electronic device 100 and some content to be transmitted to another nearby electronic device from all content to be projected.

In operation 2450, the electronic device 100 projects the content.

The processor 110 of the electronic device 100 may project content onto the projection surface using an optical module 160. When it is determined to expand the projection image, the optical module 160 may project some of the content.

Figure 25:
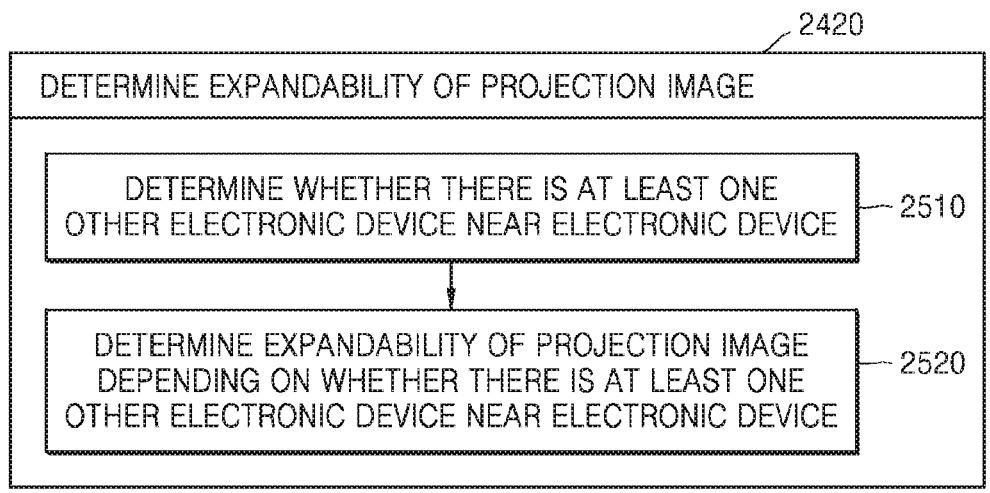
FIG. 25 is a flowchart showing some operations in the process of determining the expandability of the projection surface shown in FIG. 24.

FIG. 25 is a flowchart showing some operations in an expandability determination process for the projection image shown in FIG. 24.

Referring to FIG. 25, in operation 2510, an electronic device 100 determines whether there is at least one other electronic device in the vicinity of the electronic device 100. The method of the electronic device 100 determining whether there is at least one other electronic device in the vicinity of the electronic device 100 is described above.

In operation 2520, the electronic device 100 determines the expandability of the projection image depending on whether there is at least one other electronic device in the vicinity of the electronic device 100.

When there is not at least one other electronic device in the vicinity of the electronic device 100, the electronic device 100 may solely perform an operation of projecting an image.

When it is determined that there is at least one other electronic device in the vicinity of the electronic device 100, the electronic device 100 and the other electronic device may project content mutually or separately through a setting in the electronic device 100 or through a setting of an application in a device that transmits content to be projected to the electronic device 100.

Figure 26:
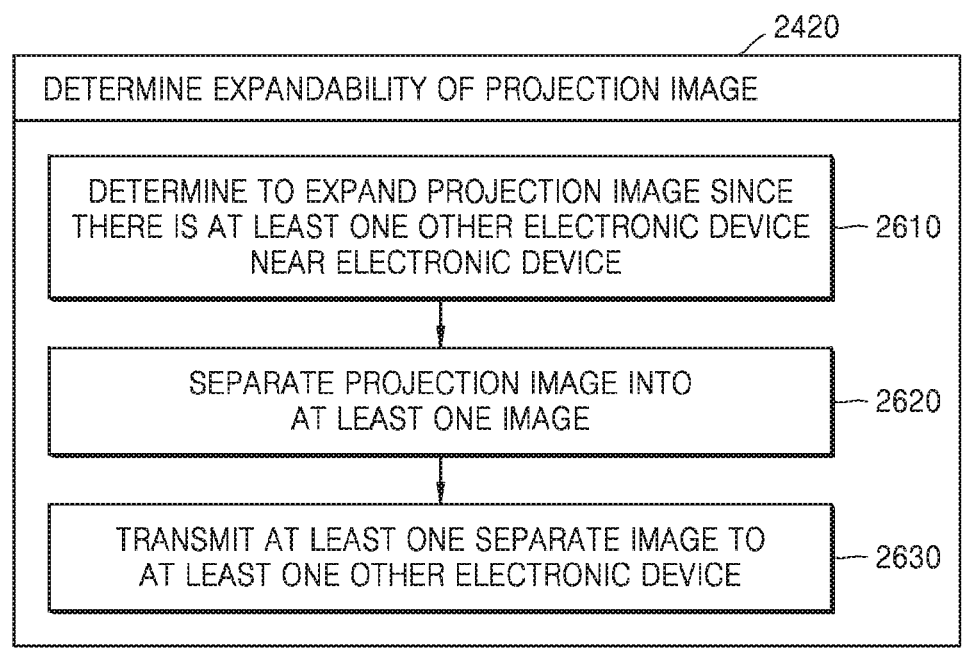
FIG. 26 is a flowchart showing some operations in the process of determining the expandability of the projection surface shown in FIG. 24.

FIG. 26 is a flowchart showing some operations in an expandability determination process for the projection image shown in FIG. 24.

Referring to FIG. 26, in operation 2610, an electronic device 100 determines to expand a projection image when there is at least one other electronic device in the vicinity of the electronic device 100.

A processor 110 of the electronic device 100 may use a projection image expandability determination module 135 to determine to expand the projection image when there is at least one other electronic device in the vicinity of the electronic device 100.

In operation 2620, the electronic device 100 divides the projection image into at least one image.

The projection image expandability determination module 135 may divide the projection image into one or more images in order for a plurality of electronic devices to mutually project the projection image.

According to an exemplary embodiment, for example, when two electronic devices mutually project an image, the projection image expandability determination module 135 may divide the image into two and determine that one is to be projected by the electronic device 100 and the other is to be projected by an adjacent electronic device.

In operation 2630, the electronic device 100 transmits the at least one separate projection image to at least one other electronic device.

The projection image expandability determination module 135 transmits the at least one separate projection image to at least one other electronic device.

According to an exemplary embodiment, the electronic device 100 may transmit only some of the projection images to be projected by an adjacent electronic device to the adjacent electronic device.

According to an exemplary embodiment, the electronic device 100 may transmit all of the projection images to the adjacent electronic device and may also inform the adjacent electronic device of information about which portion of the projection image is to be projected by the adjacent electronic device.

According to an exemplary embodiment, a plurality of electronic devices may communicate with one another to transmit or receive data. The communication may use various methods such as the User Datagram Protocol (UDP), the Transmission Control Protocol (TCP), etc.

Figure 27A:
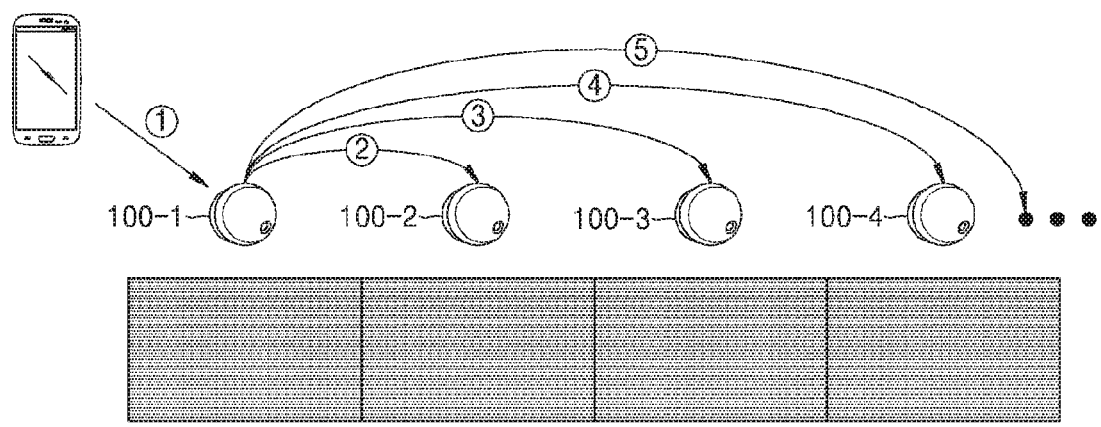
FIG. 27A shows an example of a method of communicating between a plurality of electronic devices.

FIG. 27A shows an example of a method of communicating between a plurality of electronic devices.

According to an exemplary embodiment, a first electronic device that has received data from a smart device may sequentially transfer data to a plurality of other nearby electronic devices.

Referring to FIG. 27A, the electronic device 100-1 may receive data from the smart phone and sequentially transfer the received data to electronic devices 100-2, 100-3, and 100-4.

Figure 27B:
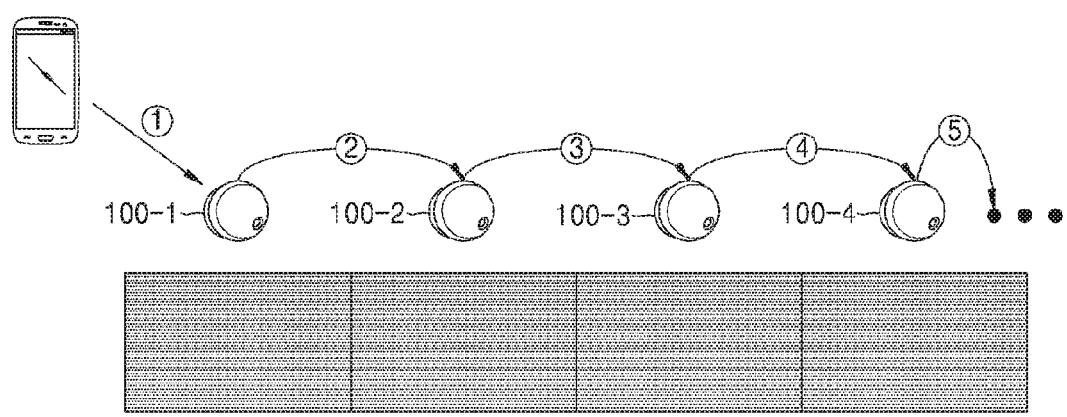
FIG. 27B shows another example of a method of communicating between a plurality of electronic devices.

FIG. 27B shows another example of a method of communicating between a plurality of electronic devices.

According to an exemplary embodiment, a first electronic device that has received data from a smart device may sequentially deliver data to a plurality of other nearby electronic devices, and each of the electronic device that have received the data may transfer the data to other adjacent electronic devices. Screen synchronization may be performed with respect to a time at which at least one of synched electronic devices completes data reception.

Referring to FIG. 27B, when the electronic device 100-1 receives data from a smart device and transfers the received data to the second electronic device 100-2, the second electronic device 100-2 transfers data to the third electronic device 100-3 at the same time the second electronic device 100-2 receives data from the first electronic device 100-1. The plurality of electronic devices may sequentially receive data by simultaneously receiving and sending data in this way. The screen synchronization may be performed with respect to a time at which at least one of the devices completes data reception.

Figure 27C:
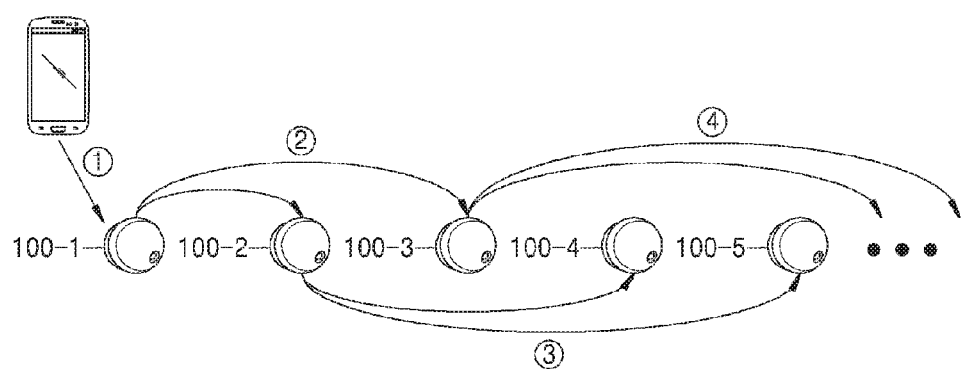
FIG. 27C shows an example of a method of communicating between a plurality of electronic devices.

FIG. 27C shows another example of a method of communicating between a plurality of electronic devices.

According to an exemplary embodiment, a first electronic device that has received data from a smart device may transmit data to two or more of a plurality of adjacent electronic devices at the same time, and each of the adjacent electronic devices that have receives the data may also transfer the received data to the two or more of the adjacent electronic devices at the same time (e.g., simultaneously).

Referring to FIG. 27C, the first electronic device 100-1 that has received data from a smart device may sequentially provide data to at least two or more electronic devices different from the electronic device. At this point, an electronic device that has first received data among the two or more electronic devices may provide data to two or more electronic devices different from the two or more electronic devices. The plurality of electronic devices may sequentially receive data by repeatedly performing such a series of operations. The screen synchronization may be performed with respect to a time at which at least one of the devices completes data reception.

Figure 28:
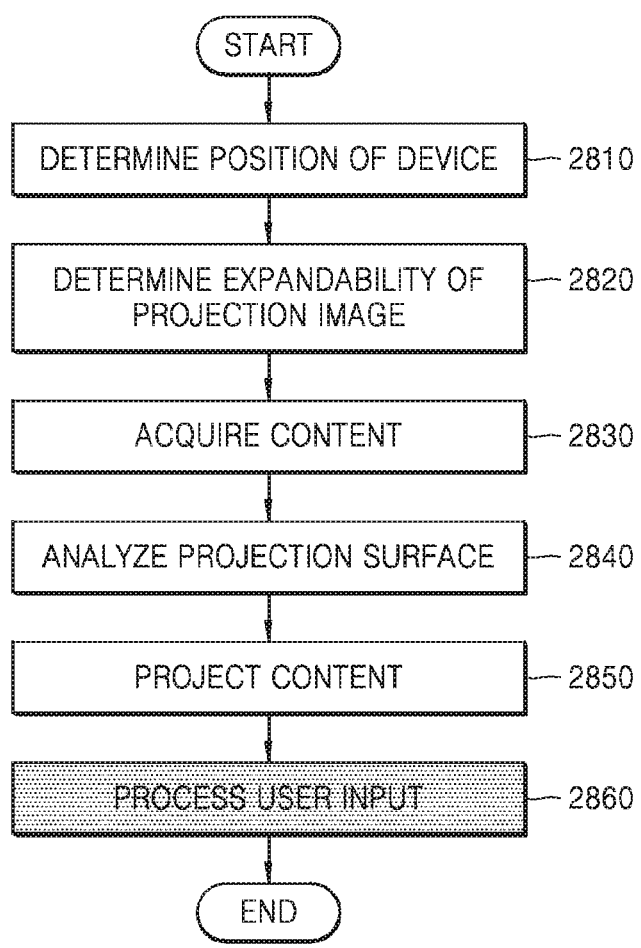
FIG. 28 is a flowchart showing a method of projecting content to an electronic device according to an exemplary embodiment.

FIG. 28 is a flowchart showing a method of projecting content from an electronic device according to an exemplary embodiment.

Referring to FIG. 28, operation 2810 in which an electronic device 100 determines a position of the electronic device 100, operation 2820 in which the electronic device 100 determines the expandability of a projection image, operation 2830 in which the electronic device 100 acquires content, operation 2840 in which the electronic device 100 analyzes a projection surface, and operation 2850 in which the electronic device 100 projects the content are the same as those described with reference to FIG. 24.

Next, in operation 2860, the electronic device 100 processes a user input.

The processor 110 of the electronic device 100 may sense a user interaction using a user input processing module 136 and may perform an operation corresponding to the sensed user interaction. The user input processing module 136 may sense the user interaction using at least one of sensors included in an input device 150, a camera module 191, and a sensor module 140.

According to an exemplary embodiment, the user input processing module 136 may perform an operation corresponding to a user input received through a key 151 included in the input device 150.

According to an exemplary embodiment, the user input processing module 136 may perform an operation corresponding to a user input received through a microphone 182. For example, the electronic device 100 may adjust a projection image of the electronic device 100 using a voice received through the microphone 182. The electronic device 100 may also directly recognize the voice of the user using the microphone 182 included in the electronic device 100 and may recognize a voice recognition instruction through a microphone of an external device connected with the electronic device 100 and perform an operation corresponding to the recognized instruction. As the recognized instruction, various instructions such as Play, Pause, Prev, Next, or Volume Adjustment may be transferred via a voice.

According to an exemplary embodiment, the user input processing module 136 may perform an operation corresponding to a user input received through an infrared (IR) sensor 140E included in the sensor module 140. According to an exemplary embodiment, the infrared sensor 140E of the electronic device 100 may sense an input of a user's finger or a pen from the projection image. The infrared sensor 140E includes a light emitting unit and a light receiving unit. The amount of voltage applied to the light receiving unit varies depending on the amount of infrared light reflected by an object and then received by the light receiving unit out of infrared light emitted from the light emitting unit.

A method of receiving a user input using an infrared sensor will be described with reference to FIG. 29.

Figure 29:
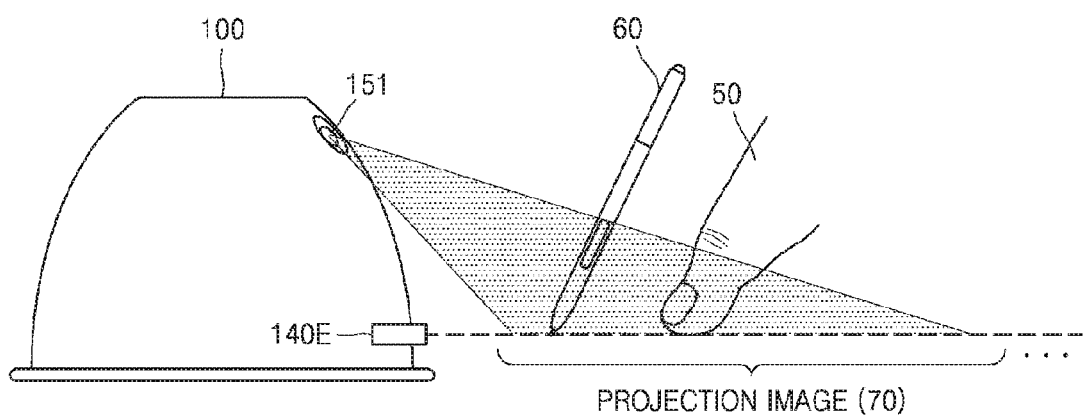
FIG. 29 is a reference diagram illustrating an example in which a user input is sensed through an infrared sensor according to an exemplary embodiment.

FIG. 29 is a reference diagram illustrating an example in which a user input is sensed through an infrared sensor and a camera module according to an exemplary embodiment.

Referring to FIG. 29, the electronic device 100 projects an image onto a projection surface and has an infrared sensor 140E disposed at the bottom thereof. The infrared sensor 140E disposed at the bottom of the electronic device 100 may sense an input of a user's finger 50 or a pen 60 in a projection image 70. In addition, the electronic device 100 may further use a camera module 191 to determine a position of the projection image 70 with which the pen 60 or the finger 50 is in contact. The camera module 191 may be equipped with a camera lens that may analyze an image in a short distance and may correct an image through a lens correction algorithm and analyze the corrected image. A wide-angle lens may be installed as the camera lens.

According to an exemplary embodiment, the user input processing module 136 may perform an operation corresponding to a user input received through the camera module 191.

Figure 30:
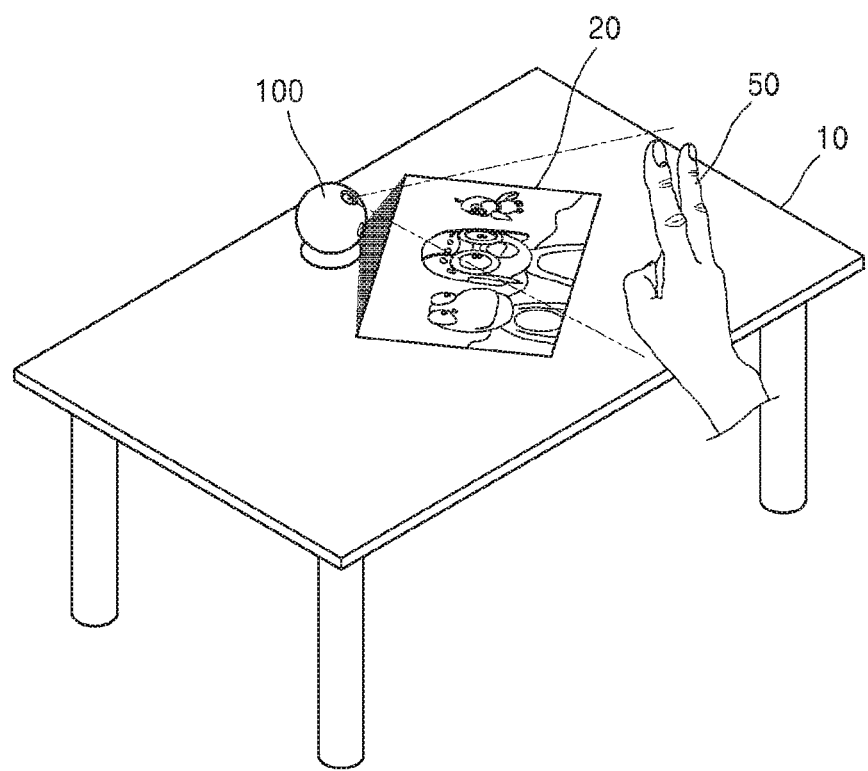
FIG. 30 is a reference diagram illustrating an example of sensing an operation of a user through a camera included in the electronic device 100 and processing a command according to an exemplary embodiment.

FIG. 30 is a reference diagram illustrating an example of sensing an operation of a user through a camera included in the electronic device 100 and processing a command according to an exemplary embodiment.

Referring to FIG. 30, a camera module 191 of the electronic device 100 may recognize a gesture using a user's finger 50 and may process operations corresponding to various instructions such as Play, Pause, Prev, Next, Volume Adjustment, or PPT Screen Pass according to the recognized gesture.

FIG. 30 shows the user's gesture as a gesture that uses a finger. However, it should be fully understood by those skilled in the art that a gesture that may be recognized by the camera module 191 is not limited to the user's finger gesture and may include a user's gesture that uses various body parts or interaction units.

In addition, according to an exemplary embodiment, a camera included in an external device connected with the electronic device 100 instead of through the camera module 191 included in the electronic device 100 recognizes the user's gesture and transmits an instruction corresponding to the recognized gesture to the electronic device 100. Thus, the electronic device 100 may process an operation for the instruction.

Figure 31:
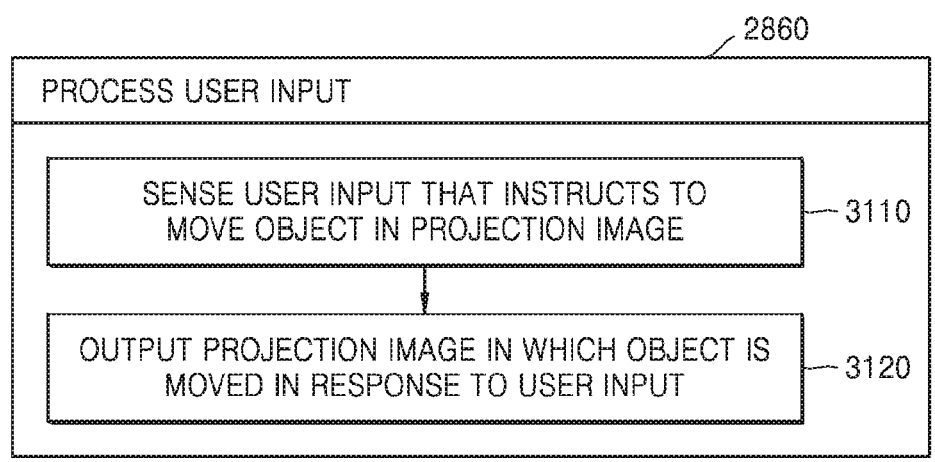
FIG. 31 is a flowchart showing some operations in a user input processing process shown in FIG. 28.

FIG. 31 is a flowchart showing some operations in a user input processing process shown in FIG. 28.

Referring to FIG. 31, in operation 3110, an electronic device 100 senses a user input that instructs to move an object over a projection image.

A processor 110 of the electronic device 100 may use a user input processing module 136 to sense the user input that instructs to move the object displayed on the projection image. The user input processing module 136 may use the infrared sensor 140E or the camera module 191 to sense the user input. The object displayed on the projection image may include, for example, an icon, an image, text, a button, etc.

In operation 3120, the electronic device 100 outputs a projection image over which an object moves in response to the sensed user input.

When an operation of touching any object displayed on the projection image with a user input unit such as a user finger 50 or a pen 60 is recognized through the camera module 191 or the infrared sensor 140E, the user input processing module 136 may sense that the movement of the object is started. Next, the camera module 191 or the infrared sensor 140E may trace a path in which the user moves an object displayed over the projection image, and the projection module 162 may project an image in which the object is moved in real time in accordance with the traced path, thus making a user experience a feeling as if the user drags the object with an interaction unit such as a finger.

Figure 32:
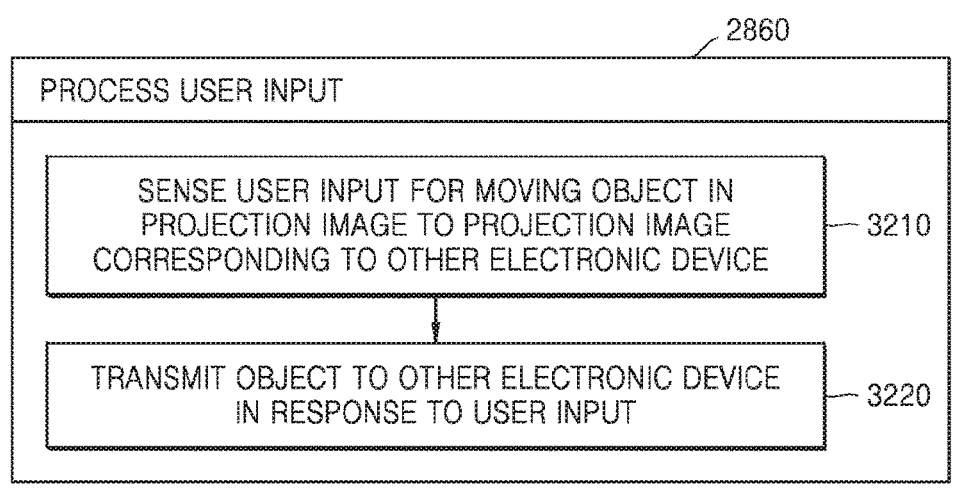
FIG. 32 is a flowchart showing some operations in a user input processing process shown in FIG. 28.

FIG. 32 is a flowchart showing some operations in a user input processing process shown in FIG. 28.

Referring to FIG. 32, in operation 3210, an electronic device 100 senses a user input that instructs to move an object displayed on the projection image to a projection image corresponding to another electronic device.

A processor 110 of the electronic device 100 may use a user input processing module 136 to sense the user input that instructs to move the object displayed on the projection image. As described above, the user input processing module 136 may use the infrared sensor 140E or the camera module 191 to sense the user interaction.

The user interaction for moving an object displayed on a projection image to a projection image corresponding to another electronic device may be determined in various ways. For example, the user interaction may be an operation of a user input unit for moving an object to another projection image, an operation of a user input unit for drawing a circle on the object, or a gesture after an operation on the object is designated as a user input unit.

In operation 3220, the electronic device 100 transmits information on an object to another electronic device in response to the sensed user input.

A processor 110 of the electronic device 100 may use a user input processing module 136 to transmit the information on the object to the other electronic device in response to the sensed user input. The user input processing module 136 may use a communication module 120 to transmit information about the object to the other electronic device. An operation described in FIG. 31 and an operation described in FIG. 32 may be performed together. That is, the electronic device 100 may sense the user interaction for moving the object displayed on the projection image to the projection image corresponding to the other electronic device and may transmit the object to the other electronic device and also output the projection image in which the object is moved in response to the user input. The operations shown in FIGS. 31 and 32 will be described in detail with reference to FIGS. 33A and 33B.

Figure 33A:
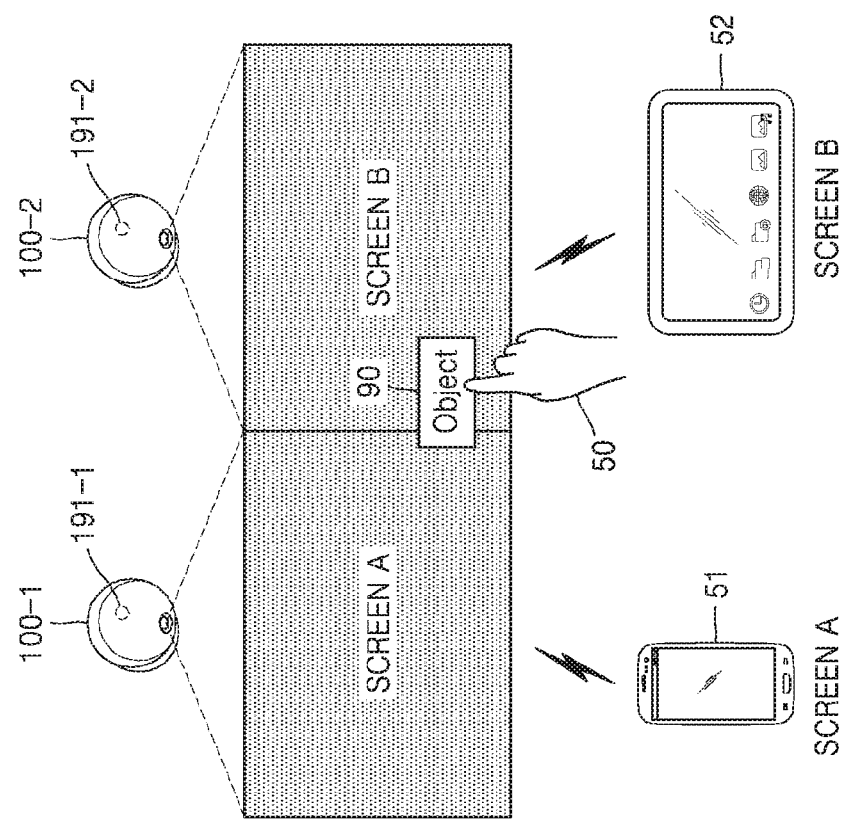
FIGS. 33A and 33B are reference diagrams illustrating an operation of moving an object in one projection image to another projection image through a user interaction according to an exemplary embodiment.
Figure 33B:
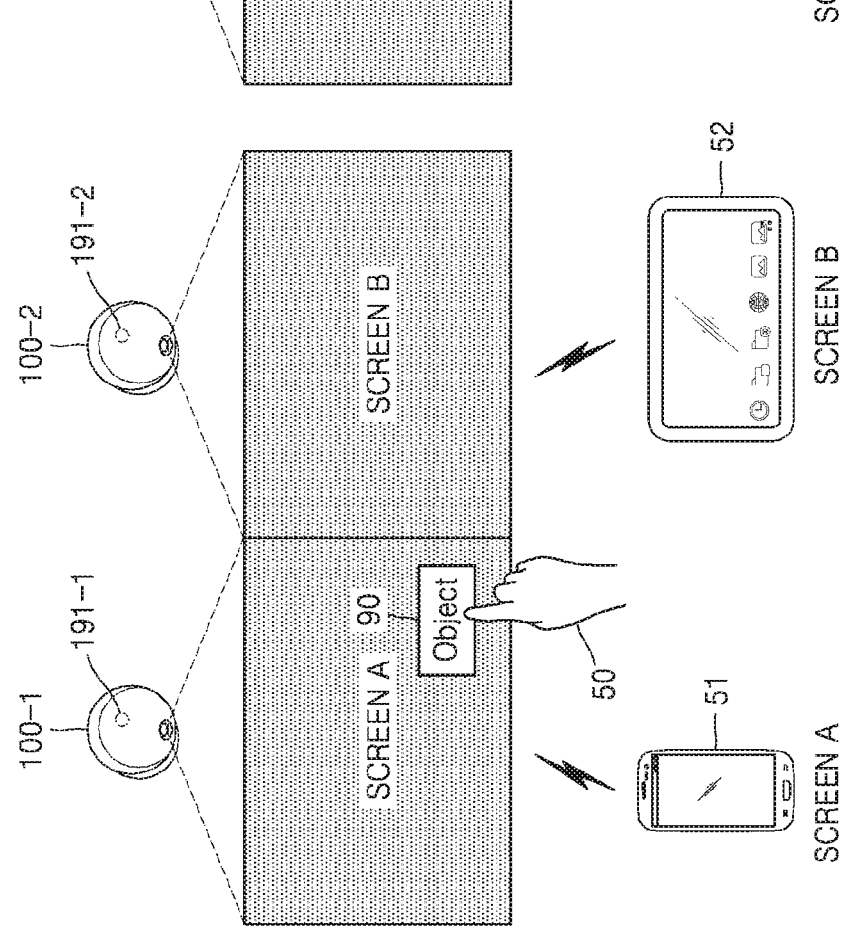

FIGS. 33A and 33B are reference diagrams illustrating an operation of moving an object in one projection image to another projection image through a user input according to an exemplary embodiment.

Referring to FIG. 33A, an electronic device 100-1 is connected with a smart device 51 and configured to project screen A received from the smart device 51, and an electronic device 100-2 is connected with a smart device 52 and configured to project screen B received from the smart device 52.

When a user performs an operation of instructing to move an object 90 displayed on a projection image of screen A using an interaction unit such as his or her finger 50 or a pen, a camera 191-1 of the electronic device 100-1 may sense the user interaction, and a projection module of the electronic device 100-1 may project an image in which the object is moved according to the movement of the user input unit.

The electronic device 100-1 may transmit information on the object to the electronic device 100-2 through a network at a predetermined time while the object is moved from screen A to screen B and then output by an instruction of the user input unit. For example, a predetermined time at which the object is transmitted from the electronic device 100-1 to the electronic device 100-2 may be a time point at which the object crosses to screen B when, while, or after the object enters a boundary between screen A and screen B or a time point at which the user releases an instruction of the object similarly to a touch release.

In addition, by transmitting the information on the object from the electronic device 100-1 to the electronic device 100-2, the object 90 may be moved from the electronic device 100-1 to the electronic device 100-2, or the object 90 may be copied from the electronic device 100-1 to the electronic device 100-2.

According to an exemplary embodiment, when the electronic device 100-1 transmits object information to the electronic device 100-2, the electronic device 100-1 may use various communication technologies. The electronic device 100-1 and the electronic device 100-2 may transmit and receive information in the same AP zone through Wi-Fi technology or may be connected through Bluetooth to transmit and receive information. In addition, the information may also be transferred without a separate AP by utilizing technology such as Wi-Fi Direct. In addition, when the electronic device 100-1 and the electronic device 100-2 are not connected (e.g., paired) in advance, the connection may be requested from an electronic device that displays screen A or an electronic device that displays screen B at a time at which the object information is passed.

Referring to FIG. 33B, when the object 90 instructed by the user crosses a boundary between screen A and screen B, the electronic device 100-1 may transfer information on the object 90 through a network to the electronic device 100-2 that is connected with the electronic device 100-1 through the network and configured to show screen B. According to an exemplary embodiment, the transferred information on the object may include an icon image of the object, an output ratio of the image, or an output position of the object. For example, when the object straddles the boundary between screen A and screen B, the output ratio of the object image may indicate an output ratio of the object on screen A and an output ratio of the object on screen B. If the object straddles the boundary between screen A and screen B, upon receiving the information on the object, the electronic device 100-2 may output the remaining portion of the object 90 to be displayed on screen B to screen B.

In addition, when the object 90 is moved and output to screen B, the electronic device 100-2 may recognize, through a camera module 191-2, a user interaction in which the user directs and moves the object on screen B and may project an image according to the movement of the object.

Figure 34A:
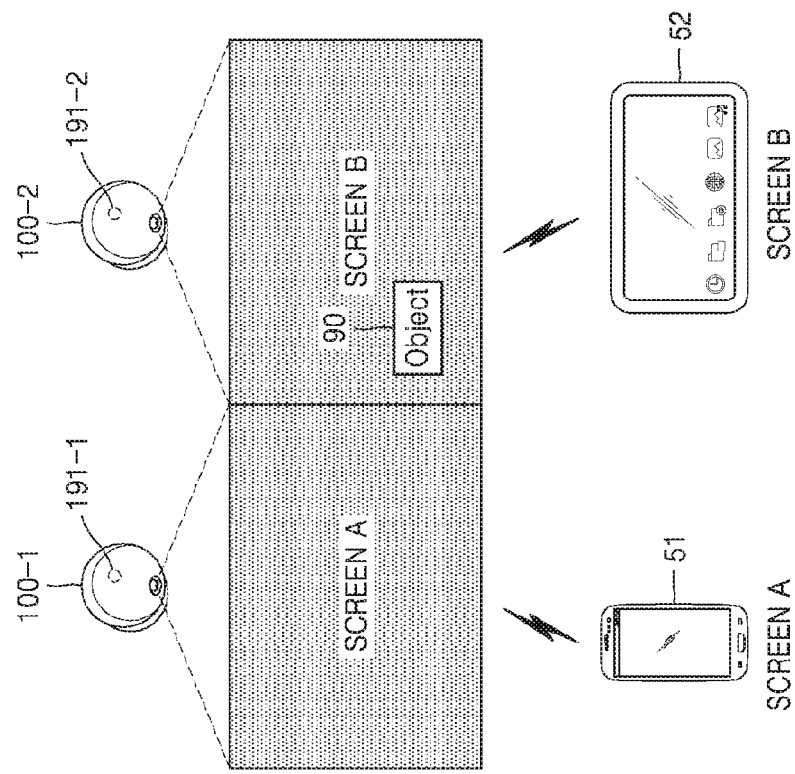
FIGS. 34A and 34B are reference diagrams illustrating an example in which a gesture is used upon an operation of moving an object in one projection image to another projection image through a user interaction according to an exemplary embodiment.
Figure 34B:
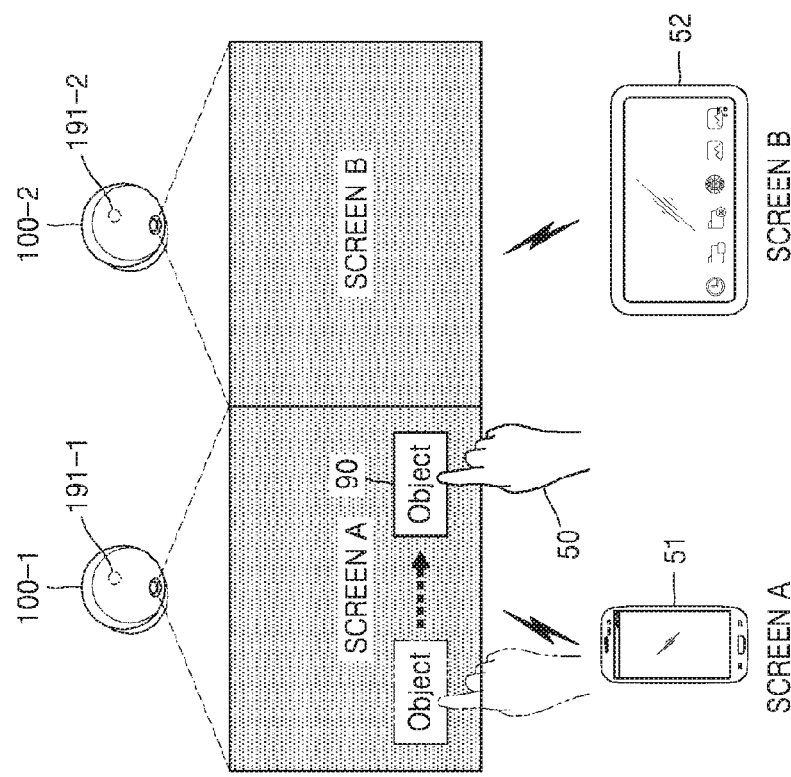

FIGS. 34A and 34B are reference diagrams illustrating an example in which a gesture is used upon an operation of moving an object in one projection image to another projection image through a user input according to an exemplary embodiment.

When a user performs an operation of manipulating an object 90 displayed on a projection image of screen A using an input unit such as his or her finger 50 or a pen, a camera 191-1 of an electronic device 100-1 may sense the user input, and a projection module of the electronic device 100-1 may project an image in which the object is moved according to the movement of the user input unit. In addition, the electronic device 100-1 may transmit information on an object 90 to an electronic device 100-2 over a network.

According to an exemplary embodiment, a manipulation of the object 90 with a user input unit may include a gesture of the user input unit.

Referring to FIG. 34A, when a gesture of the user moving the object 90 displayed on the projection image of screen A from left to right using the user's finger 50 is performed, the camera 191-1 of the electronic device 100-1 may sense the gesture of the user. As an operation corresponding to the user gesture, the electronic device 100-1 may output the object 90 while moving the object 90 to screen B and may transmit information on the object to the electronic device 100-2 at a time at which the object moves to screen B.

An example in which the object 90 is output to a screen of an image projected by the electronic device 100-2 according to the operation corresponding to the user gesture is shown in FIG. 34B.

Exemplary embodiments in which an object is moved according to a user input when a plurality of electronic devices are disposed adjacent to one another will be described with reference to FIG. 35 to FIG. 36C.

Figure 35:
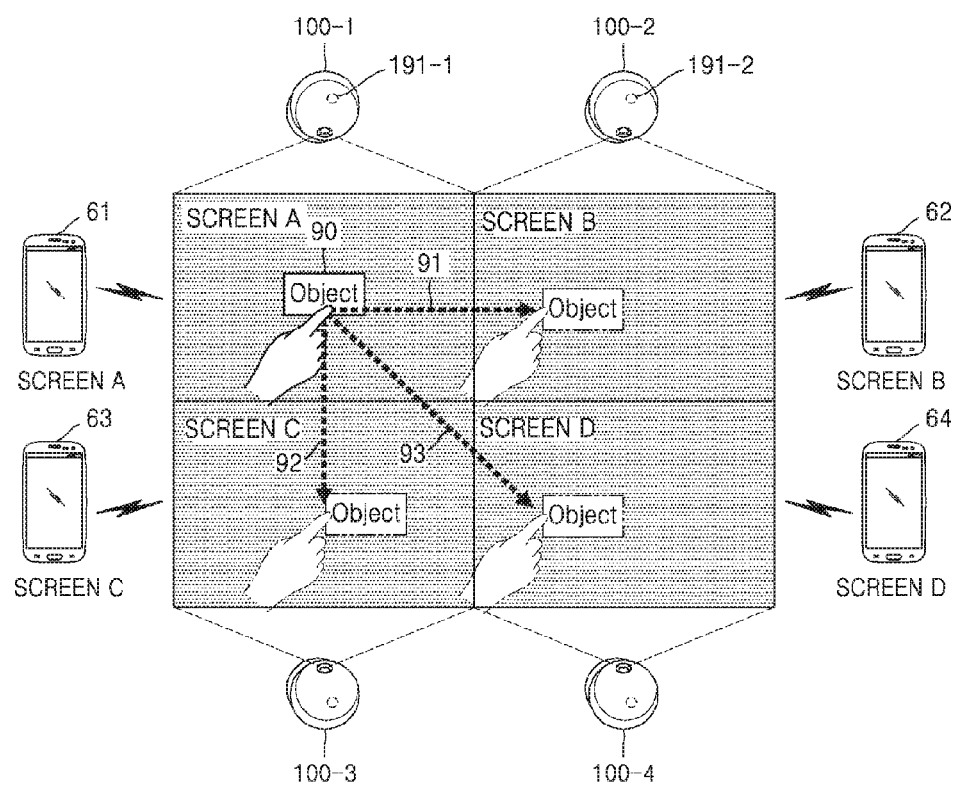
FIG. 35 is a reference diagram illustrating an example of moving an object according to a user gesture when a plurality of electronic devices are disposed adjacent to one another according to an exemplary embodiment.

FIG. 35 is a reference diagram illustrating an example of moving an object according to a user gesture when a plurality of electronic devices are disposed adjacent to one another according to an exemplary embodiment.

Referring to FIG. 35, an electronic device 100-1 is connected with a smart device 61 and configured to project screen A received from the smart device 61, an electronic device 100-2 is connected with a smart device 62 and configured to project screen B received from the smart device 62, an electronic device 100-3 is connected with a smart device 63 and configured to project screen C received from the smart device 63, and an electronic device 100-4 is connected with a smart device 64 and configured to project screen D received from the smart device 64. When the electronic devices 100-1 to 100-4 are positioned adjacent to one another to recognize one another, the electronic devices 100-1 to 100-4 may also mutually project a screen received from one smart device as a large screen. According to an exemplary embodiment, each of the electronic devices may project a screen received from a smart device connected to the electronic device.

According to an exemplary embodiment, when a plurality of electronic devices are disposed adjacent to one another, in response to a gesture of a user input unit of moving an object displayed on one screen toward a screen positioned in another direction, a representation of the object may be moved in a direction of the corresponding screen, or information on the object may be transmitted to an electronic device that projects the corresponding screen.

For example, a camera module 191-1 of the electronic device 100-1 may sense one of a gesture 91 of the user moving the object 90 displayed on the projection image of screen A in a direction of screen B, a gesture 92 of the user moving the object 90 in a direction of screen C, and a gesture 93 of the user moving the object 90 in a direction of screen D through an input unit such as the user's finger 50 or the pen. According to a user gesture sensed by the camera module 191-1, the electronic device 100-1 may display the movement of the object in a direction corresponding to the sensed user gesture or may transmit information on the object to an electronic device that projects a screen in a direction corresponding to the sensed user gesture.

Figure 36A:
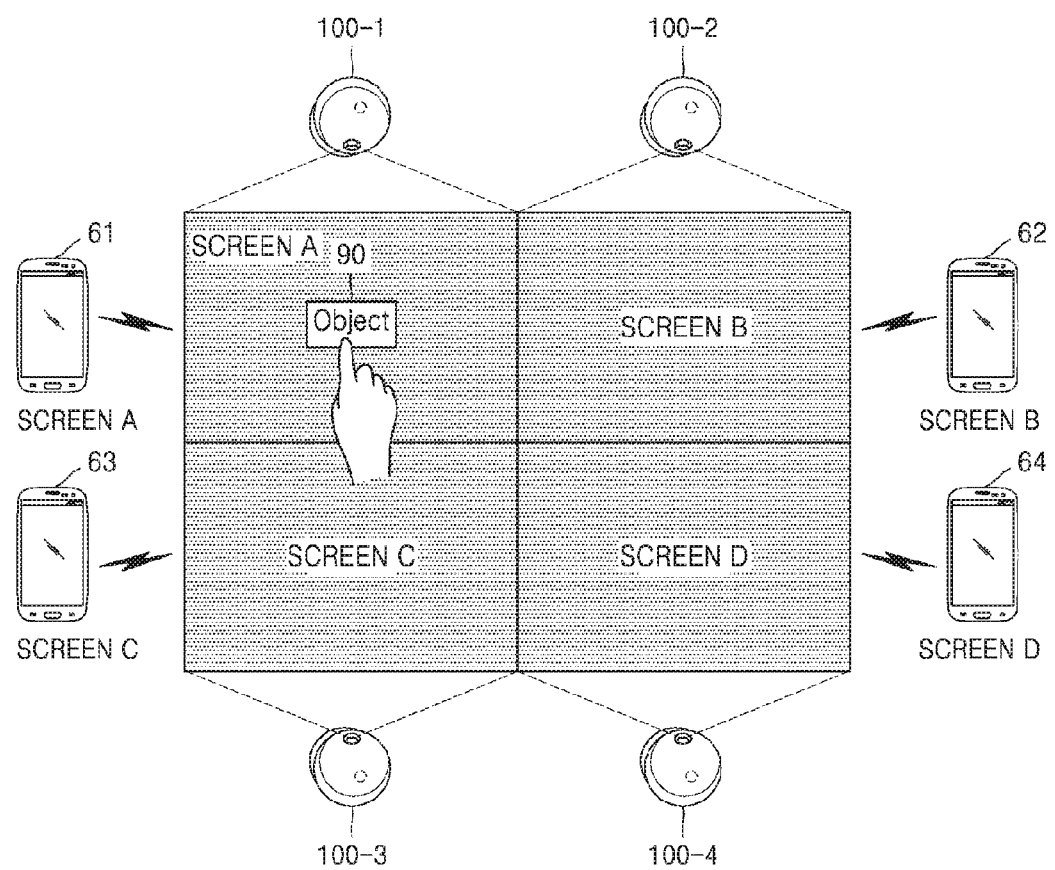
FIGS. 36A to 36C are reference diagrams illustrating an example of moving an object according to a user gesture and a provided menu when a plurality of electronic devices are disposed adjacent to one another according to an exemplary embodiment.
Figure 36B:
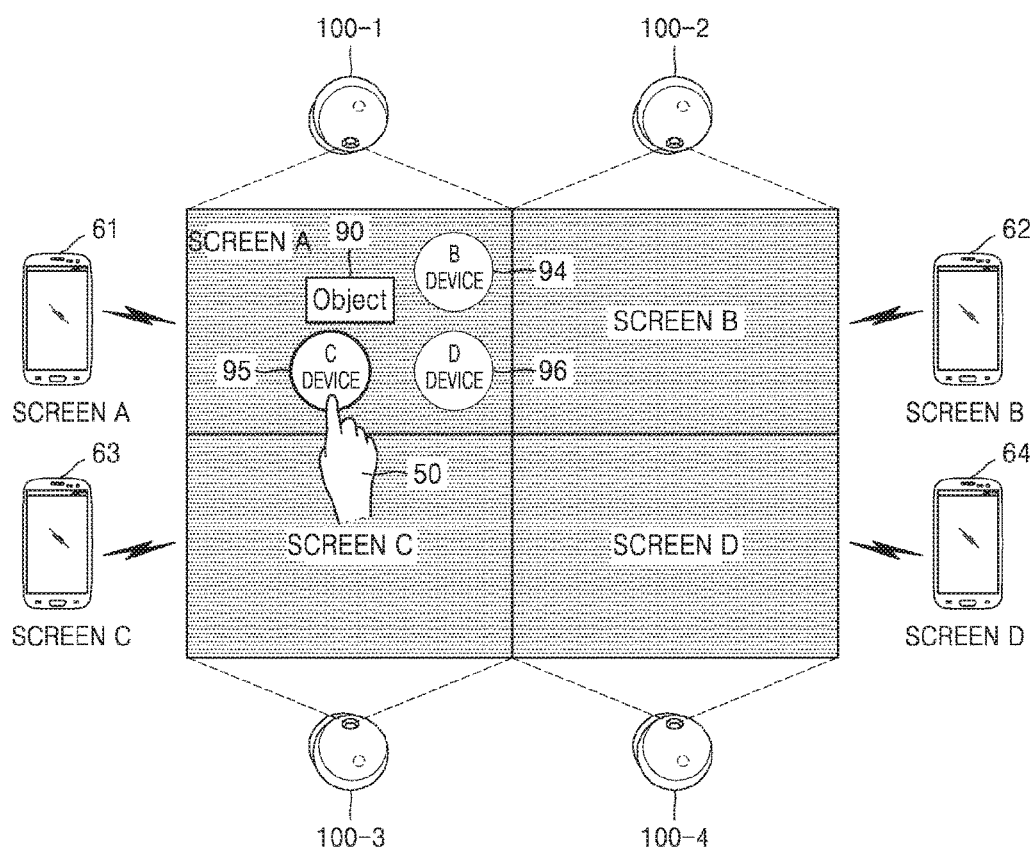
Figure 36C:
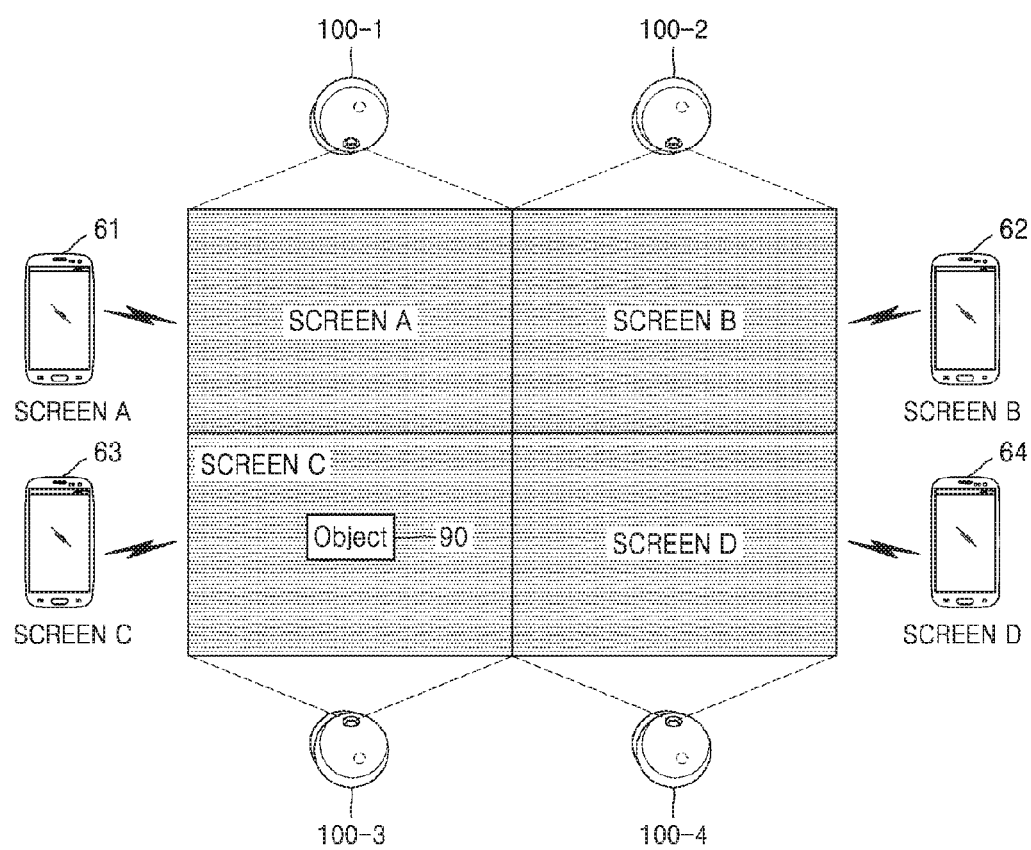

FIGS. 36A to 36C are reference diagrams illustrating an example of moving an object according to a user gesture and a provided menu when a plurality of electronic devices are disposed adjacent to one another according to an exemplary embodiment.

Referring to FIG. 36A, in a case in which four electronic devices 100-1 to 100-4 are disposed adjacent to one another, when a user points to an object 90 displayed on screen A with his or her finger, a camera module 191-1 of the electronic device 100-1 senses the user input.

Referring to FIG. 36B, in response to the sensed input, the electronic device 100-1 displays a user interface that may receive an input for selecting any one of the electronic devices 100-2, 100-3, and 100-4 positioned adjacent to the electronic device 100-1. The user interface that may receive an input for selecting any one of the electronic devices 100-2, 100-3, and 100-4 may be determined in various ways.

For example, FIG. 36B shows a user interface including an object 94 including text "device B," an object 95 including text "device C," and an object 96 including text "device D." The use of text in the user interface or the user of a circular object shown in FIG. 36B is an example. It will be understood by those skilled in the art that various modifications are possible.

When the user points to the object 95 with the finger 50 while the user interface is displayed, the camera module 191-1 of the electronic device 100-1 may recognize the selection of the user, and the electronic device 100-1 may move the object 90 to an electronic device 100-3 corresponding to the selected object 95 or may transmit information on the object 90 to the electronic device 100-3 in response to the user's selection.

FIG. 36C shows a screen in which the object 90 is moved to the electronic device 100-3 according to an operation of the electronic device 100-1 and the electronic device 100-3 outputs the object 90.

According to an exemplary embodiment, the electronic device may sense a bending of a flexible device as a user input.

Figure 37:
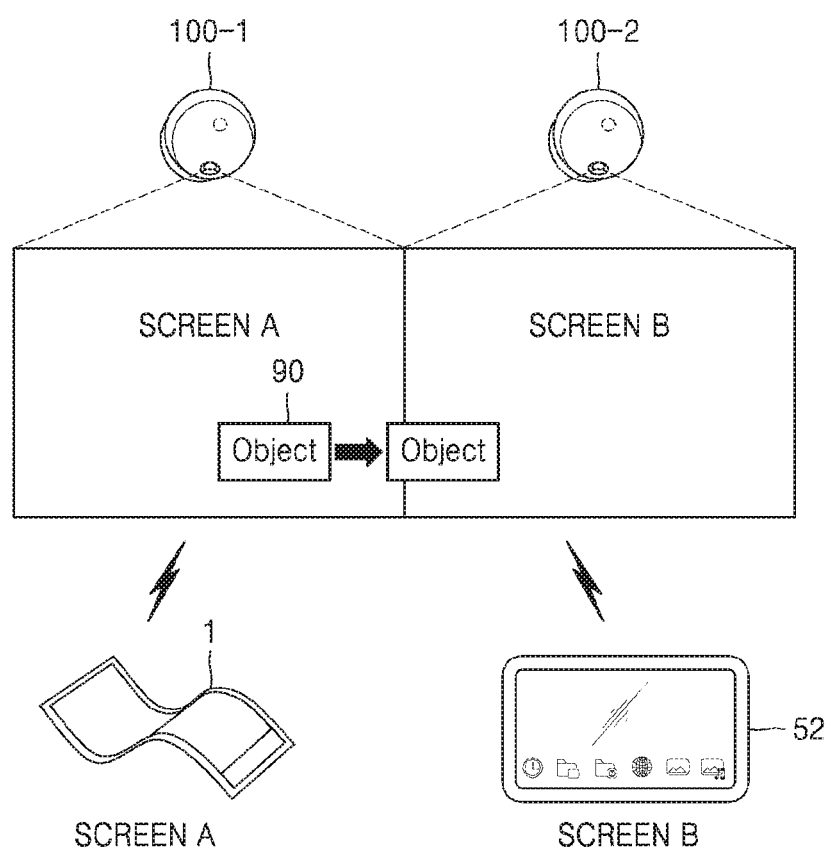
FIG. 37 shows an example of sensing a bending of a flexible device as a user interaction and moving an object according to an exemplary embodiment.

FIG. 37 shows an example of sensing a bending of a flexible device as a user input and moving an object according to an exemplary embodiment.

Referring to FIG. 37, an electronic device 100-1 is connected with a flexible device 1 and configured to project screen A received from the flexible device 1, and an electronic device 100-2 is connected with a smart device 52 and configured to project screen B received from the smart device 52.

The electronic device 100-1 may recognize a bending of the flexible device 1 as one instruction. The electronic device 100-1 may move the object 90 displayed on screen A to screen B or may transmit the information on the object 90 to the electronic device 100-2 in response to the recognized instruction.

In this case, the electronic device 100-1 may recognize the bending of the flexible device 1 by capturing the bending using a camera module or by receiving an instruction corresponding to the bending of the flexible device 1 from the flexible device 1.

An operation of moving an object using a plurality of electronic devices may be applied in one or more exemplary embodiments.

According to an exemplary embodiment, when one electronic device outputs a screen that uses a photograph app, and another electronic device outputs a file browser screen, at least one photograph included in the photograph app may be moved to the file browser screen in response to a user interaction of moving the object.

FIGS. 38A and 38B show a detailed application example of a user interaction in a file folder.

Referring to FIG. 38A, an electronic device 100-1 receives a photograph app screen from a smart device 51 and then projects the photograph app screen using an optical module, and an electronic device 100-2 receives a file browser screen from the smart device 52 and then projects the file browser screen using an optical module. When the electronic device 100-1 recognizes a gesture of a user selecting and moving at least one photograph 73 displayed on the projected photograph app screen 71 with the user's finger, the electronic device 100-1 may output the selected at least one photograph by moving the photograph in a direction of another photograph app screen 72 projected by the electronic device 100-2 or may transmit information on the selected at least one photograph 73 to the electronic device 100-2.

An example in which the photograph 73 selected by the user is moved to the photograph app screen 72 projected by the electronic device 100-2 according to the above user gesture is shown in FIG. 38B.

According to an application example, when each of a plurality of users wants to send a photograph to another user while enjoying the photograph in a large screen using a photograph app, the user may conveniently and easily transfer the photograph to another user.

According to an exemplary embodiment, when one electronic device outputs one PPT screen, and another electronic device outputs another PPT screen, an object included in one PPT screen may be moved to the other PPT screen in response to a user input for moving the object.

Figure 39A:
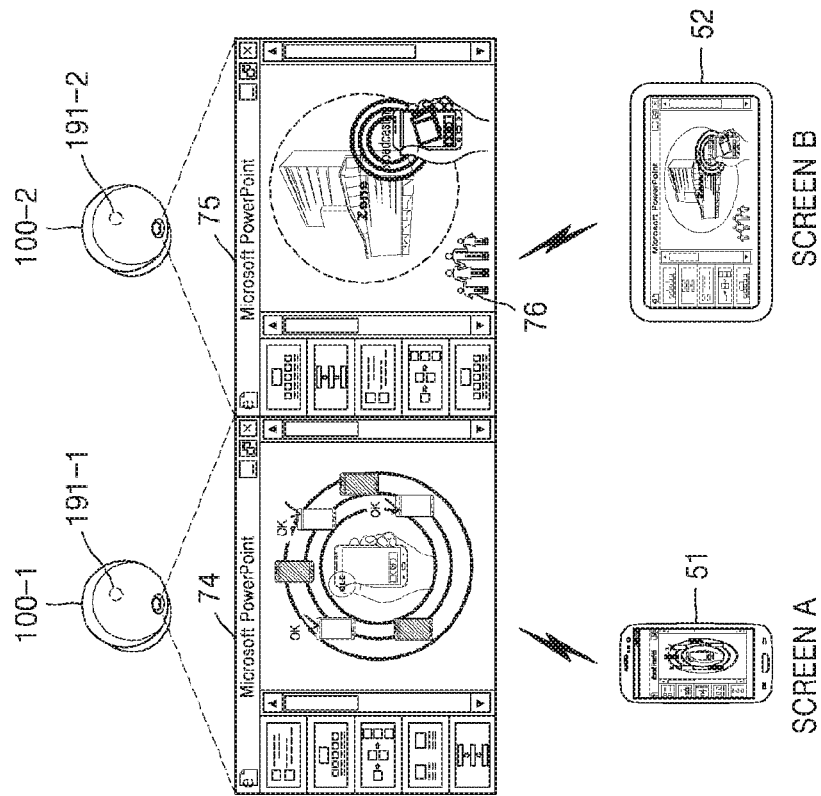
FIGS. 39A and 39B show a detailed application example of a user interaction in a PPT screen.
Figure 39B:
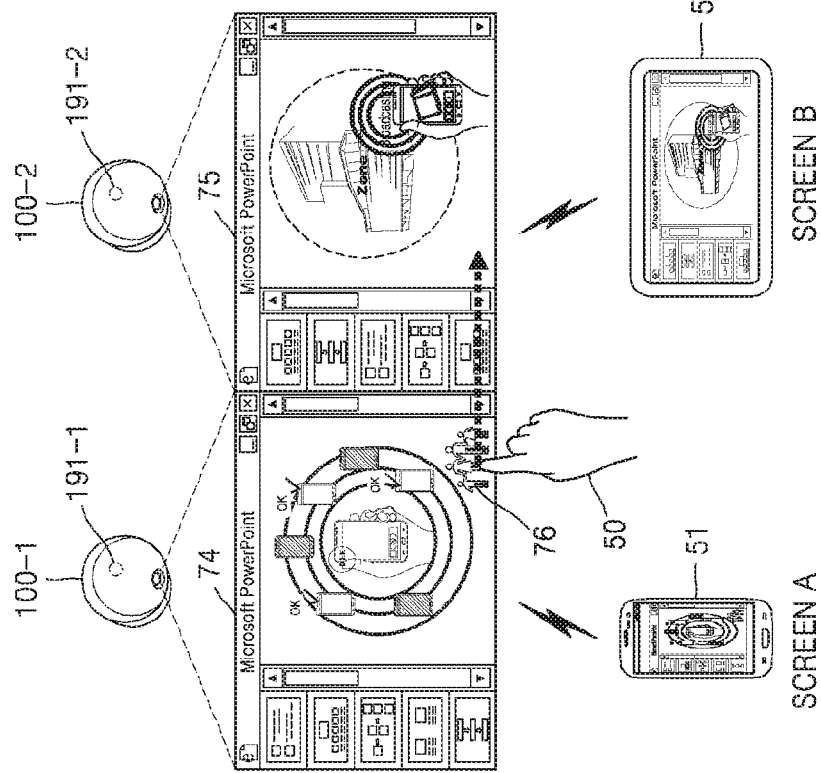

FIGS. 39A and 39B show a detailed application example of a user interaction in a PPT screen.

Referring to FIG. 39A, an electronic device 100-1 projects a first PPT screen 74 received from a smart device 51 using an optical module, and an electronic device 100-2 projects a second PPT screen 75 received from a smart device 52 using an optical module. When the electronic device 100-1 recognizes a gesture of a user selecting and moving at least one object 76 displayed on the projected first PTT screen 73 with the user's finger, the electronic device 100-1 may output the selected at least one object 76 by moving the object 76 in a direction of the second PPT screen 74 or may transmit information on the selected at least one object to the electronic device 100-2.

An example in which the object 76 selected by the user is moved to the second PPT screen 75 projected by the electronic device 100-2 according to the above user gesture is shown in FIG. 39B.

According to an exemplary embodiment, when each of a plurality of users wants to send an object to another user while performing a task of making a large screen using PPT screens, the user may conveniently and easily transfer the object to another user.

In addition, when one electronic device projects a webpage screen, and another electronic device projects a chatting program screen, a message or image displayed in a webpage screen may be moved to the chatting program screen in response to a user interaction for selecting and moving the message or image.

Figure 40:
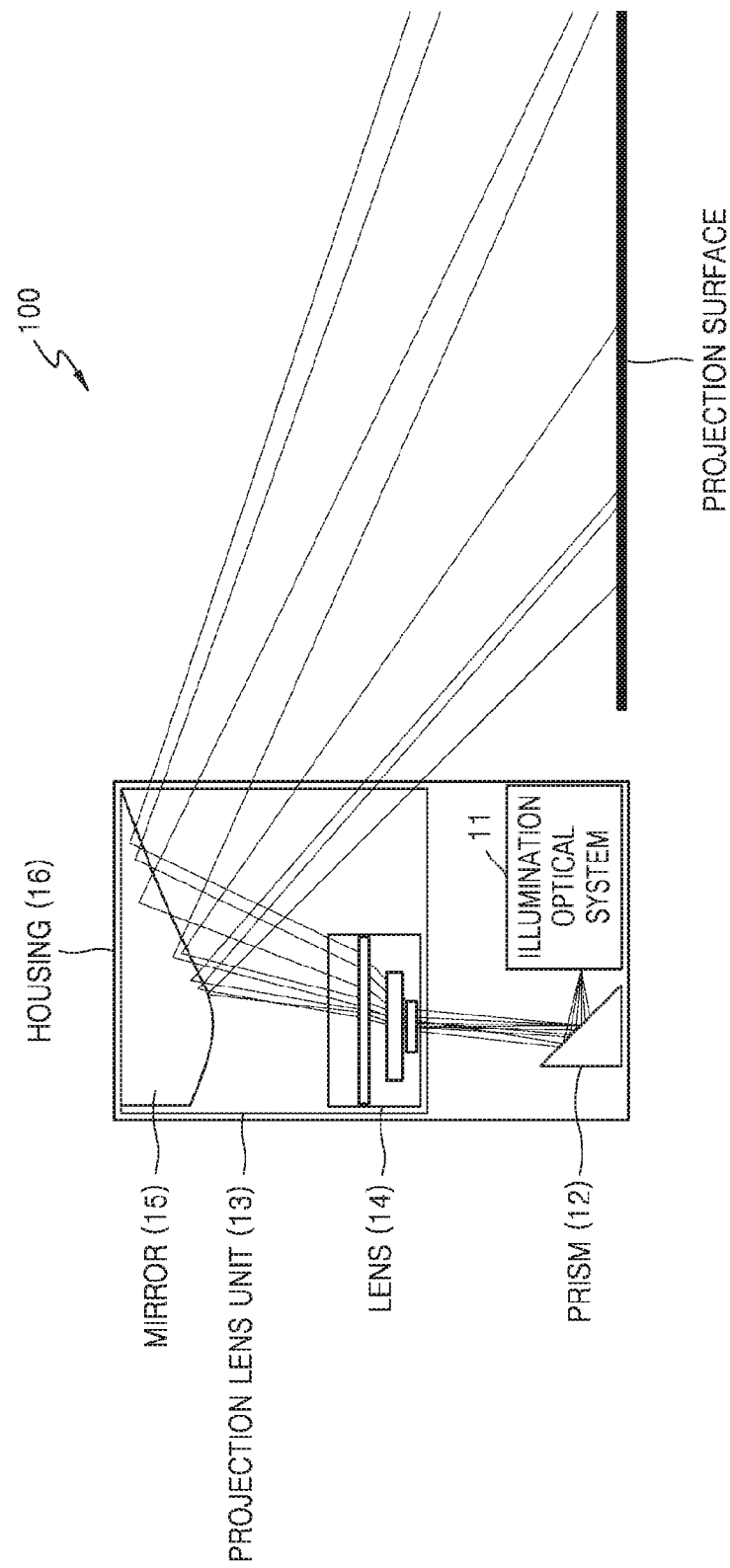
FIG. 40 is a diagram showing an example of an optical system of an electronic device according to an exemplary embodiment.

FIG. 40 is a diagram showing an example of an optical module of an electronic device 100 according to an exemplary embodiment.

Referring to FIG. 40, a housing 16 includes an illumination optical system 11 and a projection system lens unit 13. Light projected by the illumination optical system 11 may be refracted perpendicularly through a prism 12. The projection system lens unit 13 includes a lens array 14, and the lens array 14 may be configured such that an image is not distorted even in a short projection distance. In addition, the projection system lens unit 13 may include a mirror 15 and may reflect light to a side through the mirror 15.

According to an exemplary embodiment, projection is performed onto a projection surface at the side even in a short projection distance by using an ultra-short focus lens in a combination of lenses of the projection system lens unit 13.

According to an exemplary embodiment, the optical system may be configured by horizontally positioning the illumination optical system and the projection system lens unit, excluding the prism.

According to an exemplary embodiment, the electronic device may be folded to reduce its size when the electronic device is carried and expand the housing 16 to secure a projection distance when the electronic device actually performs projection by adjusting a length such that the housing 16 may be expanded and folded.

Figure 41A:
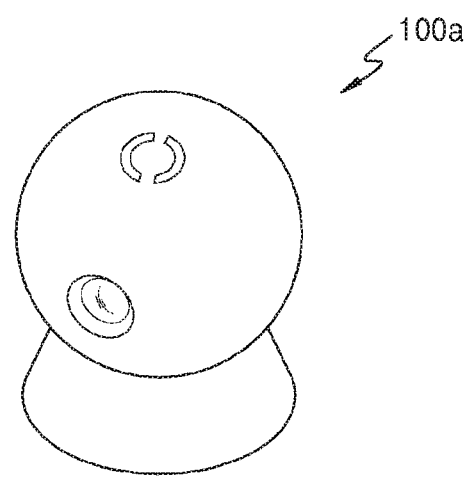
FIGS. 41A to 41C show an exterior of an electronic device according to one or more exemplary embodiments.
Figure 41B:
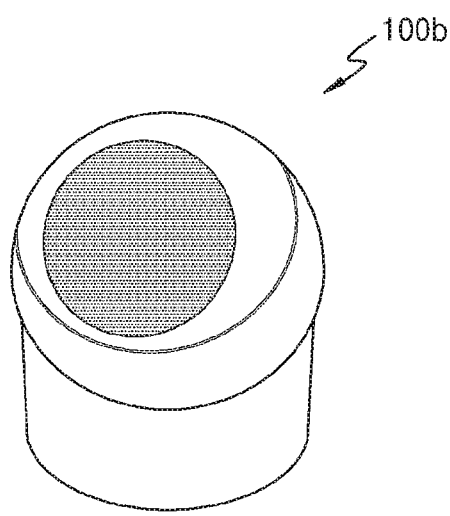
Figure 41C:
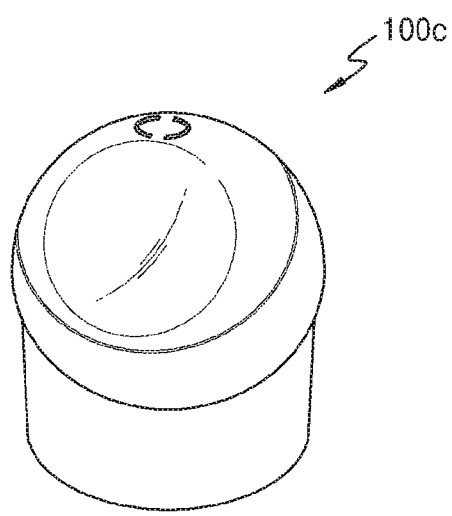

FIGS. 41A to 41C show an exterior of an electronic device according to one or more exemplary embodiments.

FIG. 41A is an example of an electronic device 100a according to an exemplary embodiment.

FIG. 41B is an example of an electronic device 100b according to an exemplary embodiment.

FIG. 41C is an example of an electronic device 100c according to an exemplary embodiment.

FIGS. 42A to 42E show an example of an electronic device 100c having a structure for docking an external device according to an exemplary embodiment.

Figure 42A:
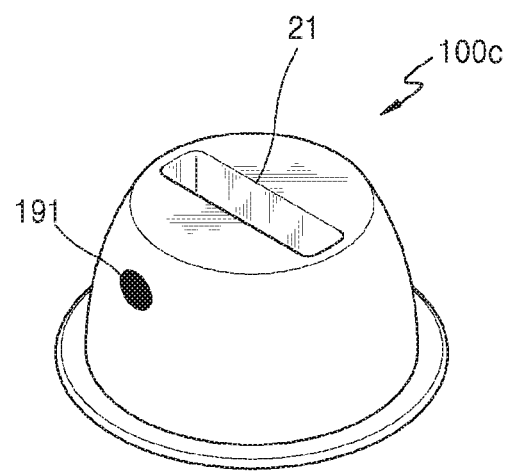
FIGS. 42A to 42E show an example of an electronic device having a structure for docking an external device according to an exemplary embodiment.

FIG. 42A is a side view of an electronic device 100c.

Referring to FIG. 42A, the electronic device 100c includes an insertion hole 21 for docking an external device and includes a camera module 191 on a front surface.

Figure 42B:
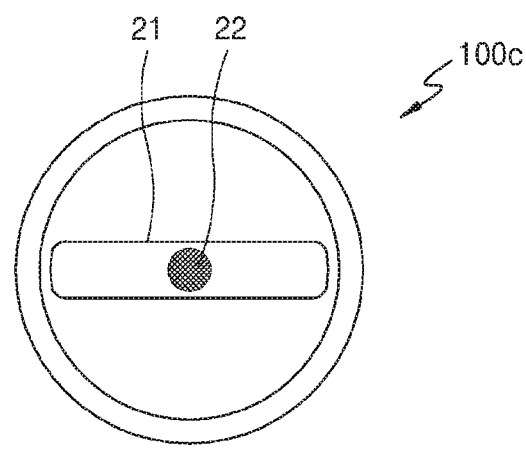

FIG. 42B is a top view of an electronic device 100c.

Referring to FIG. 42B, the electronic device 100c includes, inside the insertion hole 21 for docking the external device, a contact module 22 for determining whether the electronic device 100 is in contact with an external device and allowing data to be transmitted to or received from the external device.

Figure 42C:
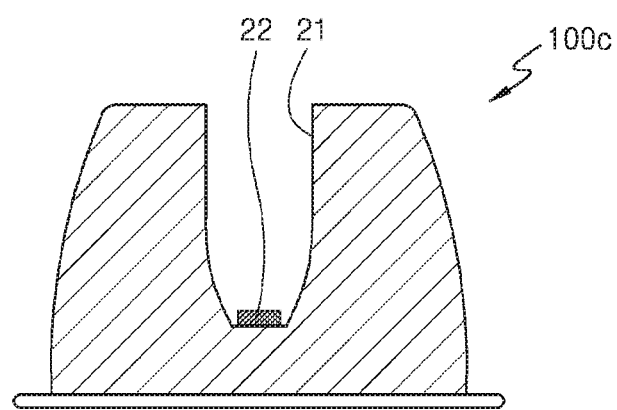

FIG. 42C is a side-sectional view of the electronic device 100c.

Referring to FIG. 42C, the user may dock the external device through the insertion hole of the electronic device 100c.

Figure 42D:
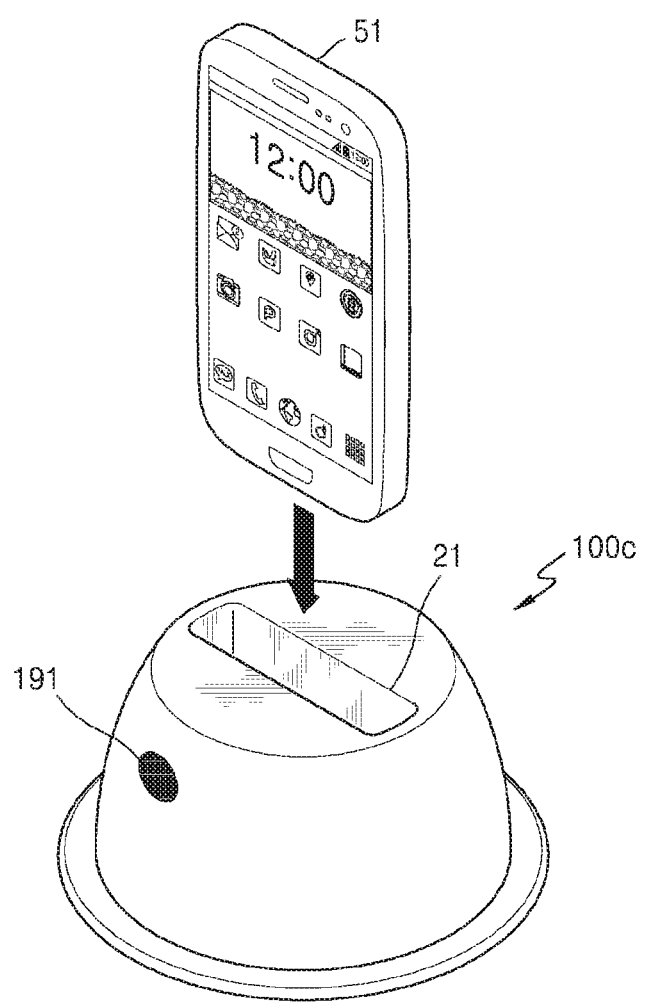

FIG. 42D is a reference diagram illustrating an example in which an external device is docked.

Referring to FIG. 42D, the user may use the electronic device 100c by pushing the external device 51 through the insertion hole 21 of the electronic device 100c to dock the external device 51 into the electronic device 100c.

Figure 42E:
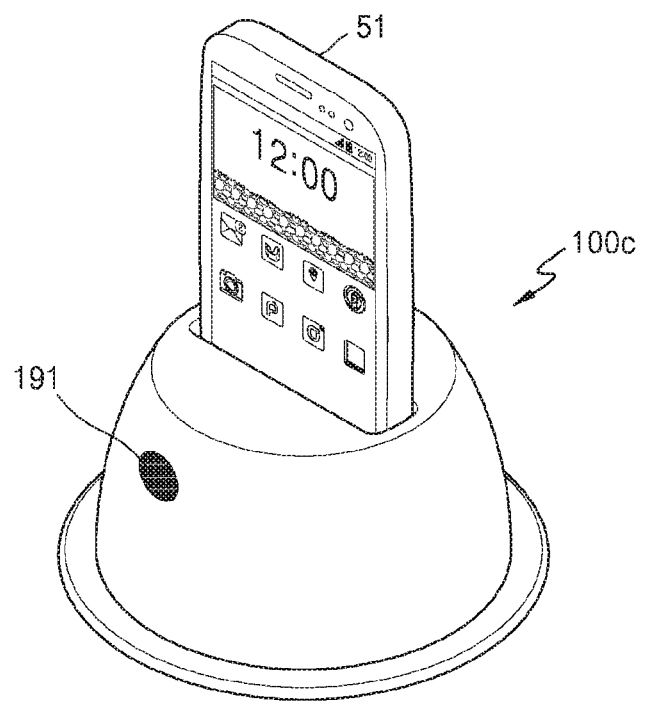

FIG. 42E is a view showing a state in which an external device is docked into the electronic device 100c.

FIG. 42E shows a state in which the external device 51 is docked into the electronic device 100c. In this case, the electronic device 100c and the external device 51 may transmit and receive data.

As shown in FIGS. 42A to 42E, by providing an insertion hole for docking the external device into the electronic device 100c, a user may easily manipulate transmission and reception of data only by an operation of docking the external device into the electronic device 100c without a separate manipulation of wireless transmission and reception.

Figure 43:
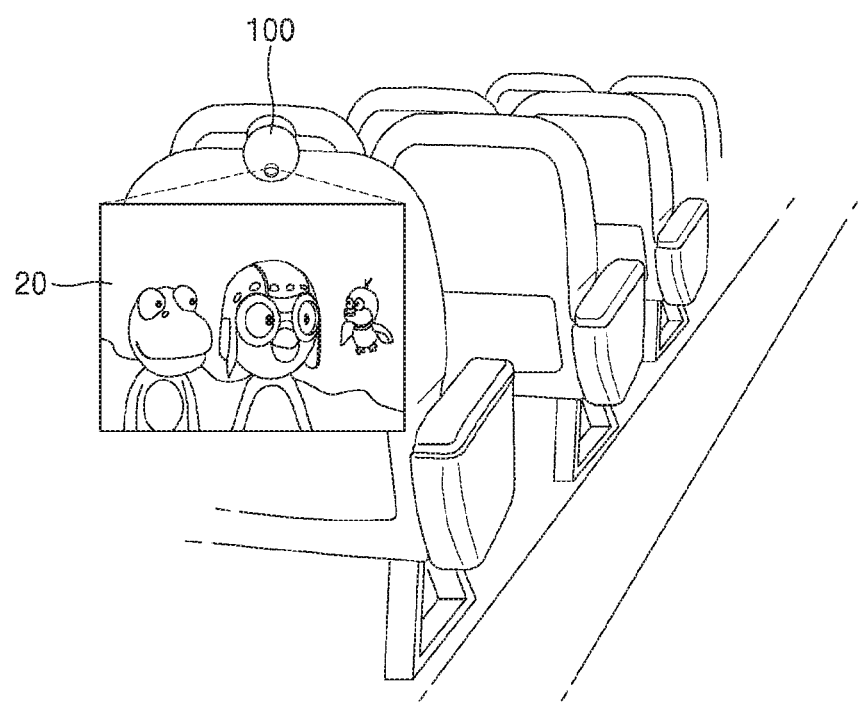
FIG. 43 shows an example in which an electronic device is applied to an airline seat according to an exemplary embodiment.

FIG. 43 shows an example in which an electronic device is applied to a vehicular seat according to an exemplary embodiment.

Referring to FIG. 43, the electronic device 100 may be installed in a back of a seat of an airplane, a train, or an express bus to show a projection image 20.

For an airplane, when the electronic device 100 is installed to project an image, an image having a greater size than the folding table may be projected, thus allowing the user to enjoy a slightly larger screen.

To secure the projection surface, as described above, the projection surface needed to project an image may be secured by installing an extendable electronic device.

FIGS. 44A to 44D show examples in which an electronic device is applied to a vehicle interior according to an exemplary embodiment.

Figure 44A:
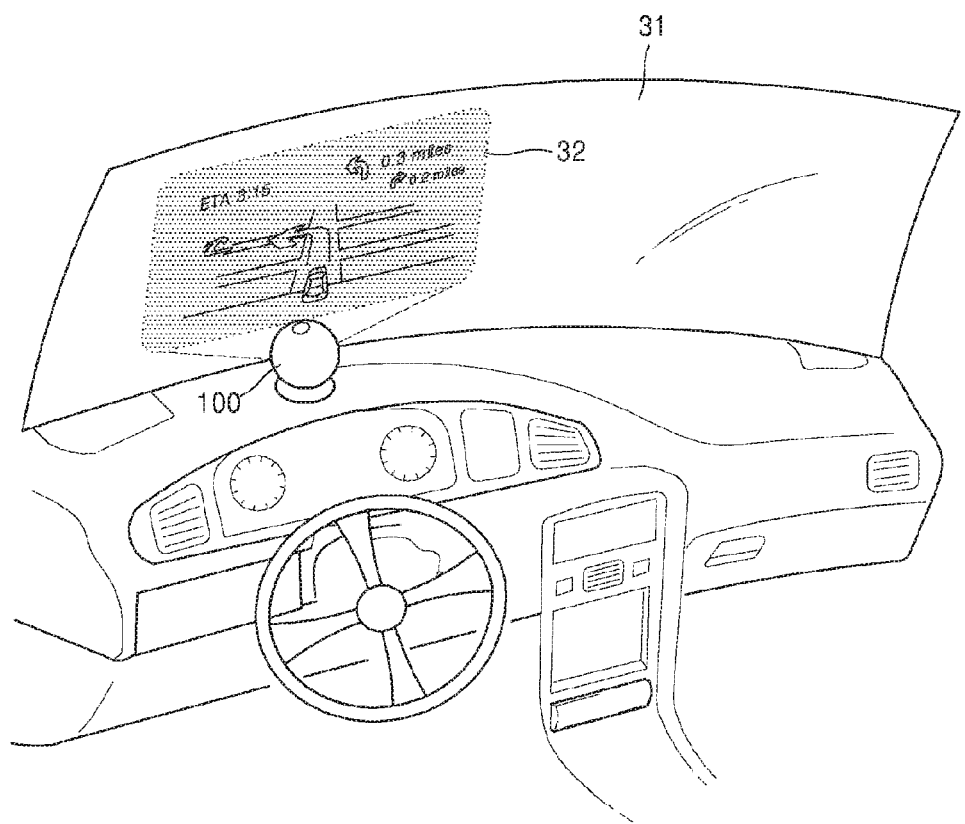
FIGS. 44A to 44D shows examples in which an electronic device is applied to a vehicle interior according to an exemplary embodiment.

FIG. 44A shows an example in which an electronic device is applied to a front windshield of a vehicle according to an exemplary embodiment.

Referring to FIG. 44A, according to an exemplary embodiment, the electronic device 100 may project an image 32 onto the front windshield 31 of the vehicle in a head-up display (HUD) form to provide driving information. For an existing HUD, to secure a light projection distance, a projector may be inserted into a deep hole formed in a dashboard structure of the vehicle. According to an exemplary embodiment, the electronic device 100 may be easily installed on a top of the dash board of the vehicle to show a large screen and thus may provide more driving information than that of the existing HUD. In addition, a film for reflecting light may be attached to a windshield part and then used to project the image.

Figure 44B:
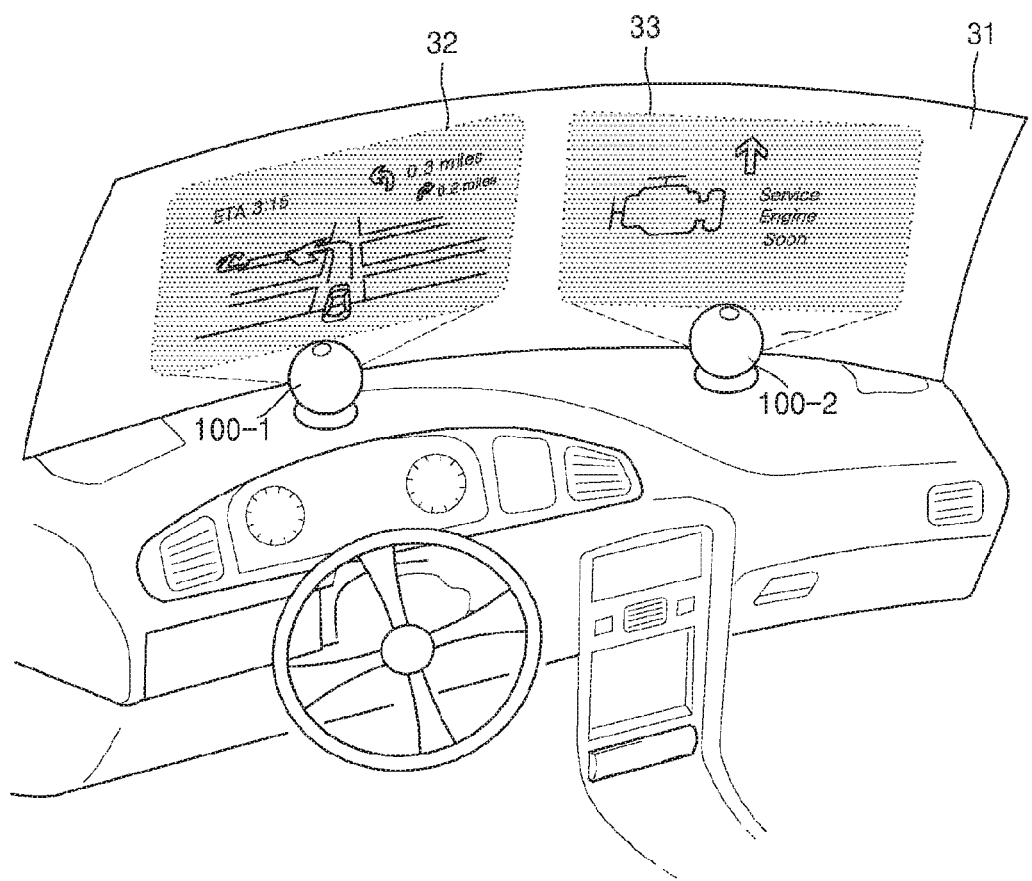

FIG. 44B shows an example in which a plurality of electronic devices are applied to a front windshield of the vehicle according to an exemplary embodiment.

Referring to FIG. 44B, according to an exemplary embodiment, two electronic devices 100-1 and 100-2 may project an image 32 and an image 33 onto a front windshield of the vehicle, and may provide more driving information. It is easily possible to provide more driving information by installing the two electronic devices 100-1 and 100-2 to project two images onto the front windshield of the vehicle and by allowing the electronic device 100-1 to project navigation information and allowing the electronic device 100-2 to project information regarding a current state of the vehicle.

In addition, by installing a plurality of electronic devices to expand a projection surface, it is possible to utilize the entire windshield as one display to display information about nearby vehicles on a display in a situation in which it is difficult to drive a vehicle, such as a foggy road, thereby facilitating safe driving. While the vehicle is stopped, the expanded projection surface may be used to watch a movie on a large screen.

Figure 44C:
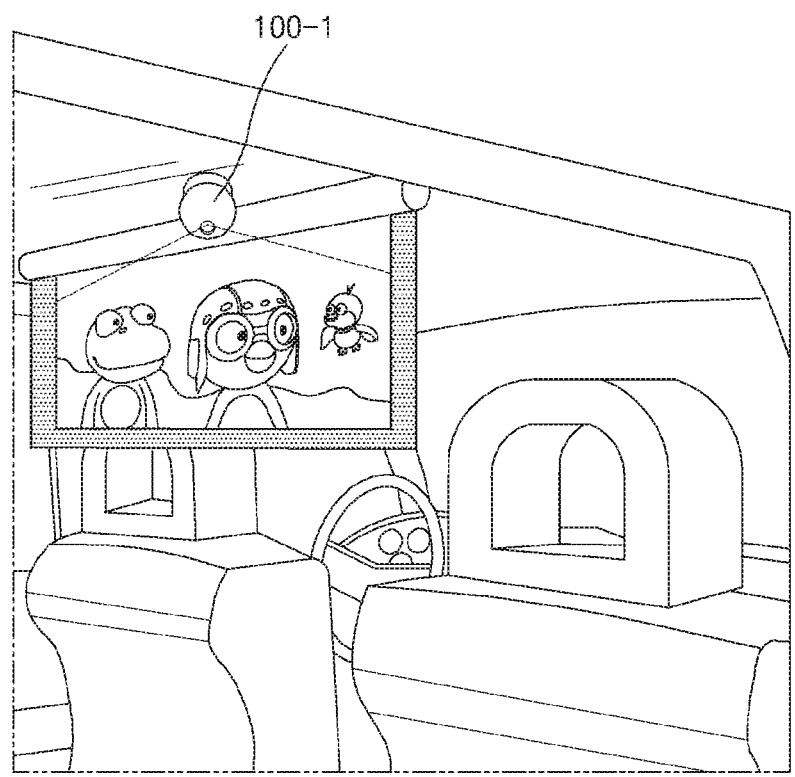

FIG. 44C shows an example in which an electronic device is applied to a rear part of a vehicle according to an exemplary embodiment.

Referring to FIG. 44C, according to an exemplary embodiment, the electronic device 100-1 may include a screen unit in a rear part of the vehicle and may show a video such as a movie or news to a person that is seated in a rear seat through the projection surface of the electronic device 100-1.

Figure 44D:
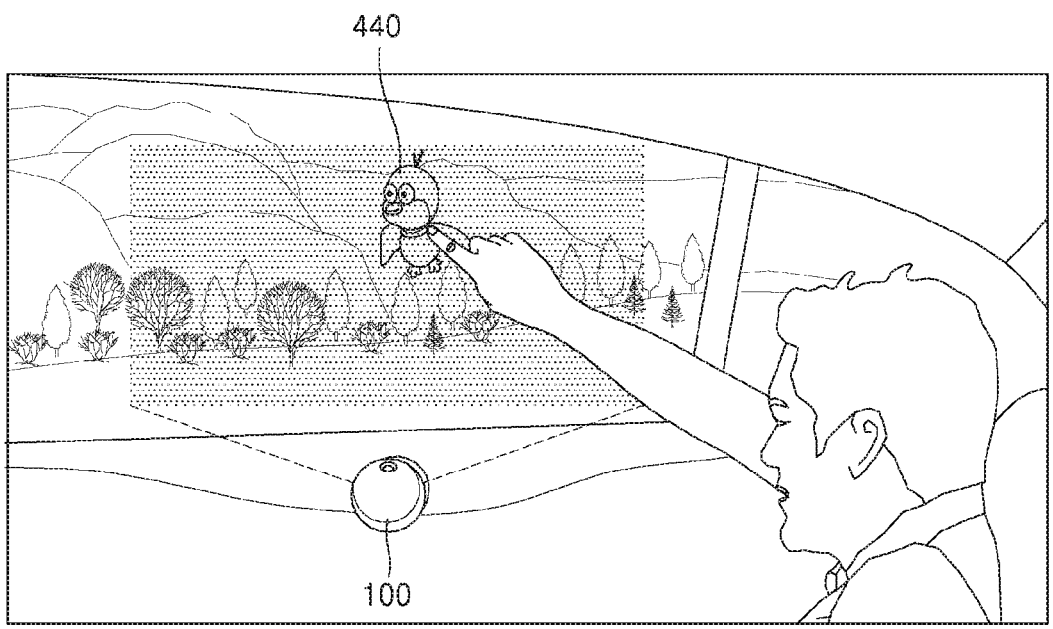

FIG. 44D shows an example in which an electronic device is applied to a side glass window of a vehicle according to an exemplary embodiment. Referring to FIG. 44D, according to an exemplary embodiment, the electronic device 100 is installed at a side windshield of a vehicle to show content in association with a landscape outside the vehicle. In addition, as described above, content 440 may respond to the user input for the content 440 displayed on the projection image by processing a user input.

According to an exemplary embodiment, when the electronic devices may be attached to a ceiling of the vehicle, a vehicle passenger may enjoy a movie while he or she leans back in his or her seat.

The term "module" used in one or more exemplary embodiments may refer to a unit including a combination of one or more of hardware, software, and firmware. The "module" may be interchangeably used with a term such as a unit, logic, a logical block, a component, or a circuit. The "module" may be a minimum unit of parts formed integrally as one piece or a part thereof. The "module" may be a minimum unit that performs one or more functions or a part of the minimum unit. The "module" may be mechanically or electronically implemented. For example, the "module" according to one or more exemplary embodiments may include at least one of an application-specific integrated circuit (ASIC) chip, field programmable gate arrays (FPGAs), and a programmable-logic device that are well-known or to be developed, which perform certain operations.

According to one or more exemplary embodiments, at least a part of a device (e.g., modules or functions thereof) or a method (e.g., operations) according to one or more exemplary embodiments may be implemented with instructions stored in, for example, a non-transitory computer-readable storage medium in the form of a programming module. When the instructions are executed by one or more processors (e.g., processor 110), the one or more processors may perform functions corresponding to the instructions. The non-transitory computer-readable storage medium may be, for example, the memory 130. For example, at least a part of the programming module may be implemented (e.g., executed) by the processor 110. For example, at least a part of the programming module may include at least one of a module, a program, a routine, sets of instructions, and a process to perform one or more functions.

The non-transitory computer-readable storage medium may include magnetic media such as a hard disk, a floppy disk, and a magnetic tape, optical media such as a compact disc read only memory (CD-ROM) and a digital versatile disc (DVD), magneto-optical media such as a floptical disk, and a hardware device configured to store and execute program instructions (e.g., a programming module) such as a read only memory (ROM), a random access memory (RAM), and a flash memory. The program instructions may include a mechanical language code generated by a compiler, and a high-level language code that may be executed by a computer using an interpreter. The hardware device may be configured to operate as one or more software modules for performing operations according to one or more exemplary embodiments or vice versa.

A module or programming module according to one or more exemplary embodiments may include at least one of the foregoing components, or some of the foregoing components may be omitted or other components may be further included. Operations executed by a module, a programming module, or other components according to one or more exemplary embodiments may be performed sequentially, in parallel, repetitively, or heuristically. Some operations may be executed in another order or may be omitted, or other operations may be added.

According to one or more exemplary embodiments, in a non-transitory computer-readable recording medium having recorded thereon instructions, the instructions are set such that the at least one processor performs at least one operation when the instructions are executed by the at least one processor, and the at least one operation includes determining whether the electronic device is positioned on a projection surface, providing a guide to position the electronic device on the projection surface according to the determination, and projecting the content onto the projection surface using the projection module.

According to one or more exemplary embodiments, a user may easily position his or her content on a projection surface such as a wall or a ceiling without focus or keystone adjustment, by positioning the electronic device including an optical module on the projection surface through a user interaction.

According to an exemplary embodiment, power is saved by performing projection when the electronic device is positioned on the projection surface or positioned within a predetermined distance from the projection surface and by shutting off the optical module at other times.

According to an exemplary embodiment, a user may expand the projection surface to enlarge a screen and share content by positioning two or more electronic devices adjacent to one another.

The above-described exemplary embodiments are intended for purposes of illustration to describe technical details and help in understanding the present disclosure, and are not intended to limit the scope of the present disclosure. While the present disclosure has been shown and described with reference to one or more exemplary embodiments, it should be understood by those skilled in the art that various changes in form and details may be made without departing from the spirit and scope of the present disclosure, as defined by the appended claims and their equivalents.

What is claimed is:

1. An electronic device comprising:
   a memory configured to store instructions;
   a processor configured to execute the stored instructions; and
   a projector configured to project content onto a projection surface,
   wherein the processor is further configured to:
      determine whether the electronic device is in contact with the projection surface on which projected content is displayed by determining a distance between the electronic device and the projection surface,
      in response to the determination that the distance between the electronic device and the projection surface is greater than zero such that the electronic device is not in contact with the projection surface, control the projector not to project content, and
      in response to the determination that the distance between the electronic device and the projection surface is zero such that the electronic device is in contact with the projection surface, control the projector to project an indicator to inform a user of a position of a projection image to be output on the projection surface.

2. The electronic device of claim 1, wherein the processor is further configured to:
   determine whether the electronic device is in contact with a wall,
   in response to determining that the electronic device is in contact with the wall, determine whether a projection image to be output from the projector is parallel to a ground surface, and
   in response to the determination that the projection image from the projector is not parallel to the ground surface, output an indicator for providing a guide to position the electronic device such that the projection image from the projector is parallel to the ground surface.

3. The electronic device of claim 2, wherein the indicator comprises at least one among:
   a sound that instructs to position the electronic device in a designated position;
   a projection image comprising a message that instructs to position the electronic device in the designated position;
   a color or a blinking number of a LED lamp;

a laser light guide; and
a vibration of a vibration device included in the electronic device.

4. The electronic device of claim 1, wherein the processor is further configured to detect another electronic device near the electronic device to determine whether the electronic device is positioned on a level with the other electronic device using at least one of a gyro sensor and an accelerometer provided in a sensor module of the electronic device and, in response to determining that the electronic device is not positioned on a level with the other electronic device, to output an indicator for instructing to position the electronic device on a level with the other electronic device.

5. The electronic device of claim 4, wherein the indicator comprises at least one of sound, light, vibration, and an image.

6. The electronic device of claim 1, further comprising a hinge structure configured to rotate the electronic device,
wherein the processor is further configured to control the hinge structure to position the electronic device on the projection surface based on rotation information of the electronic device.

7. The electronic device of claim 1, wherein the processor is further configured to adjust at least one of geometric information and color information of an image based on sensed direction information of the electronic device.

8. The electronic device of claim 1, wherein the processor is further configured to, in response to an angle between the projection surface and a ground surface being greater than or equal to a predetermined value, adjust a projection image.

9. The electronic device of claim 1, wherein the processor is further configured to, in response to an angle between the projection surface and a ground surface being less than a predetermined value, adjust a projection image.

10. The electronic device of claim 1, wherein the processor is further configured to adjust a projection image according to whether the projection surface of the electronic device is orthogonal to a ground surface or parallel to the ground surface.

11. The electronic device of claim 1, wherein the processor is further configured to, in response to a space onto which an image is to be projected from the electronic device being a smaller size than the projection surface, adjust a size of a projection image.

12. The electronic device of claim 1, wherein the processor is further configured to determine whether the electronic device is positioned adjacent another electronic device and to determine an expandability of a projection image when it is determined that there is at least one other electronic device near the electronic device.

13. The electronic device of claim 12, wherein the processor is further configured to determine whether there is at least one other electronic device near the electronic device according to at least one of a signal intensity of wireless communication between the electronic device and another electronic device and a relative distance between the electronic device and another electronic device measured with a sensor.

14. The electronic device of claim 12, wherein the processor is further configured to, in response to determining the expandability of a projection image, divide the projection image into at least one other image and transmit the at least one other image to the at least one other electronic device.

15. The electronic device of claim 1, wherein the processor is further configured to sense a user input and output a projection image in which an object is moved based on the user input.

16. The electronic device of claim 1, wherein the processor is further configured to sense a user input and transmit information to move an object in a projection image to a projection image corresponding to another electronic device based on the user input.

17. A method of operating an electronic device having a projector to project content onto a projection surface with which the electronic device is in contact, the method comprising:
determining whether the electronic device is in contact with the projection surface on which projected content is displayed by determining a distance between the electronic device and the projection surface,
in response to the determination that the distance between the electronic device and the projection surface is greater than zero such that the electronic device is not in contact with the projection surface, controlling the projector not to project content, and
in response to the determination that the distance between the electronic device and the projection surface is zero such that the electronic device is in contact with the projection surface, controlling the projector to project an indicator to inform a user of a position of a projection image to be output on the projection surface.

18. A non-transitory computer-readable recording medium having recorded thereon a program for performing the method of claim 17.

* * * * *